US008036497B2

(12) United States Patent
Kise et al.

(10) Patent No.: US 8,036,497 B2
(45) Date of Patent: Oct. 11, 2011

(54) METHOD, PROGRAM AND APPARATUS FOR STORING DOCUMENT AND/OR IMAGE USING INVARIANT VALUES CALCULATED FROM FEATURE POINTS AND METHOD, PROGRAM AND APPARATUS FOR RETRIEVING DOCUMENT BASED ON STORED DOCUMENT AND/OR IMAGE

(75) Inventors: Koichi Kise, Sakai (JP); Tomohiro Nakai, Sakai (JP); Masakazu Iwamura, Sakai (JP)

(73) Assignee: Osaka Prefecture University Public Corporation, Osaka (JP)

( * ) Notice: Subject to any disclaimer, the term of this patent is extended or adjusted under 35 U.S.C. 154(b) by 1071 days.

(21) Appl. No.: 11/885,567

(22) PCT Filed: Feb. 15, 2006

(86) PCT No.: PCT/JP2006/302669

§ 371 (c)(1),
(2), (4) Date: Sep. 4, 2007

(87) PCT Pub. No.: WO2006/092957

PCT Pub. Date: Sep. 8, 2006

(65) Prior Publication Data

US 2008/0177764 A1    Jul. 24, 2008

(30) Foreign Application Priority Data

Mar. 1, 2005 (JP) .................................. 2005-056124
Jun. 30, 2005 (JP) .................................. 2005-192658

(51) Int. Cl.
G06K 9/60 (2006.01)
G06F 17/30 (2006.01)

(52) U.S. Cl. ................ 382/305; 382/306; 707/E17.008; 358/1.9

(58) Field of Classification Search .................. 382/190, 382/305, 306; 707/E17.008; 358/1.9
See application file for complete search history.

(56) References Cited

U.S. PATENT DOCUMENTS 5,465,353 A * 11/1995 Hull et al. .............................. 1/1
(Continued)

FOREIGN PATENT DOCUMENTS

DE    69721951 E  *  6/2003
(Continued)

OTHER PUBLICATIONS

Nakai et al. "Camera Based Document Image Retrieval as Voting for Partial Signatures of Projective Invariants" Proc. Of the 2005 8th International Conference on Document Anaylsis and Recognition. pp. 1-5.*

(Continued)

Primary Examiner — Jason M Repko
Assistant Examiner — Mia M Thomas
(74) Attorney, Agent, or Firm — Birch, Stewart, Kolasch & Birch, LLP

(57) ABSTRACT

A document/image retrieval method for retrieving a document/image corresponding to a captured digital image from a database by comparing features calculated based on feature points of the captured digital image with features preliminarily calculated based on feature points of each of documents and/or images stored in the database, the method comprising: extracting the feature points from the captured digital image; defining a local set of feature points for each of the extracted feature points; selecting feature points from the defined local set to define a feature point subset of the local set; determining invariant values as values characterizing the defined subset for combinations of the feature points in the subset, the invariant values being invariant to a geometric transformation; calculating a feature by combining the determined invariant values; and performing a voting process on the documents and/or images in the database based on the preliminarily calculated features of the documents and/or images; whereby the document/image corresponding to the captured digital image is retrieved from the database.

10 Claims, 40 Drawing Sheets

U.S. PATENT DOCUMENTS

| | | | | |
|---|---|---|---|---|
| 5,793,888 | A * | 8/1998 | Delanoy | 382/219 |
| 5,799,115 | A | 8/1998 | Asano et al. | |
| 6,041,133 | A * | 3/2000 | Califano et al. | 382/124 |
| 6,229,931 | B1 * | 5/2001 | Essafi et al. | 382/305 |
| 6,505,191 | B1 * | 1/2003 | Baclawski | 1/1 |
| 6,577,757 | B1 * | 6/2003 | DeYong et al. | 382/149 |
| 6,614,925 | B2 * | 9/2003 | DeYong et al. | 382/149 |
| 6,647,146 | B1 * | 11/2003 | Davison et al. | 382/199 |
| 6,650,770 | B2 * | 11/2003 | DeYong et al. | 382/149 |
| 6,687,397 | B2 * | 2/2004 | DeYong et al. | 382/145 |
| 6,771,819 | B2 * | 8/2004 | DeYong et al. | 382/228 |
| 7,072,486 | B1 * | 7/2006 | Akamatsu et al. | 382/100 |
| 7,836,050 | B2 * | 11/2010 | Jing et al. | 707/728 |
| 2003/0128876 | A1 * | 7/2003 | Yamaguchi | 382/190 |
| 2005/0196074 | A1 * | 9/2005 | Deere | 382/305 |
| 2005/0198067 | A1 * | 9/2005 | Liu | 707/104.1 |
| 2008/0239350 | A1 * | 10/2008 | Ohira et al. | 358/1.9 |
| 2009/0080783 | A1 * | 3/2009 | Hirohata | 382/218 |
| 2009/0086232 | A1 * | 4/2009 | Ohira | 358/1.9 |

FOREIGN PATENT DOCUMENTS

| | | | |
|---|---|---|---|
| EP | 848346 A2 * | 6/1998 | |
| EP | 1089198 A2 * | 4/2001 | |
| EP | 848346 B1 * | 5/2003 | |
| JP | 7-282088 A | 10/1995 | |
| JP | 8-255236 A | 10/1996 | |
| JP | 2001-101191 A | 4/2001 | |
| JP | 2001160070 A * | 6/2001 | |
| JP | 2003-178304 A | 6/2003 | |
| JP | 2003-242509 A | 8/2003 | |

OTHER PUBLICATIONS

Kise et al. "Text-Line Extraction as Selection of Paths in the Neighbor Graph" Springer Verlag Berlin 1999 DAS'98 pp. 225-240.*

Kise et al. "Page Segmentation Using Thinning of White Areas" 1998 Scripta Technica Systems and Computers Japan Vo. 29, No. 3, 1998, pp. 1-10.*

Kise et al. "Backgrounds as Information Carriers for Printed Documents" 2000 IEEE pp. 1-5.*

Kise et al. "Document Image Retrieval Based on 2D Density Distributions of Terms with Pseudo Relevance Feedback" Proc of the 7th International Conference (DAR'03) pp. 1-5.*

D, Doermann et al., Proc. ICDAR, (2003), pp. 606-616.

K. Kise et al., Technical Report of IEICE PRMU2004-246 (Mar. 2005), pp. 1-6.

K. Yamada et al., Information Proceedings, vol. 45, No. 9, Sep. 2004, pp. 923-927.

Y. Watanabe et al., Proc. ICPR, (1998), pp. 613-617.

K. Hannu, Academic Dissertation of University of Oulu, (1999), pp. 1-77.

J.J. Hull, Document Analysis Systems, (1995), pp. 379-396.

* cited by examiner

1: for all p ∈ {feature points} do
2:   $P_n$ ← The set of n points nearest to p (clockwise)
3:   for all $P_m$ ∈ {All possible sets of m points selected from $P_n$} do
4:     for all $P_5$ ∈ {All possible sets of 5 points selected from $P_m$} do
5:       for i=0 to 4 do
6:         $cr_i$ ← The cross-ratio calculated for $P_5$ starting at the i-th point
7:       end for
8:       $H_{index}$ ← The hash index calculated based on $cr_0,...,cr_4$ and $_mC_5$ pattern ID
9:       Store (document ID, point ID, $_nC_m$ pattern ID) in the hash table based on $H_{index}$.
10:    end for
11:  end for
12: end for

Fig. 13

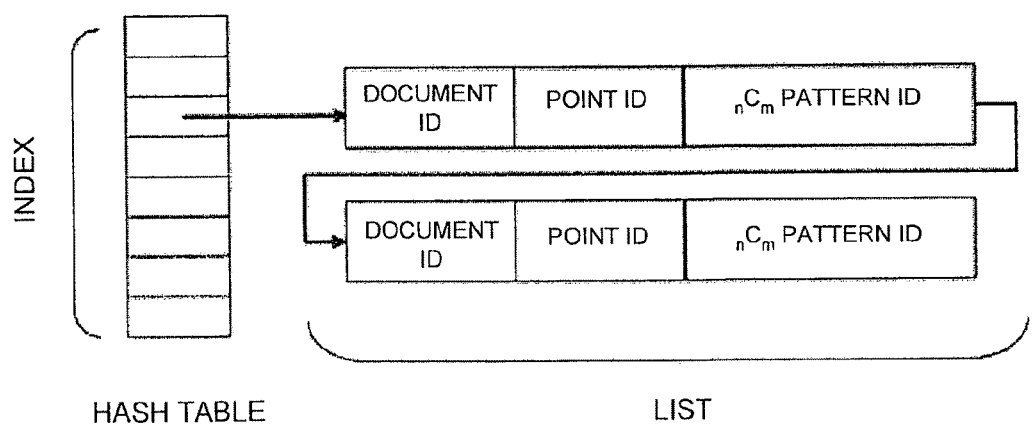

HASH TABLE          LIST

Fig.14

1: for all p ∈ {feature points} do
2:   $P_n$ ← The set of n points nearest to p (clockwise)
3:   for all $P_m$ ∈ {All possible sets of m points selected from $P_n$} do
4:     for all $P'_m$ ∈ {Cyclic permutations of $P_m$} do
5:       for all $P_5$ ∈ {All possible sets of 5 points selected from $P'_m$} do
6:         for i=0 to 4 do
7:           $cr_i$ ← The cross-ratio calculated for $P_5$ starting at the i-th point
8:         end for
9:         $H_{index}$ ← The hash index calculated based on $cr_0,...,cr_4$ and $_mC_5$ pattern ID
10:        Read the list from the hash table based on $H_{index}$ and vote in the primary voting table.
11:       end for
12:       If a cell having votes not less than the predetermined number is detected in the primary voting table, then vote for the corresponding document ID in the secondary voting table.
13:       Clear the primary voting table.
14:     end for
15:   end for
16: end for
17: Provide the retrieval result based on the secondary voting table.

Fig.17 reason is that mobile devices with digital cameras are now coming into common use. Some users have already utilized such devices for taking digital copies of documents, because it is much more convenient than writing memo [5]. This indicates that not only legacy documents but also new documents continue to be stored as document images.

In order to utilize such document images from the viewpoint of question answering, we have started a project of developing a QA system called "IQAS" (document Image Question Answering System) [4]. In this paper, we propose a method of document image retrieval for IQAS, by modifying our previous method [7,8]. The major contribution of this paper is a way of improving precision of spotting parts that include the answer to the question. The previous method, which is called the baseline method in this paper, employs *density distributions* of terms for retrieving appropriate parts of images. In this paper, new density distributions modified by taking into account the co-occurrence of successive terms in the question are introduced and tested by experiments on 1253 pages with 20 questions. The results of experiments show that the proposed method is superior to the baseline method.

2 Question Answering for Document Images

2.1 Task and Configuration

The task of QA is *precision oriented* in nature. This is because the user is satisfied not by having all documents containing the same correct answer, but by just receiving the correct answer once. In the QA task, the user is allowed to ask questions in natural language. Systems for electronic text developed so far have tackled the questions of seeking simple *facts* by using "who", "what", "which", "when" and "where". Questions using "why" and "how" generally require much longer and complicated answers and thus their processing is still an open problem.

In order to locate facts in documents, QA systems are generally based on the following configuration.

1. Query Processing : The question in natural language is analyzed to obtain both query terms and the type of question. Query terms are employed in the next step of processing. The type of question defines what the question asks about. For example, "location", "time" and "person" are typical types.

2. Document Retrieval : A document retrieval engine is employed to find documents which is likely to contain the answer. Passage retrieval, i.e., to retrieve small portions of text from documents, is often utilized in this step.

---

[3] In Japan, *digital shoplifting*, i.e., to make pictures of books and magazines in bookstores by mobile phones, has become an object of public concern.

[4] The pronunciation of the term IQAS is close to "Ikasu" in Japanese which have the two meanings: "to exploit" and "cool".

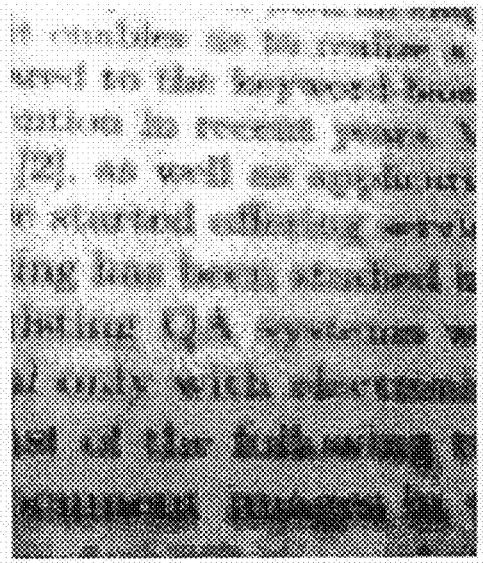

Fig.28

1: for all p ∈ {feature points} do
2:   $P_n$ ← The set of n points nearest to p (clockwise)
3:   for all $P_m$ ∈ {All possible sets of m points selected from $P_n$} do
4:     for all $P_5$ ∈ {All possible sets of 5 points selected from $P_m$} do
5:       $cr_i$ ← The cross-ratio calculated for $P_5$
6:     end for
7:     $H_{index}$ ← The hash index calculated based on $cr_0,...,cr_{{_mC_5}-1}$
8:     Store the document ID, the point ID and $cr_0,...,cr_{{_mC_5}-1}$ in the hash table based on $H_{index}$
9:   end for
10: end for

Fig.30

1: for all p ∈ {feature points} do
2:   $P_n$ ← The set of n points nearest to p (clockwise)
3:   for all $P_m$ ∈ {All possible sets of m points selected from $P_n$} do
4:     for all $P'_m$ ∈ {All possible cyclic permutations of points in $P_m$} do
5:       for all $P_5$ ∈ {All possible sequences of 5 points selected from $P'_m$} do
6:         $cr_i$ ← The cross-ratio calculated for $P_5$
7:       end for
8:       $H_{index}$ ← The hash index calculated based on $cr_0, ..., cr_{{}_mC_5-1}$
9:       Read the list from the hash table based on $H_{index}$ and vote in voting table.
10:      for all elements of list do
11:        If $cr_0, ..., cr_{{}_mC_5-1}$ match stored cross-ratios, and the number of votes for document ID for p is zero, and the number of votes for point ID of the document ID is zero, then
12:          Vote for the document ID in the voting table.
13:        end if
14:      end for
15:    end for
16:  end for
17: end for
18: Determine a retrieval result based on the voting table.

Fig. 38
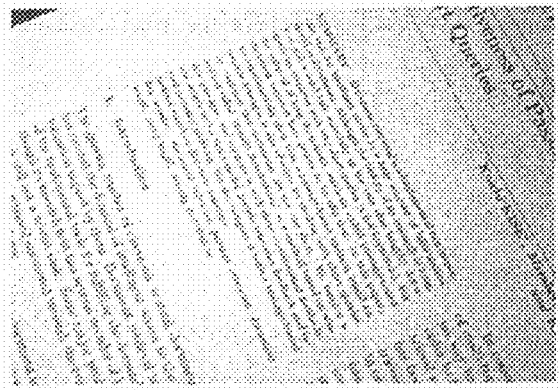
INPUT IMAGE
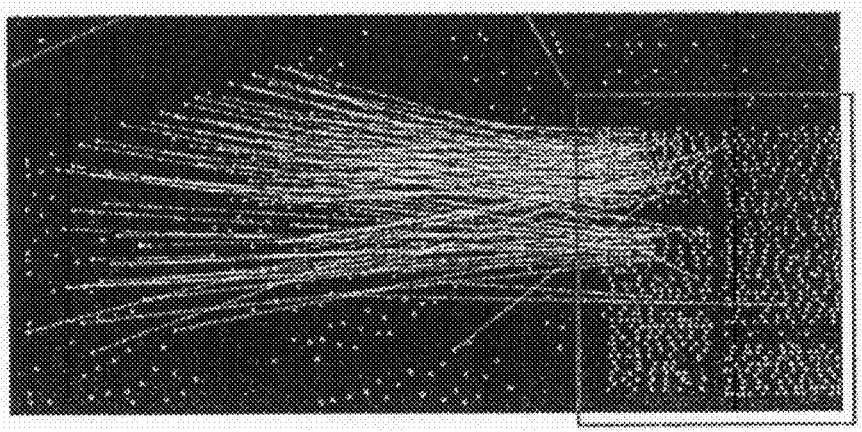
CORRELATION BETWEEN POINTS
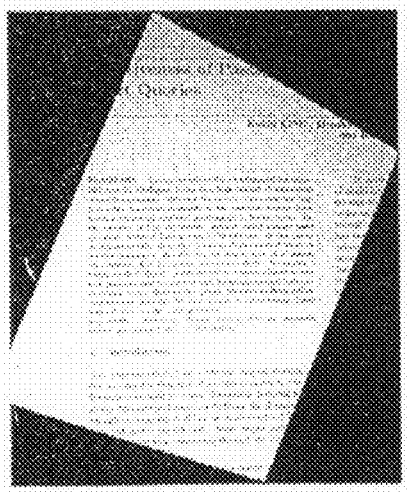
IMAGE IN CORRECT ORIENTATION $n$ nearest points of $p$ The arrangement of $m$ points

Fig.43

1: for all p ∈ {feature points} do
2:   $P_n$ ← The set of n points nearest to p
3:   for each $P_m$ ∈ {All possible sets of m points selected from $P_n$} do
4:     Provide a feature point sequence $L_m=(p_0,...,p_{m-1})$ by arbitrarily selecting point $p_0$ from $P_m$ and sequencing points of $P_m$ clockwise around p. Points $p_i$ are sequenced in increasing order of their subscript numbers.
5:     $(L_f(0),...,L_f(i),...,L_f(_mC_f-1))$ ← A list of all possible partial sequences $L_f$ arranged in lexicographic order, where each $L_f$ is produced by selecting f points from $L_m$
6:     for i=0 to $_mC_f-1$ do
7:       $cr_{(i)}$ ← The discrete value of the invariant calculated from $L_f(i)$
8:     end for
9:     $H_{index}$ ← The hash index calculated from equation (1)
10:    Store the document ID, the point ID and the invariant values $cr_{(0)},...,cr_{(_mC_5-1)}$ in the hash table based on $H_{index}$.
11:  end for
12: end for

Fig.44

1: for each p ∈ {feature points} do
2:  $P_n$ ← The set of n points nearest to p
3:  for each $P_m$ ∈ {All possible sets of m points selected from $P_n$} do
4:   for each $p_0$ ∈ $P_m$ do
5:    Provide a feature point sequence $L_m=(p_0,...,p_{m-1})$ which is the sequence of points in $P_m$ clockwise around p starting from the point $p_0$
6:    $(L_f(0),...,L_f(i),...,L_f(_mC_f-1))$ ← A list of all possible partial sequences $L_f$ arranged in lexicographic order, where each $L_f$ is produced by selecting f points from $L_m$
7:    for i=0 to $_mC_f-1$ do
8:     $cr_{(i)}$ ← The discrete value of invariant calculated from $L_{f(i)}$
9:    end for
10:   $H_{index}$ ← The hash index calculated from equation (1)
11:   Access the hash table based on $H_{index}$ to provide the list.
12:   for each element of the list do
13:    if the conditions for prevention of erroneous correspondences are satisfied,
      then
14:     Vote for the document ID.
15:    end if
16:   end for
17:  end for
18:  end for
19: end for
20: Calculate the score for each document from equation (2) based on the number of votes.
21: Determine the document having the largest score to provide a retrieval result.

(a) QUERY 1 (60 degrees)  (b) QUERY 2 (45 degrees)  (c) QUERY 3 (30 degrees)

(a) Photographing angle of 90 degrees
(b) Photographing angle of 60 degrees
(c) Photographing angle of 45 degrees
(d) Photographing angle of 30 degrees Fig. 55
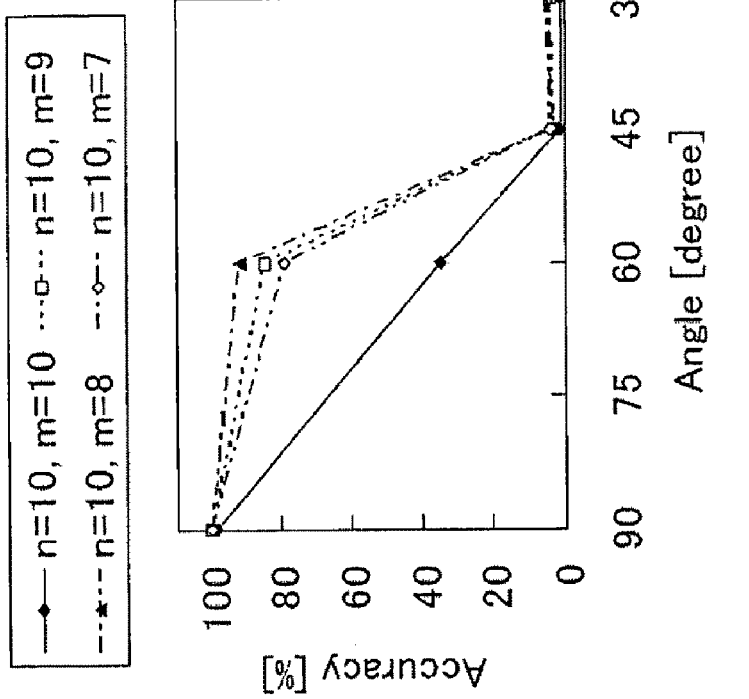
(a) CROSS-RATIO
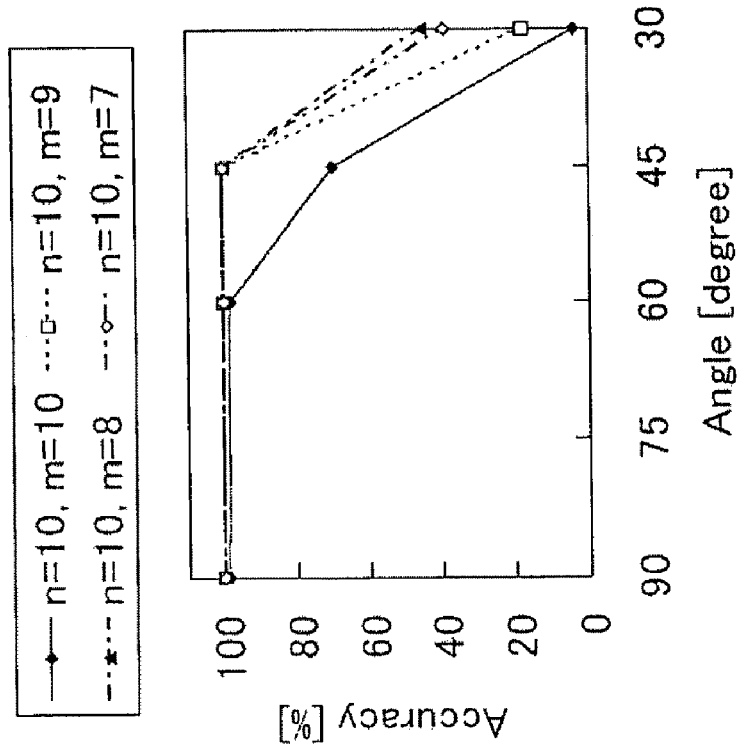
(b) SIMILARITY INVARIANT Fig. 57
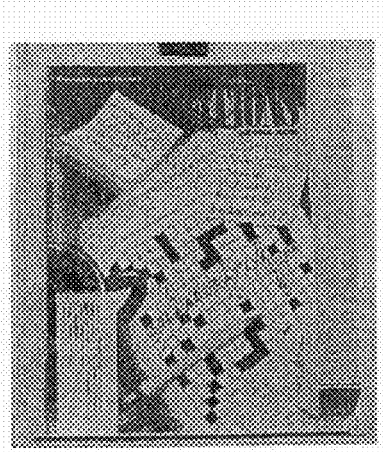
(a) stored image
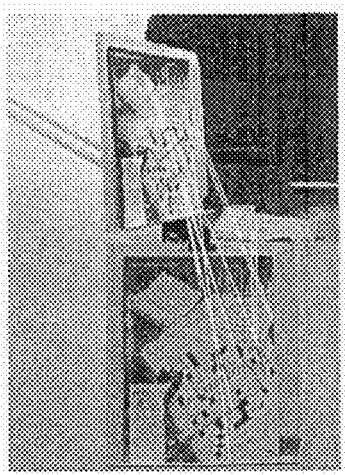
(b) 45 deg.
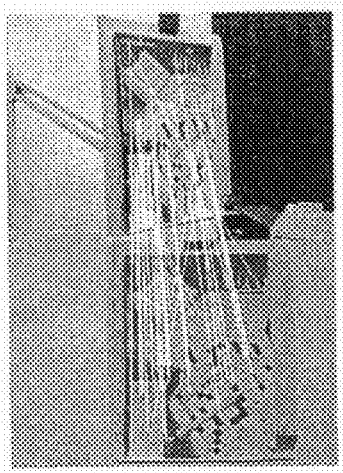
(c) 60 deg.
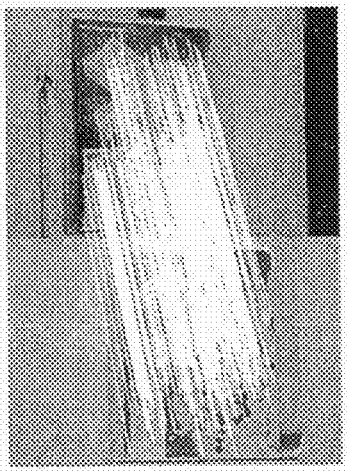
(d) 75 deg.
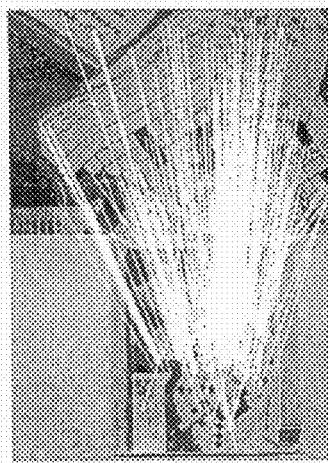
(e) large
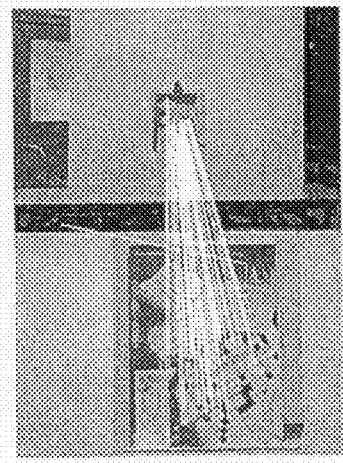
(f) small

METHOD, PROGRAM AND APPARATUS FOR STORING DOCUMENT AND/OR IMAGE USING INVARIANT VALUES CALCULATED FROM FEATURE POINTS AND METHOD, PROGRAM AND APPARATUS FOR RETRIEVING DOCUMENT BASED ON STORED DOCUMENT AND/OR IMAGE

TECHNICAL FIELD

The present invention relates to a document/image retrieval method utilizing a digital camera, a scanner or the like, a program therefor, a document/image storage apparatus and a retrieval apparatus.

BACKGROUND ART

Popularization, multifunctionalization and downsizing of digital cameras bring new possibilities in the field of pattern recognition and media understanding. One of such possibilities is that an image acquired by a user is linked to any of various services. Such possibilities are unexceptionally present in the field of characters and documents. Intensive researches are conducted into camera-based character recognition and document/image analysis (see, for example, Non-Patent Documents 1 and 2). Particularly, interfaces utilizing digital cameras attached to mobile phones are important, and a variety of processes such as a character reading process and a translation process utilizing the interfaces are now under consideration (see, for example, Non-Patent Documents 3 and 4).

Prior art methods of retrieving image-based document/image data, i.e., a document and/or image, are as follows. In the Kauniskangas method, documents and/or images are each divided into paragraph regions and graphic regions, which are classified and expressed in a tree structure. For retrieval, the degrees of matching between a query and the respective regions of the documents and/or images in a database are determined, and an image having the highest matching degree is output as a retrieval result (see, for example, Non-Patent Document 5). Hull discloses a document indexing method and a retrieval method based on the number of characters of each word, and an image indexing method utilizing an invariant.

There is also disclosed a method, in which a text of a document is divided on a word-by-word basis, and the document is expressed by features defined by a sequence of the numbers of characters of the respective words. Features are preliminarily calculated for respective portions of a document in a database, and stored in a hash table. For retrieval of an input image, features are calculated for the input image in the same manner. The retrieval is achieved by accessing the hash based on the features of the input image and voting (see, for example, Patent document 1 and Non-Patent Document 6).

The methods described above deal with a high-resolution correct-orientation image obtained by a flat bed scanner or the like. Therefore, these methods cannot be employed for digital camera-based document/image retrieval which is dealt with by the present invention. The hull methods, for example, are based on the assumption that characters are separable in the input image. This assumption is not satisfied in the case of a lower-definition image or an image subjected to a geometric transformation such as a projective transformation which is dealt with by the present invention.

Patent document 1: JP-A-7(1995)-282088
Non-Patent Document 1: D. Doermann, J. Liang and H. Li, "Progress in Camera-Based Document Image Analysis", Proc. ICDAR '03, pp. 606-616 (2003)
Non-Patent Document 2: K. Kise, S. Omachi, S. Uchida, M. Iwamura, "Current Status and Future Prospects of Camera-Based Character Recognition and Document Image Analysis", Technical Report of the IEICE, PRMU2004-246 (2005.3)
Non-Patent Document 3: K. Yamada, S. Senda, "Ubiquitous Information Interface Using Mobile Camera", Information Processing, 45, 9, pp. 923-927 (2004)
Non-Patent Document 4: Y. Watanabe, Y. Okada, Y-B. Kim, T. Takeda, "Translation Camera", Proc. ICPR '98, pp. 613-617 (1998)
Non-Patent Document 5: K. Hannu, "Document Image Retrieval with Improvements in Database Quality", Academic Dissertation of University of Oulu (1999)
Non-Patent Document 6: J. J. Hull, "Document Image Matching and Retrieval with Multiple Distortion-Invariant Descriptors", Document Analysis Systems, pp. 379-396 (1995)

DISCLOSURE OF THE INVENTION

Problems to be Solved by the Invention

The present invention is directed to providing a method of retrieving a document/image from a document/image database by using a document/image captured by a digital camera, a scanner or the like as a query. Problems associated with this are as follows:

(1) The document/image of the query, which is captured by the digital camera, the scanner or the like, suffers from a distortion caused by a geometric transformation such as a projective transformation, and does not necessarily contain the entire document. Further, the query image significantly differs in resolution and lighting conditions from a document/image stored in the database. This further complicates the problem. In other words, the document/image of the query is often recognized to be different from the document/image stored in the database depending on a photographing angle. This makes it difficult to judge the identicalness of objects in the images. Therefore, a method capable of accommodating the difference in photographing angle is desired.

(2) In order to precisely check the feature of the image, a greater number of elements should be extracted from the image to define the feature. With the greater number of elements, however, considerable time is required for the judgment of the identicalness. Therefore, a method is desired, which does not require the considerable time for the judgment of the identicalness.

(3) Where a multiplicity of documents and/or images are dealt with, a greater number of similar documents and/or images are present. It is difficult to extract a correctly matching image from the similar documents and/or images. Therefore, a method is desired, which is capable of highly accurately judging the identicalness of the image extracted from the similar documents and/or images.

Means for Solving the Problems

To solve the problems, the following ideas are introduced into the present invention.

(1) In order to provide a feature of a document/image free from influences of a distortion due to a geometric transformation, an invariant with respect to the geometric transformation is employed for calculation of the feature. In the present invention, one example of the invariant is a cross-ratio. The cross-ratio is a value calculated based on collinear four points or coplanar five points, and known as an invariant with respect to a projective transformation which is one type of the geometric transformation. Where the cross-ratio is employed, the feature of the document/image of interest should be defined by points (feature points). In the case of an English document, for example, centroids of words are employed as the feature points for the calculation of the cross-ratio. In order to permit retrieval with a part of image, the features are calculated based on cross-ratios calculated for each part of the document/image. In addition to the projective transformation, an affine transformation and a similarity transformation are taken into consideration.

(2) There are a tremendous number of possible combinations of the feature points and, therefore, it is not practical to consider correspondences of all the possible combinations of the feature points. In the present invention, therefore, a voting process utilizing a hash is employed for the retrieval without the explicit correspondences of the feature points. In storage, a feature is calculated based on feature points extracted from a document/image, and stored in the hash table on the basis of an index determined based on the feature. In retrieval, feature points, a feature and an index for a query are determined in the same manner, and the hash table is accessed for voting for stored documents and/or images. The voting process, which is a conventionally known concept, has rarely been employed for the document/image retrieval.

(3) Where the identicalness of images is checked based on the values of cross-ratios, feature points on which the calculation of the cross-ratios is based should have correspondences between the images. However, when N points extracted from each of the images are correlated with each other, there are N! combinations. To ensure sufficient judgment accuracy, a sufficiently great number of feature points should be employed. However, this leads to an excessively great computational complexity.

A great computational complexity $O(N^3)$ in the geometric hashing method is one of motivations for the Hull's invention. It is stated that three or four or more feature points (interest points) are used to provide an invariant with respect to rotation and scaling (similarity-invariant to be described later). However, even if the Hull method is employed, three points are extracted from the N feature points in $O(N^3)$ different combinations and, therefore, the number of the combinations is substantially equal to that in the conventional method. Therefore, it is not clear how much the computational complexity is reduced as compared with the conventional methods. Hence, a method is desired which reduces the computational complexity as compared with the conventional methods.

Here, $O(N)$ and $O(N^3)$ each represent an approximate computational complexity required for the solution. Where N is specified, $O(N)$ indicates that the computational complexity is not greater than $aN+b$, and $O(N^3)$ indicates that the computational complexity is not greater than $aN^3+bN^2+cN+d$ (wherein a, b, c, d are constants).

According to the present invention, a feature is defined for a region around a certain feature point of interest. That is, n points nearest to the point of interest are extracted from the region. If m points (on the basis of which a cross-ratio is calculated, 4 or 5<m<n) are selected from the n points, a match may be found in some of the resulting m-point sets from the n nearest points even under a geometric transformation. Therefore, all possible m-point sets from n points nearest to each of the feature points are checked. By properly selecting the numbers n and m, the tremendous amount of computation can be avoided. In the present invention, where an invariant with respect to the similarity transformation is employed as in the Hull method, the computational complexity is reduced from $O(N^3)$ to $O(N)$. Where an invariant with respect to the projective transformation is employed, the computational complexity is reduced from $O(N^5)$ to $O(N)$. Where an invariant with respect to the affine transformation is employed, the computational complexity is reduced from $O(N^4)$ to $O(N)$.

Where cross-ratios are calculated based on sets of four or five points selected from the m points, there is a possibility that some of the cross-ratios are equal to those of other images, but it is extremely rare that a match is found in all the cross-ratios. As a result, the identicalness can be highly accurately judged.

In other words, the present invention provides a feasible retrieval method which employs a different recognition process from the prior art. More specifically, a document/image captured by a digital camera, a scanner or the like is partly or entirely employed as a "query", and a document/image containing the query is retrieved from a database. Such a retrieval process may be employed for retrieval of an electronic document corresponding to printed matter at hand or as a preprocessing for extracting an annotation in printed matter.

The document/image retrieval utilizing the digital camera significantly differs from the prior art document/image retrieval in that an image suffers from various types of distortions. In the prior art, a geometric distortion experienced by a document/image obtained by the scanner under ideal conditions is a rotational distortion generally occurring due to the similarity transformation. In contrast, the document/image captured by the digital camera suffers from a distortion occurring due to the projective transformation. Where a document/image on a three-dimensional object such as a book is captured by the scanner, for example, at least a part of the image suffers from a distortion occurring due to the affine transformation or the similarity transformation. In consideration of the properties of the digital camera (particularly, a digital camera attached to a mobile phone) and a small-scale scanner, it is desirable that a part of the document/image can also be employed as the query for the retrieval (image retrieval based on a part of an image is possible).

To this end, the aforementioned two ideas are incorporated in the present invention. One of the ideas is to employ the cross-ratio, which is invariant to the geometric transformation, for indexing the document/image. Cross-ratios are calculated based on different portions of the document/image, and employed for indexing, thereby permitting the retrieval based on a part of an image. The other idea is to employ the voting process utilizing the hash for the retrieval. This makes it possible to flexibly perform the retrieval at a relatively high speed without explicitly correlating the feature points.

In the field of computer vision, the cross-ratio is often used as an invariant with respect to various types of transformations. A cross-ratio for collinear points ABCD on the same plane as shown in FIG. 1 is calculated from the following equation:

$$\frac{\left(\frac{AC}{BC}\right)}{\left(\frac{AD}{BD}\right)} \qquad \text{[Equation 1]}$$

Further, a cross-ratio can be calculated for linearly aligning four points obtained from five coplanar points as shown in FIG. 2. Here, the cross-ratio for points ABCDE is calculated as a cross-ratio for points A'B'C'D'. Further, an invariant for five coplanar points expressed as follows is also known.

$$\frac{P(A, B, C)P(A, D, E)}{P(A, B, D)P(A, C, E)}$$ [Equation 2]

Here, P(A,B,C) is an area of a triangle defined by vertices A, B, C. In the present invention, features unique to a document/image is calculated based on such cross-ratios, and employed for the retrieval of the document/image.

Invariants with respect to the geometric transformations (geometric invariants) other than the cross-ratio may be used. The geometric invariants are kept unchanged even under the geometric transformations, and there are various types of geometric invariants depending on the types of the geometric transformations.

In other words, the feature is calculated based on a geometric invariant determined based on f coplanar points. The number of the points f required for the calculation of the geometric invariant varies depending on the type of the invariant. Examples of the geometric invariant will be described below.

1. Cross-ratio: As described above, the cross-ratio is an invariant with respect to the projective transformation, and calculated as {P(A,B,C)P(A,D,E)/P(A,B,D)P(A,C,E)} based on coordinates of the five coplanar points ABCDE (f=5). Since the cross-ratio is a projective invariant, its value is kept unchanged even if the coordinates of the points ABCDE change due to a projective distortion.

2. Affine invariant: The affine invariant is an invariant with respect to the affine transformation. The affine transformation, which preserves the parallelism of lines, is more restrictive than the projective transformation. Considering a limited local area on a plane subjected to the projection transformation, the projective transformation is approximated to the affine transformation. Therefore, it is conceivably possible to employ the affine invariant instead of the cross-ratio in the inventive method based on locally arranged points.

The affine invariant is calculated, for example, as P(A,C,D)/P(A,B,C) based on coordinates of four coplanar points ABCD (f=4).

3. Similarity invariant: The similarity transformation, which is based only on scaling, rotation and translation, is further more restrictive than the affine transformation. In the similarity transformation, an angle defined between lines, a distance ratio, and the ratio of an area to the square of a distance are invariant. For example, a distance ratio calculated as AC/AB for three points ABC (f=3) may be employed.

Invariant values obtained based on the feature points in the image are continuous, and should be discretized for indexing. In one preferred method, the invariant values are quantized to k levels, which are determined by preparing a histogram of the invariant values obtained based on the feature points in a preliminary experiment and assigning discrete values to the invariant values according to the frequency of occurrence of the invariant values in the histogram.

Based on the aforementioned ideas, the present invention provides a document/image retrieval method for retrieving a document/image based on a captured digital image from a database in which document/image information is stored, the method comprising: extracting feature points from the captured image; determining a feature of the captured image based on an invariant value for the feature points; and retrieving a document/image corresponding to the digital image from the document/image information stored in the database by voting for a document/image having a feature matching the feature of the digital image.

The feature points may be specific parts repeatedly appearing in the captured image.

The feature points may be centroids of word regions. Where a document is written in a language such as English and contains word regions isolated from each other, the feature of the document can be accurately identified by employing the centroids of the word regions as the feature points.

The feature points may be centroids of connected components of black pixels to be described later.

The feature points may be holes of Kanji characters. Even if a document is written in a language such as Japanese and contains word regions not isolated from each other, the feature of the document can be accurately identified by employing the holes of the Kanji characters as the feature points.

The invariant value may be a cross-ratio. By employing the cross-ratio, an original image can be retrieved based on an image subjected to a geometric transformation.

A digital photographing method utilizing a digital camera or a scanner may be employed.

The feature may be a value which is calculated based on an invariant value calculated for a set of feature points selected from each of local feature point sets.

Thus, the feature is calculated based on each of the local feature point sets, so that the computational complexity can be reduced as compared with the case in which invariant values are calculated for all possible combinations of the feature points. Therefore, the processing time required for the judgment of the identicalness is reduced. Since the calculation of the feature is based on each of the local feature point sets, it is possible to perform the retrieval based on a part of an image.

Alternatively, the feature may be a feature calculated based on multiple invariant values respectively determined for sets of feature points selected from each of the local feature point sets, thereby ensuring higher discriminability. With this arrangement, a set of cross-ratios is employed as the feature, making it possible to accurately judge the identicalness of similar documents and/or images.

The present invention provides a document/image storage method, which causes a computer to execute the steps of: inputting a document/image; assigning an ID to the input document/image; extracting feature points defining an image arrangement from the input document/image; and performing a predetermined process on each of the extracted feature points; the predetermined process including the steps of (1) selecting n feature points which are nearest to a feature point p of interest, and (2) performing a predetermined process on each of all possible sets of m feature points (m<n) selected from the selected n feature points; the predetermined process in the step (2) including the steps of (a) determining features for all possible sets of d points (wherein d is a number (e.g., 4 or 5) not greater than a predetermined number m) selected from an m-point set of interest, (b) determining an index of a hash table based on the determined features through a predetermined computation, and (c) storing the features in relation to a point ID and a document ID in the hash table, the features being determined in the step (a) using the determined hash index, the point ID being assigned to the feature point p and the document ID being assigned to the document/image from which the feature point p is extracted.

In this storage method, the n feature points nearest to each feature point p are defined as a local set, and the features are calculated for each of the m-point sets from the local set. Therefore, the number of the m-point sets for which the features are calculated is reduced as compared with the case in which the m points are selected from all the feature points. Thus, the time required for the calculation is reduced. Further, this method permits the retrieval based on a part of an image.

Since the features are determined for all the possible sets of d points selected from the m feature points, the discriminability of the features is improved.

The features may consist of cross-ratios determined for cyclic permutations of five feature points in each of all possible five-point sets from the m feature points.

In the step (b), the hash index may be calculated based on the features from the following equation:

$$H_{index} = \sum_{n=0}^{4} cr_n(V_{max}+1)^n + pat(V_{max}+1)^5 \qquad \text{[Equation 3]}$$

wherein $cr_n$ (n=0 to 4) is five discrete cross-ratio values, $V_{max}$ is the greatest one of the discrete cross-ratio values, and pat is a combination pattern ID which is assigned to each of the five-point sets from the m points and takes a value of 0 to $_mC_5-1$.

In the step (b), the hash index may be calculated based on the features from the following equation:

$$H_{index} = \left(\sum_{n=0}^{_mC_5-1} cr_n k^n\right) \bmod H_{size} \qquad \text{[Equation 4]}$$

wherein k is the number of levels for quantization of the cross-ratios, $H_{size}$ is the size of the hash table, and $cr_n$ is the cross-ratio values for the five-point sets from the m points.

The present invention provides a document/image retrieval method for retrieving a document/image stored by the aforementioned storage method, the retrieval method causing a computer to execute the steps of: reading a captured image; extracting feature points defining an image arrangement from the read image; and performing a predetermined process on each of the extracted feature points; the predetermined process including the steps of (1) selecting n feature points which are nearest to a feature point p of interest, and (2) performing a predetermined process on each of all possible sets of m feature points (m<n) selected from the selected n feature points; the predetermined process in the step (2) including the steps of (a) determining features for all possible sets of d points (wherein d is a number (e.g., 4 or 5) not greater than a predetermined number m) selected from an m-point set of interest, (b) determining an index of a hash table based on the determined features through a predetermined computation, and (c) acquiring features of a preliminarily input document/image from the hash table based on the determined hash index, comparing the features determined in the step (a) with the acquired features, and voting for a document ID having matching features; and, after the steps (1) and (2), specifying a document ID of a document/image which matches the captured image based on a voting result.

In this retrieval method, the n feature points nearest to each of the feature points p are defined as a local set, and the features are calculated for each of the m-point sets from the local set. Therefore, the number of the m-point sets for which the features are calculated is reduced as compared with the case in which the m points are selected from all the feature points. Thus, the time required for the calculation is reduced. Further, this method permits the retrieval based on a part of an image.

Since the features are determined for all the possible sets of d points selected from the m feature points, the discriminability of the features is improved.

The features may be cross-ratios determined for cyclic permutations of five feature points in each of all possible five-point sets from the m feature points.

In the step (b), the hash index may be calculated based on the features from the following equation:

$$H_{index} = \sum_{n=0}^{4} cr_n(V_{max}+1)^n + pat(V_{max}+1)^5 \qquad \text{[Equation 5]}$$

wherein $cr_n$ (n=0 to 4) is five discrete cross-ratio values, $V_{max}$ is the greatest one of the discrete cross-ratio values, and pat is a combination pattern ID which is assigned to each of the five-point sets from the m points and takes a value of 0 to $_mC_5-1$.

In the step (b), the hash index may be calculated based on the features from the following equation:

$$H_{index} = \left(\sum_{n=0}^{_mC_5-1} cr_n K^n\right) \bmod H_{size} \qquad \text{[Equation 6]}$$

wherein k is the number of levels for quantization of the cross-ratios, $H_{size}$ is the size of the hash table, and $cr_n$ is the cross-ratio values for the five-point sets from the m points.

The document/image storage method and the document/image retrieval method may be implemented, for example, by a general purpose personal computer.

According to another aspect of the present invention, there is provided a program, which causes a computer to perform a process for retrieving document/image data corresponding to a captured image from a database which stores documents and/or images, the process comprising: extracting feature points from the captured image; determining features of the image based on invariant values for each of the feature points; and voting for a document/image having a feature matching the determined feature in the database.

The present invention further provides a document/image storage program, which causes a computer to execute the steps of: inputting a document/image; assigning an ID to the input document/image; extracting feature points defining an image arrangement from the input document/image; and performing a predetermined process on each of the extracted feature points; the predetermined process including the steps of (1) selecting n feature points which are nearest to a feature point p of interest, and (2) performing a predetermined process on each of all possible sets of m feature points (m<n) selected from the selected n feature points; the predetermined process in the step (2) including the steps of (a) determining features for all possible sets of d points (wherein d is a number (e.g., 4 or 5) not greater than a predetermined number m) selected from an m-point set of interest, (b) determining an index of a hash table based on the determined features through a predetermined computation, and (c) storing the features in relation to a point ID and a document ID in the hash table, the features being determined in the step (a) using the determined hash index, the point ID being assigned to the feature point p and the document ID being assigned to the document/image from which the feature point p is extracted.

The present invention further provides a document/image retrieval program for retrieving a document/image input employing the aforementioned storage program, the retrieval program causing a computer to execute the steps of: reading a captured image; extracting multiple feature points defining an image arrangement from the read image; and performing a predetermined process on each of the extracted feature points; the predetermined process including the steps of (1) selecting n feature points which are nearest to a feature point p of interest, and (2) performing a predetermined process on each of all possible sets of m feature points (m<n) selected from the selected n feature points; the predetermined process in the step (2) including the steps of (a) determining features for all possible sets of d points (wherein d is a number (e.g., 4 or 5) not greater than a predetermined number m) selected from an m-point set, (b) determining an index of a hash table based on the determined features through a predetermined computation, and (c) acquiring features of a preliminarily input document/image from the hash table based on the determined hash index, comparing the features determined in the step (a) with the acquired features, and voting for a document ID having matching features; and, after the steps (1) and (2), specifying a document ID of a document/image which matches the captured image based on a voting result. The present invention further provides a document/image storage apparatus and a retrieval apparatus.

The document/image storage program and the document/image retrieval program may be executed, for example, on a general purpose personal computer.

According to further another aspect of the present invention, there is provided a document/image storage apparatus, which includes: an input section which inputs a document/image; a feature point extracting section which extracts feature points defining an image arrangement from the input document/image; a feature point selecting section which selects n feature points nearest to an extracted feature point p of interest; and a feature storing section which performs a predetermined process on each of all possible sets of m feature points (m<n) selected from the selected n feature points, the predetermined process including the steps of (a) determining features for all possible sets of d points (wherein d is a number (e.g., 4 or 5) not greater than a predetermined number m) selected from an m-point set of interest, (b) determining an index of a hash table based on the determined features through a predetermined computation, and (c) storing the features in relation to a point ID and a document ID in the hash table, the features being determined in the step (a) using the determined hash index, the point ID being assigned to the feature point p and the document ID being assigned to the document/image from which the feature point p is extracted.

The document/image storage apparatus may employ a general purpose personal computer as hardware. In this case, the input section includes a communication I/F for communication with an external device for transfer of document/image data, and a drive (e.g., a DVD drive or a CD drive) for reading and writing data with respect to recording media which store data, or a scanner which reads an image. Functions of the feature point extracting section, the feature point selecting section and the feature storing section are performed by causing a CPU of the personal computer to execute an installed application program. Alternatively, these functions may be performed by dedicated hardware employing a DSP and an ASIC.

Further, the present invention provides a document/image storage apparatus which stores a document/image stored by the storage apparatus.

The document/image storage apparatus employs a general purpose file server as hardware.

The present invention further provides a document/image retrieval apparatus for retrieving a document/image stored in the aforementioned document/image storage apparatus, the retrieval apparatus comprising: a reading section which reads a captured image; a feature point extracting section which extracts feature points defining an image arrangement from the read image; a feature point selecting section which selects n feature points nearest to an extracted feature point p of interest; and a voting section which performs a predetermined process on each of all possible sets of m feature points (m<n) selected from the selected n feature points, the predetermined process including the steps of (a) determining features for all possible sets of d points (wherein d is a number (e.g., 4 or 5) not greater than a predetermined number m) selected from an m-point set of interest, (b) determining an index of a hash table based on the determined features through a predetermined computation, and (c) acquiring features of a preliminarily input document/image from the hash table based on the determined hash index, comparing the features determined in the step (a) with the acquired features, and voting for a document ID having matching features; and a document ID specifying section which specifies a document ID of a document/image which matches the captured image based on a voting result determined by votes corresponding to the respective feature points.

The document/image retrieval apparatus may employ a general purpose personal computer as hardware. In this case, the reading section includes a communication I/F for receiving a captured image, and an I/F for reading data from a recording medium such as SD Card (stored trade mark) or Memory Stick (stored trade mark) in which the captured image is recorded. Functions of the feature point extracting section, the feature point selecting section and the voting section are performed by causing a CPU of the personal computer to execute an installed application program. Alternatively, these functions may be performed by dedicated hardware employing a DSP and an ASIC.

The document/image retrieval apparatus may have a function as the document/image storage apparatus. Alternatively, the document/image retrieval apparatus may also function as the document/image storage apparatus. The document/image retrieval apparatus may also function as the document/image storage apparatus and the document/image storage apparatus.

The term "document" is herein defined as text information to be accumulated in a database and retrieved from the database. Examples of the document include business documents such as contract documents and brochures, science and technical papers, newspapers and catalogs. The term "images" is herein defined as non-text pattern information to be photographed, accumulated in a database and retrieved from the database. Examples of the images include figures, drawings, photographs and posters. Documents and/or images fall within the category of images.

The term "connected component" is herein defined as a group of pixels connected to each other in an image. More specifically, where pixels are present in vertically and laterally adjoining relation to one pixel, these pixels are connected to each other to form a connected component. The term "feature point" is herein defined as each of points which represent the feature of an image and are extracted through image processing. The term "invariant" is herein defined as a generic term indicating a quantity that is invariant to a geometric transformation. One example of the geometric transformation is rotation. Even if an image is rotated, the area of an object in the image does not change. Therefore, the area of the object is an exemplary invariant with respect to the rotation. Further, the length ratio of edges is an exemplary invariant with respect to scaling. Examples of the geometric transformation include a projective transformation and an affine transformation in addition to a similarity transformation such as the rotation and the scaling.

The term "voting" is herein defined as a process to be employed for counting partial evidences in the field of information processing. In this process, more specifically, scores are given to alternatives based on acquired evidences, and one of the alternatives having the highest cumulative score is selected. In general, the evidences have different scores.

Further, the term "query" is herein defined as data indicating a user's retrieval request. In the present invention, the user inputs an image as the query. That is, the user inputs the query image with the intention of retrieving an image matching the query image from a database.

Effect of the Invention

According to the present invention, feature points are extracted from an image captured by a digital camera, a scanner or the like, and invariant values are calculated based on the feature points for retrieval of a document/image. Thus, an intended document/image is accurately retrieved.

BRIEF DESCRIPTION OF THE DRAWINGS

FIG. 5 is an explanatory diagram illustrating a binary image from FIG. 4.

FIG. 12 is a diagram for explaining a procedure for a storage process according to the present invention (Embodiment 1).

FIG. 13 is a diagram for explaining the structure of a hash table according to the present invention (Embodiment 1).

FIG. 14 is a diagram for explaining a procedure for a retrieval process according to the present invention (Embodiment 1).

FIG. 17 is an explanatory diagram illustrating an image in a database according to the present invention.

FIG. 18 is an explanatory diagram illustrating another image in a database according to the present invention.

Figure 21:
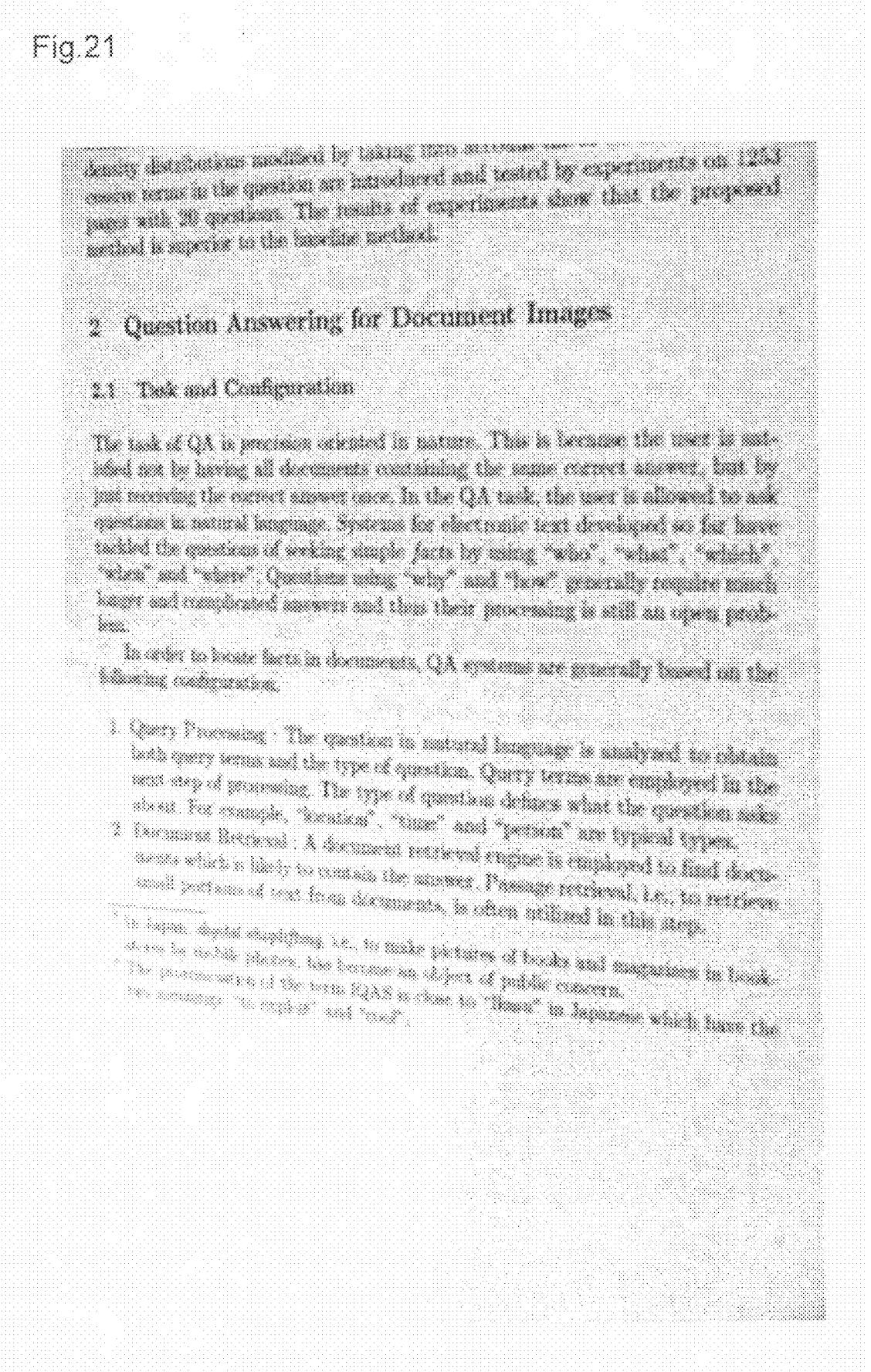

FIG. 21 is an explanatory diagram illustrating further another exemplary captured image employed in Experiment 1 in the present invention.

FIG. 27 is an explanatory diagram illustrating further another exemplary captured image employed in Experiment 2 in the present invention.

FIG. 28 is a diagram for explaining a procedure for a storage process according to the present invention (Embodiment 2).

FIG. 30 is a diagram for explaining a procedure for a retrieval process according to the present invention (Embodiment 2).

FIG. 38 is diagrams for explaining how to bring a captured image into a correct orientation.

FIG. 43 is a diagram for explaining a storage procedure different from that shown in FIG. 28 (Embodiment 2).

FIG. 44 is a diagram for explaining a retrieval procedure different from that shown in FIG. 30 (Embodiment 2).

FIG. 55 is graphs illustrating relationships between a photographing angle and retrieval accuracy with different parameters (further another experiment).

FIG. 57 is a drawing for explaining an exemplary process to be performed on non-textual images by employing the inventive method (d=16, n=28, m=1) (further another experiment).

DESCRIPTION OF REFERENCE CHARACTERS

Figure 1:
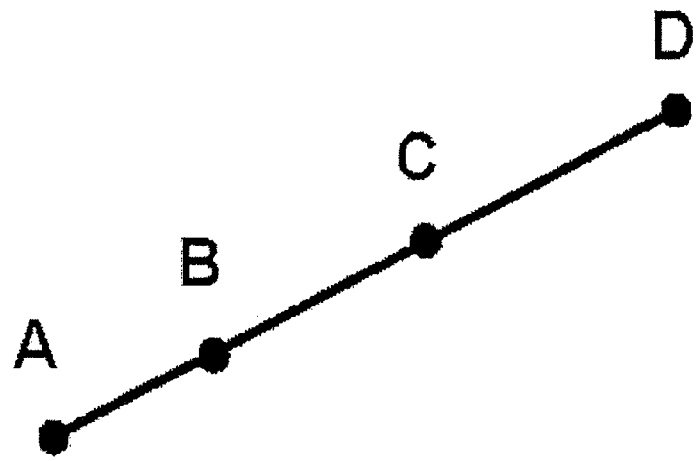
FIG. 1 is a diagram for explaining an example of a cross-ratio according to the present invention.
Figure 2:
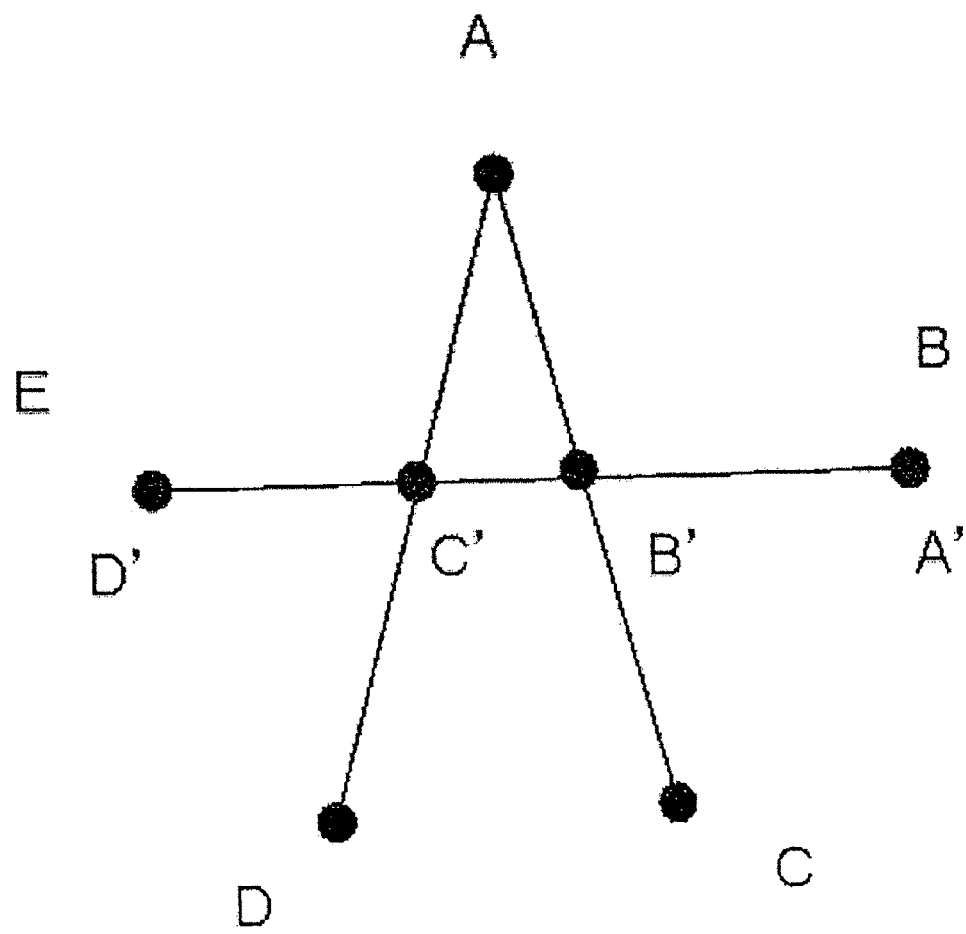
FIG. 2 is a diagram for explaining another example of a cross-ratio according to the present invention.

1: Document/image storage apparatus
3: Retrieval apparatus
11: Input section
15: Feature point extracting section
17: Feature point selecting section
19: Feature point storing section
21: Reading section
23: Feature point extracting section
25: Feature point selecting section
27: Voting section
29: ID specifying section
31: Document/image database

BEST MODE FOR CARRYING OUT THE INVENTION

Figure 3:
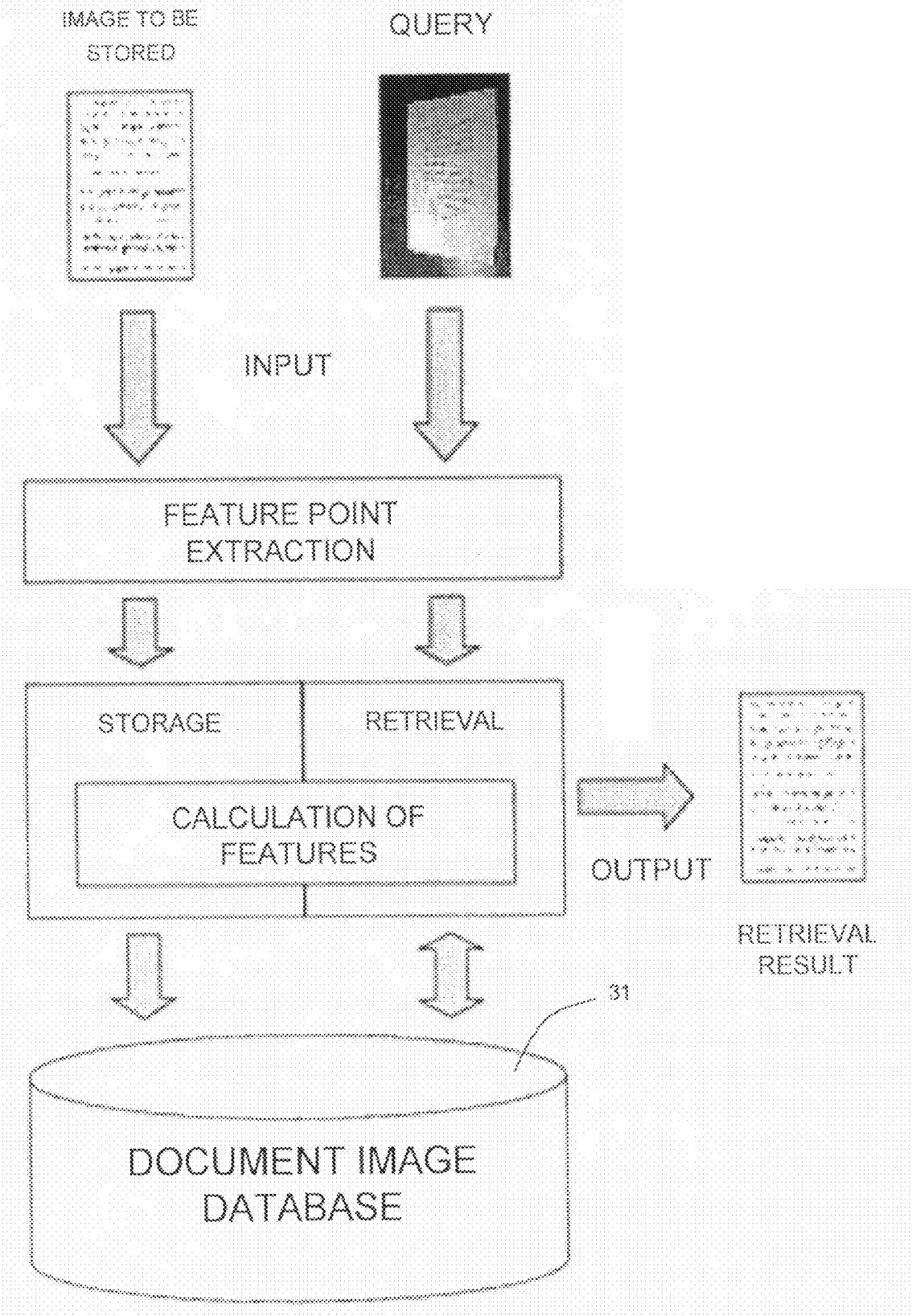
FIG. 3 is a block diagram illustrating a document image retrieval system to be used in the present invention.

The construction of a document/image retrieval system according to the present invention is shown in FIG. 3. A document/image is converted into a set of points by extraction of feature points. Then, the set of points is input to a storage process for storage, or input to a retrieval process for retrieval. In the storage process, cross-ratios are calculated based on the feature points and converted into indices, on the basis of which the document image is stored in a hash table. In the retrieval process, on the other hand, indices are calculated based on the feature points in the same manner, and an indented document/image is retrieved by voting.

The hash permits high speed access to data in a database. A key is defined for data to be stored in the hash table, and the data is stored at a location (address) calculated based on the key. More specifically, a hash table, which is a table of an array indexed by such keys, is prepared, and pointers to lists of data are stored in respective elements of the hash table. An index of the hash table is calculated from the key, and the data is stored in an address which is defined by a pointer determined based on the calculated index with reference to the hash table. A function for converting the key into the index of the hash table is a hashing function. When stored data is to be retrieved, an index of the hash table is determined based on the key from the hash function, and a pointer stored in an element of the hash table referred to based on the determined index is employed for the retrieval of the data.

The steps of the processes will hereinafter be described.

Extraction of Feature Points

What is important for the extraction of feature points is the reproducibility of the feature points. That is, the feature points should be obtained identically even under influences of geometric transformations, noises and a lower resolution. Centroids of respective words in an English document are employed as the feature points to satisfy this requirement. This is because spaces are present between the words in the English document, permitting relatively easy isolation of the words.

Figure 4:
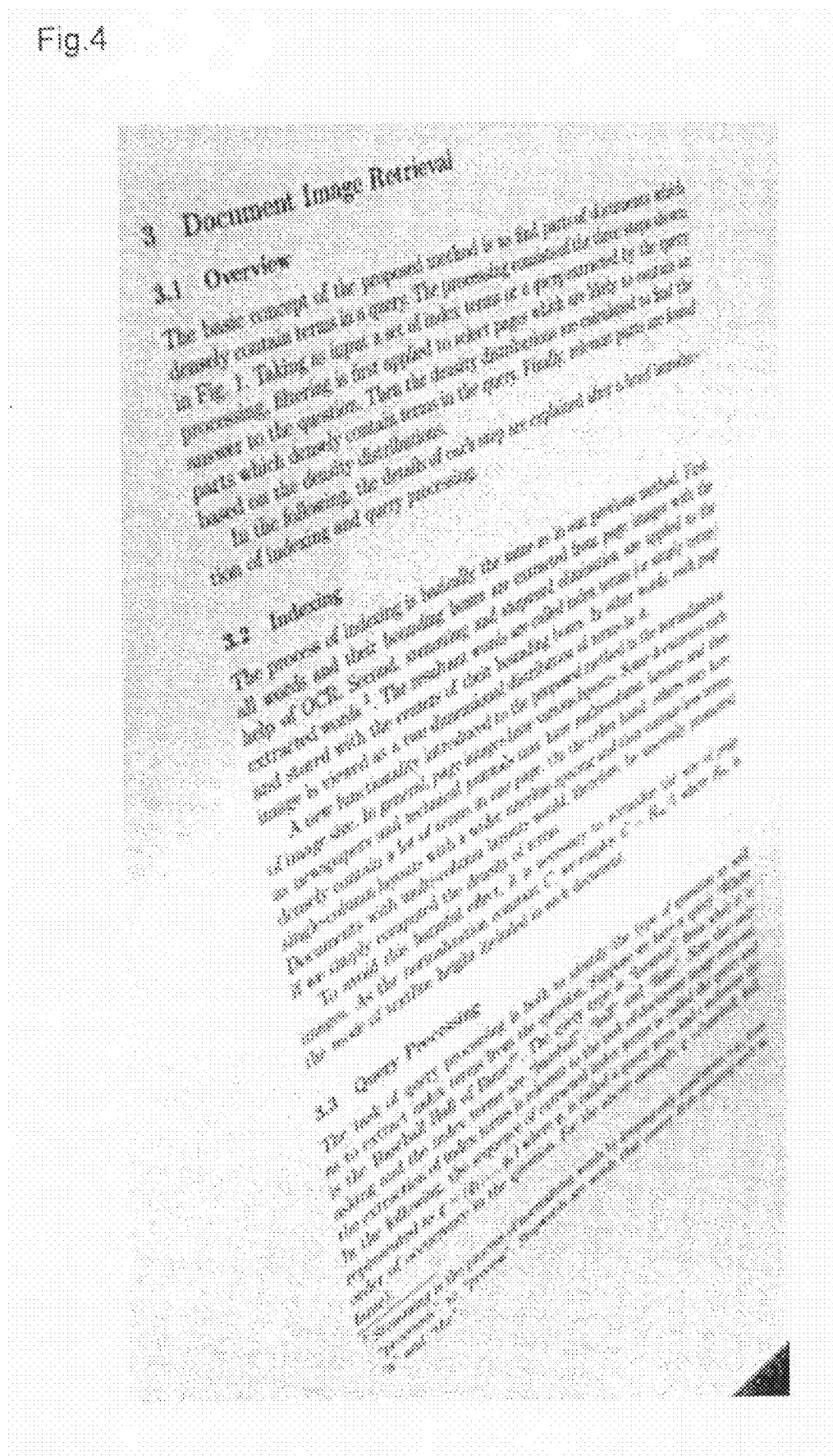
FIG. 4 is an explanatory diagram illustrating an example of an input image according to the present invention.
Figure 5:
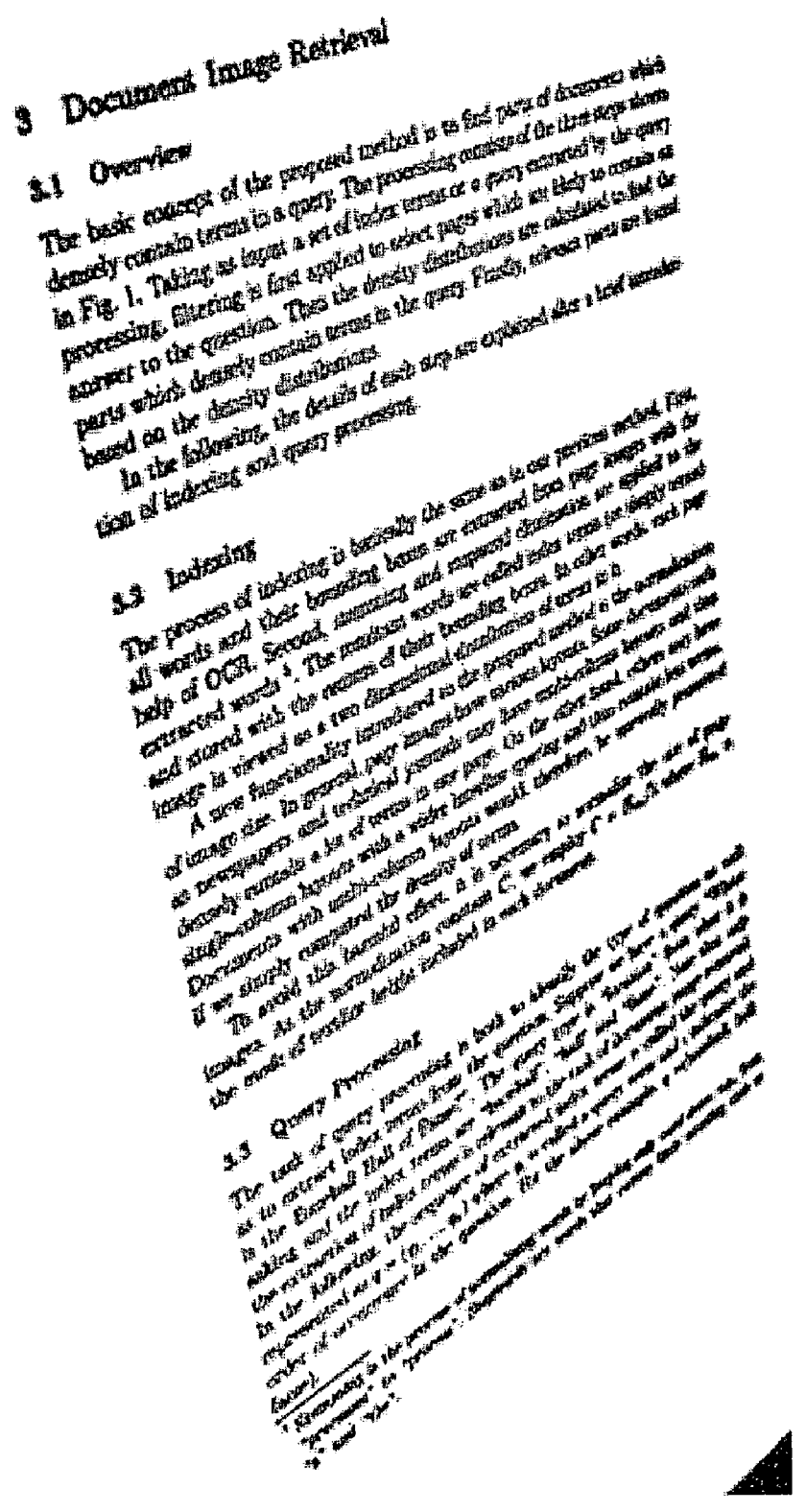
Figure 6:
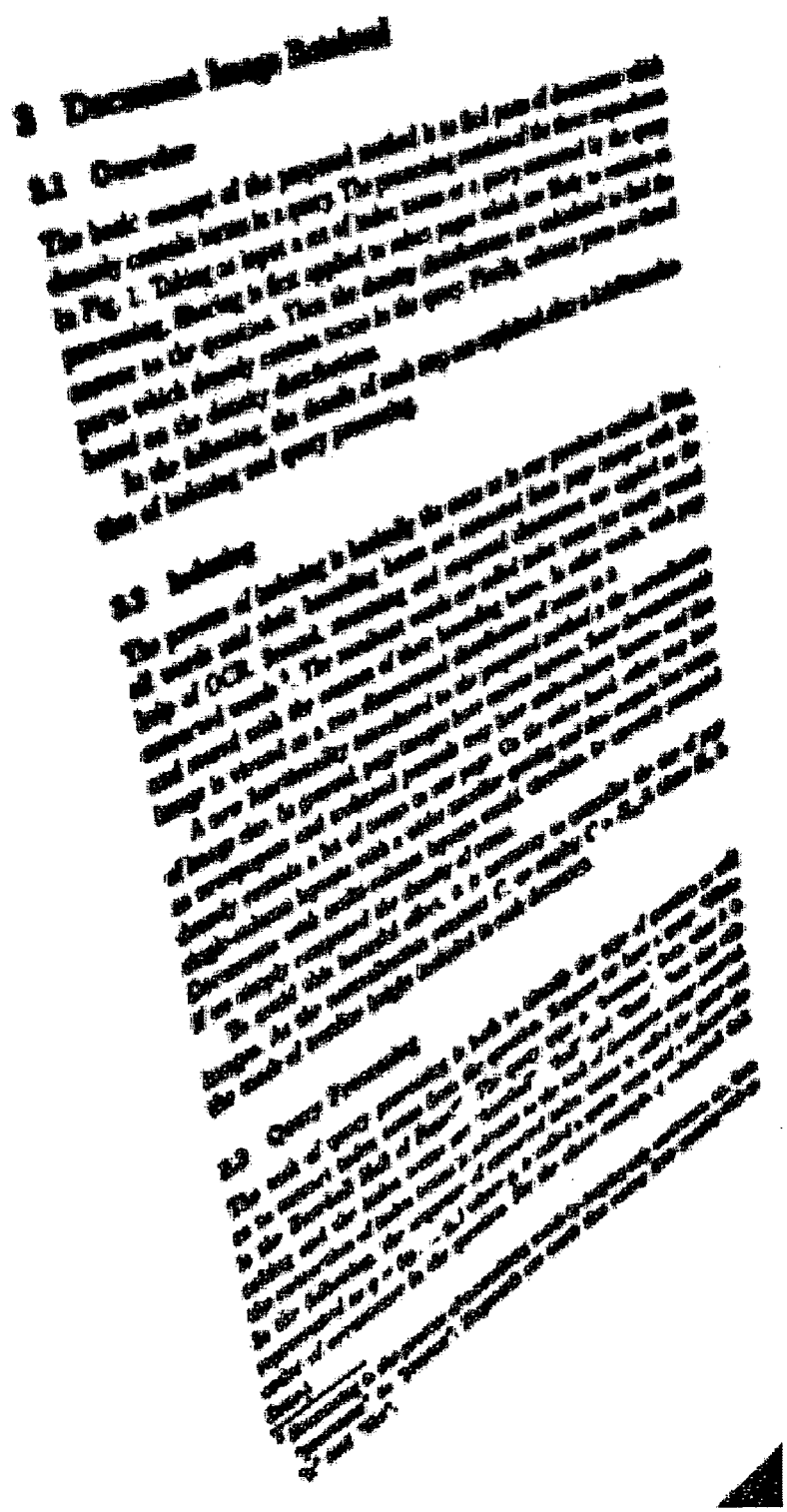
FIG. 6 is an explanatory diagram of an image obtained by processing the image of FIG. 5.
Figure 7:
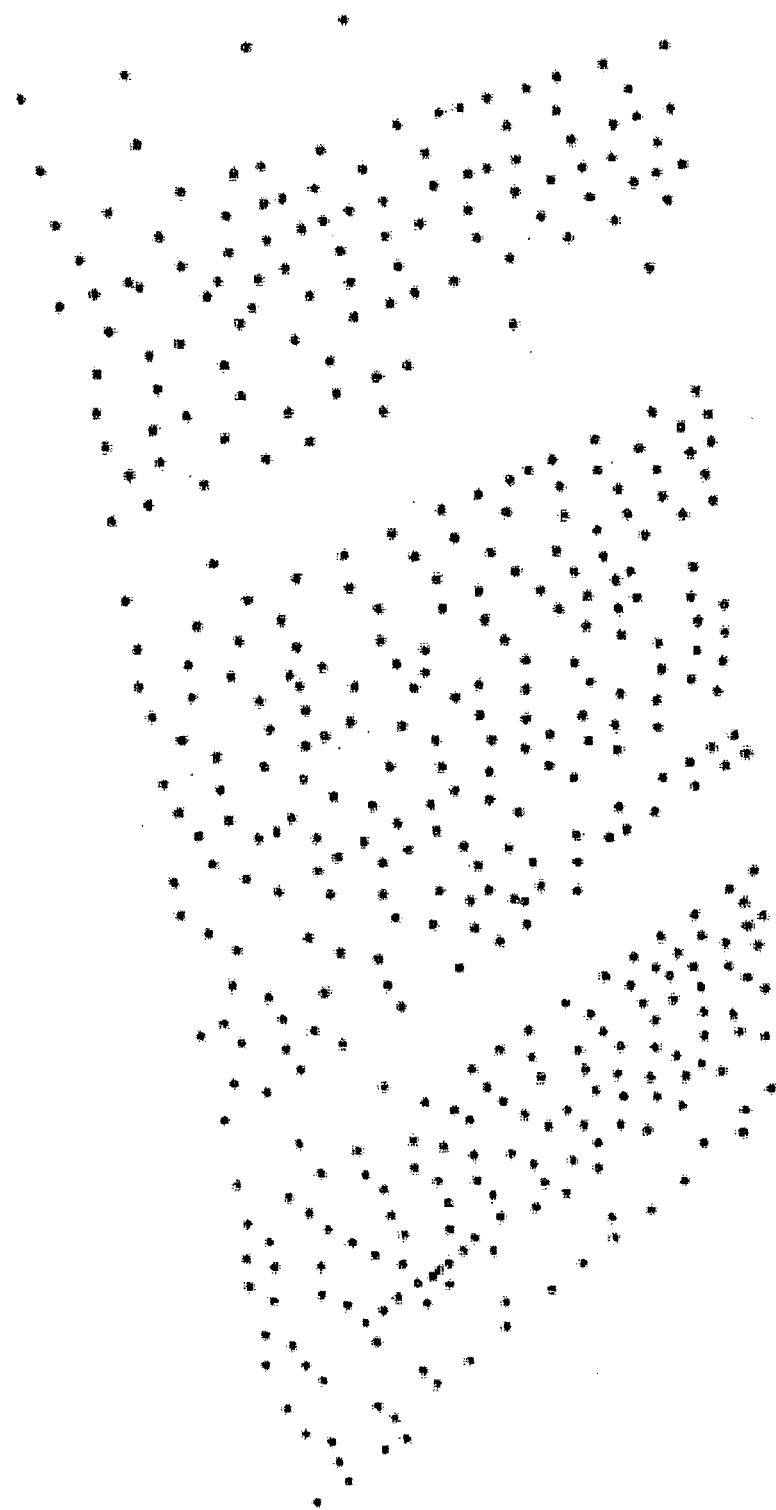
FIG. 7 is an explanatory diagram of an image obtained by further processing the image of FIG. 6.

A procedure for the feature point extraction will be briefly explained by way of example. An input image (FIG. 4) is converted into a binary image (FIG. 5) through adaptive binarization. Subsequently, word regions are detected from the binary image in the following manner. First, the binary image is smoothed (blurred) with the use of a Gaussian filter. At this time, parameters of the Gaussian filter are adaptively determined based on an estimate of a character size (the square root of a mode value of the areas of connected components). The smoothed image is subjected again to the adaptive binarization to provide a binary image (FIG. 6). The connected components in this image are regarded as word regions, and centroids of the respective word regions are defined as the feature points. Feature points shown in FIG. 7 are obtained from the image shown in FIG. 6.

Next, the procedure will be described in detail with reference to flow charts shown in FIG. 36. The input image is processed according to a flow chart of FIG. 36(*a*) to provide a collection of feature points.

The first step is a size correction step. Where the input image is an image capture by a camera attached to a mobile phone, the size of the image is significantly different from an ordinary image size. Therefore, the input image is enlarged for size correction.

Next, an adaptive binarization step defined by the following equations is performed.

[Equation 7]

$$F(x, y) = \begin{cases} 1 & I(x, y) > T(x, y) \\ 0 & \text{otherwise} \end{cases} \quad (1)$$

[Equation 8]

$$T(x, y) = \frac{1}{b^2} \sum_{i=-b/2}^{b/2} \sum_{j=-b/2}^{b/2} I(x+i, y+j) - s \quad (2)$$

wherein I indicates the input image (grayscale image), F indicates an output image (binary image), T is a threshold which is adaptively defined by the above equation (2), b is the size of a block to be referred to for determination of the threshold, and s is a parameter for controlling the threshold. The equation (2) indicates that a value obtained by subtracting a predetermined value s from an average density in the block is employed as the threshold.

Figure 36:
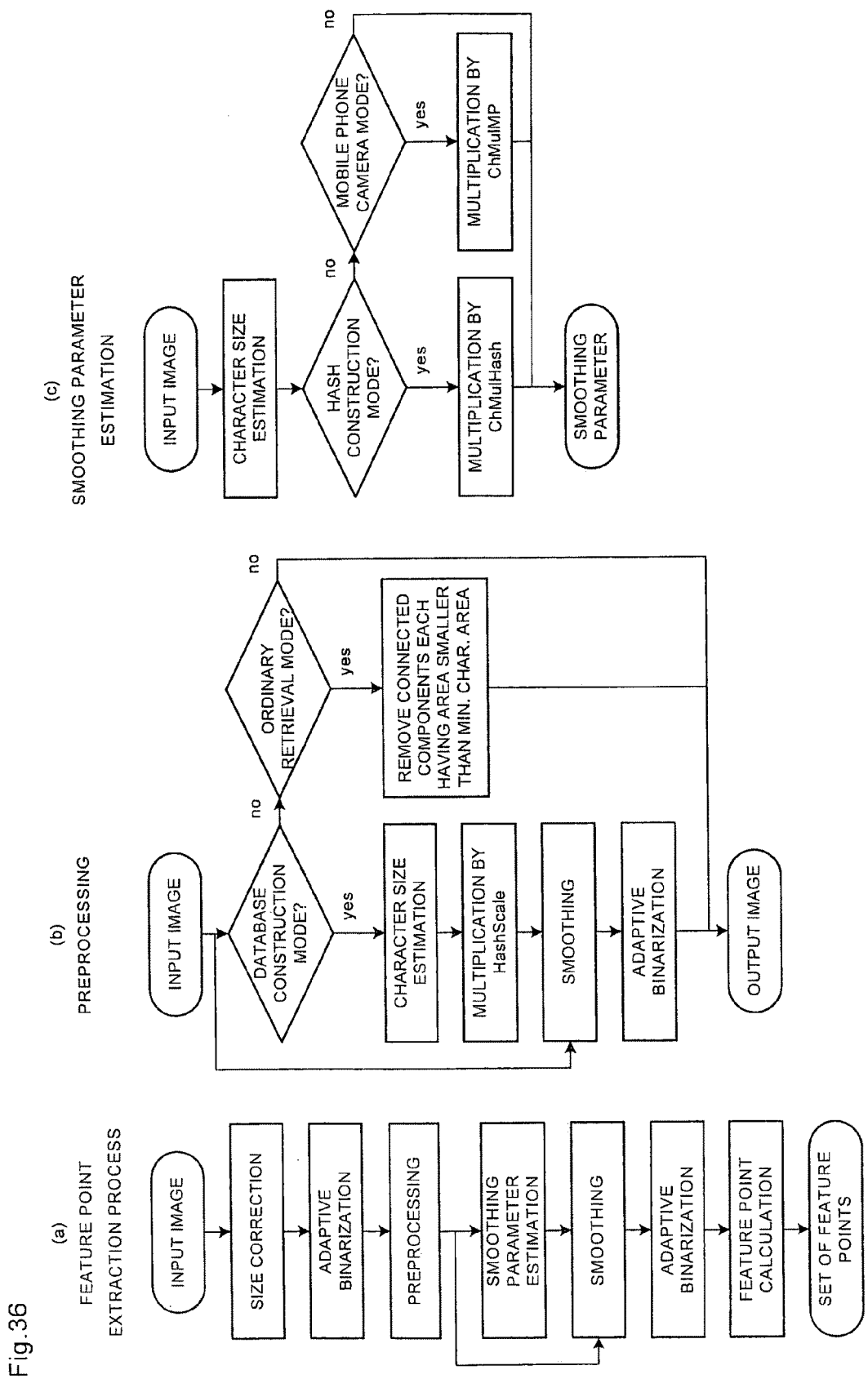
FIG. 36 is flow charts for explaining an exemplary procedure for extraction of feature points according to the present invention.

A preprocessing step is shown in FIG. 36(*b*). The preprocessing step is performed in different ways depending on a system mode, i.e., a database construction mode for storing a document/image in the database or a retrieval mode for retrieving a document/image corresponding to the captured image. If a retrieval operation is to be performed in an ordinary retrieval mode without the use of the mobile phone camera when the system mode is not the database construction mode, connected components each having a smaller area are removed. In the database construction mode, on the other hand, the square root of the mode value of the areas of the connected components is determined for estimation of the character size. The character size is multiplied by a Hash-Scale for determination of the parameter c for the smoothing. In the smoothing, a standard deviation σ of the Gaussian filter is determined from the following equation:

$$\sigma = (c/2 - 1) \times 0.3 + 0.8 \quad \text{[Equation 9]}$$

Then, the image is smoothed by the Gaussian filter defined by this equation, and converted again into a binary image by the adaptive binarization. Thus, the image is preprocessed.

Referring to a flow chart of FIG. 36(*c*), a step following the preprocessing step is a smoothing parameter estimating step. This step is performed in the same manner as in the aforementioned parameter estimation. The next smoothing step is also performed in the same manner as described above. After the smoothing step, the image is converted again into a binary image by the adaptive binarization. Finally, the connected components are extracted from the binary image obtained by this process, and the centroids of the connected components are determined as the feature points.

Calculation of Feature to be Employed for Indexing

A key for the storage and the retrieval is how to calculate the index of the hash table based on the cross-ratios. Prior to detailed explanation of the storage and the retrieval, calculation of a feature to be used for the determination of the index will be described.

The values of the cross-ratios calculated based on the feature points in the image are continuous values. For use for the determination of the index, the cross-ratio values are discretized to k levels. In order to accommodate errors occurring due to geometric transformations and a change in photographing conditions, the number k is preferably relatively small. If the number k is excessively small, the discriminability is reduced. Therefore, the number k should be properly selected. Here, k=9 determined based on the result of a preliminary experiment is employed by way of example, but this is not limitative. A feature is determined for a local area around each of the feature points to permit the retrieval based on a part of an image.

Conceivable examples of the feature defined for the local area around the feature point are as follows:

(1) A cross-ratio for five points nearest to the feature point;
(2) Cross-ratios based on sets of five points selected from n points nearest to the feature point; or
(3) An arrangement of m points selected from n points nearest to the feature point and cross-ratios based on sets of five points selected from the m points.

In the present invention, the most complicated feature (3) is employed. These three features will be explained from the simplest one. Further, the feature employed in the present invention and a reason why the most complicated feature should be employed will be described.

Cross-Ratio for Five Nearest Points

An easily conceivable method for the definition of the feature based on the cross-ratio for the local area around the feature point is to calculate a cross ratio for five points nearest to the feature point. For example, as shown in FIG. 8, five points 1 to 5 nearest to a feature point p are selected, and a cross-ratio for the five points is calculated to be employed as a feature for the point p.

Figure 8:
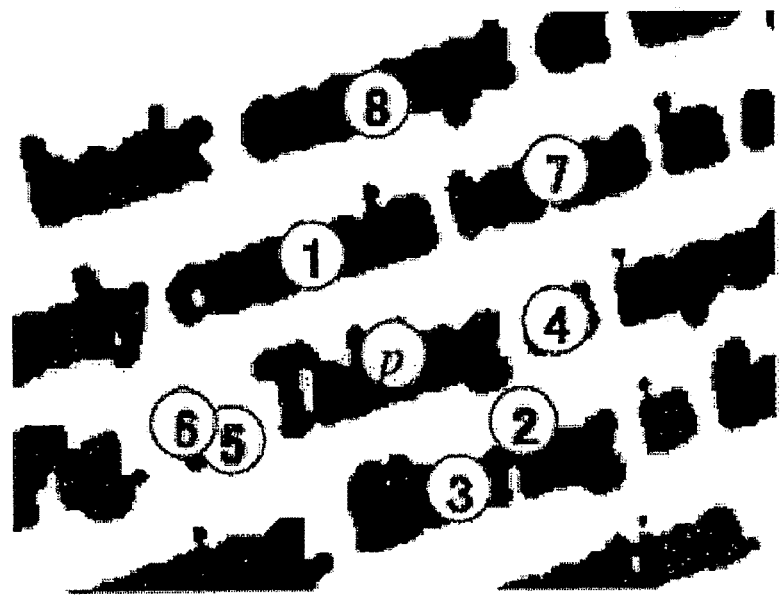
FIG. 8 is a diagram for explaining feature points according to the present invention.
Figure 9:
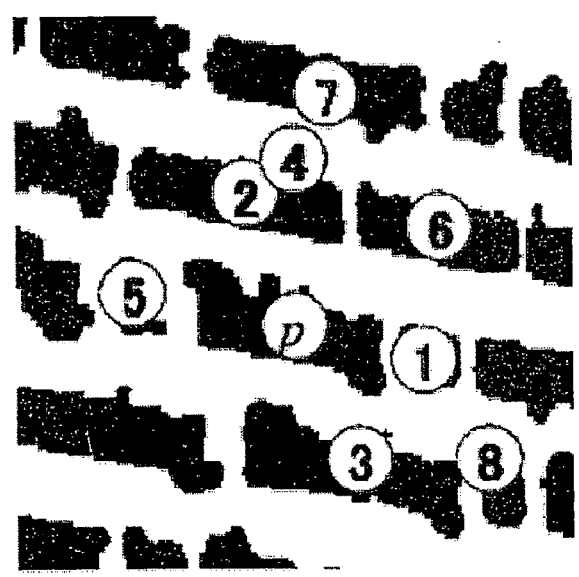
FIG. 9 is a diagram for explaining feature points according to the present invention.

In documents and/or images captured at different angles as shown in FIGS. 8 and 9, however, the nearest five points may change. Therefore, this method is problematic in that the documents and/or images obtained from the same document do not provide the same feature for the same feature point.

Cross-Ratios Based on Sets of Five Points Selected from n Nearest Points

Another conceivable method is to extract all possible sets of five points selected from the n nearest points and calculate cross-ratios based on the respective five-point sets.

The documents and or images shown in FIGS. 8 and 9 are inconsistent in the five nearest points, but consistent in seven points out of eight nearest points. Thus, the n nearest points include m (<n) points which are kept substantially unchanged. Therefore, where cross-ratios are calculated for all possible sets of five points selected from the n points, a match is supposedly found in the cross-ratios calculated based on the sets of five points selected from common m points. Therefore, the cross-ratios calculated based on the all possible sets of five points selected from the n points are employed as the feature. If the number of cross-ratios matching any of the cross-ratios calculated based on the five-point sets from the common m points is not less than a predetermined number in a comparing step, the feature points of interest in the documents and/or images are regarded to be identical.

Figure 10:
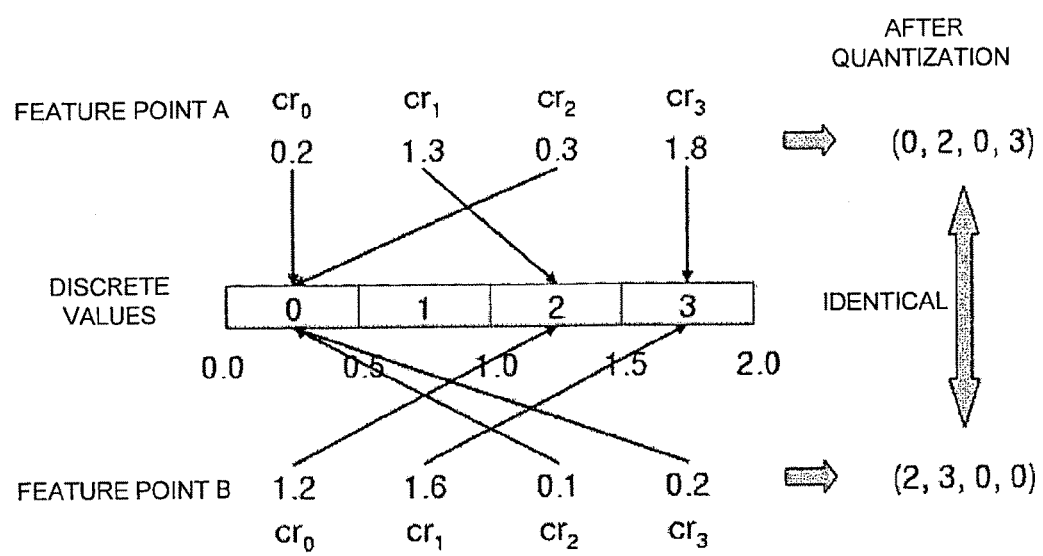
FIG. 10 is an explanatory diagram illustrating a relationship between feature points and cross-ratios according to the present invention.

However, the use of this feature for actual retrieval often leads to incorrect retrieval results. Referring to FIG. 10, it is herein assumed, for example, that four cross-ratios are calculated based on sets of points selected from n points nearest to each feature point for simplicity. It is further assumed that a set of cross-ratios calculated for a feature point A is (0.2, 1.3, 0.3, 1.8) and a set of cross-ratios calculated for a feature point B is (1.2, 1.6, 0.1, 0.2). If these cross-ratios are discretized in steps of 0.5, sets of the discretized cross-ratios for the feature point A and for the feature point B are (0, 2, 0, 3) and (2, 3, 0, 0), respectively. Considering only the values of the cross-ratios, values 0, 2 and 3 are present in common in the sets of the cross-ratios for the feature points A and B, so that the feature points A and B are judged to be identical. Where cross-ratios are determined for actual images in this manner, such an event often occurs, resulting in unsuccessful retrieval.

Arrangement of m Points Selected From n Nearest Points and Cross-Ratios Based on Sets of Five Points Selected From m Points A solution to the aforesaid problems is to consider the order of the cross-ratios as well. That is, the cross-ratio set (0, 2, 0, 3) is discriminated from the cross-ratio set (2, 3, 0, 0) in the example shown in FIG. 10.

Figure 11:
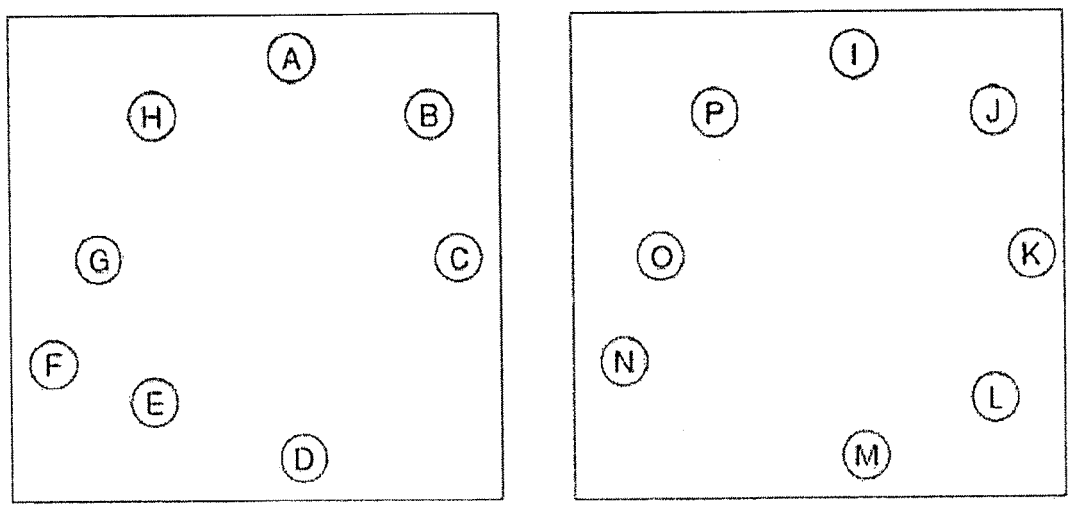
FIG. 11 is a diagram for explaining feature points according to the present invention.

Referring to FIG. 11, more specifically, it is assumed that a group of eight points ABCDEFGH and a group of eight points IJKLMNOP are respectively defined around corresponding points in different images obtained from the same document. These eight-point groups are inconsistent only in one point E, L, and consistent in the other seven points. Therefore, where all possible sets of seven points are selected from the eight points in each of the eight-point groups, a set of points ABCDFGH is identical to a set of points IJKMNOP. Therefore, where all possible sets of ordered five points are defined by selecting five points in a predetermined order from the common seven points in each of the identical seven-point sets, the ordered-five-point sets are consistent. That is, where cross-ratios are calculated based on the all possible ordered-five-point sets from the common seven points in each of the eight-point groups, i.e., cross-ratios for a set of points ABCDF and a set of points IJKMN, cross-ratios for a set of points ABCDG and a set of points IJKMO and so on are calculated, the resulting cross-ratio sequences for the seven-point groups are identical in the order of the cross-ratios and the values of the respective cross-ratios. It is rare that cross-ratio sequences determined based on different seven-point sets are identical in the cross-ratio order and the cross-ratio values. Therefore, the aforementioned problem can be solved by employing the cross-ratio sequence as the feature.

In summary, n points nearest to a given point is first extracted, and then all possible sets of m points selected from the n points are defined. Further, all possible sets of ordered five points selected in a predetermined order from the m points are defined, and cross-ratios for the respective ordered-five-point sets are calculated in sequence. If a match is found in the values and positions of at least l (ell) cross-ratios in cross-ratio sequences, it is judged that these cross-ratio sequences have the same feature.

Embodiment 1

Storage

A storage process will be described based on the preparatory process described above. When a document/image is to be stored in a database, feature points are extracted from the document/image, and features are calculated for the respective feature points and stored in relation to the document/image. Upon acquisition of data of a captured image, features are calculated for the image data, and features for each document/image stored in the database are checked for a match with the calculated features, whereby a document/image corresponding to the data of the captured image is retrieved from documents and/or images stored in the database.

An exemplary procedure for the storage process is shown in FIG. 12. In this process, a document ID is an identification number assigned to each document. A point ID is an identification number assigned to each of points in each document, and a $_nC_m$ pattern ID is an identification number assigned to each of sets of m points selected from n points and taking a value of 0 to $C_m-1$. Similarly, a $_mC_5$ pattern ID is an identification number assigned to each of sets of five points selected from the m points and taking a value of 0 to $_mC_5-1$.

The structure of a hash table in which the documents and/or images are stored is shown in FIG. 13. The term "document image" is herein defined as an image of a document. In the storage process, a process sequence is repeated, in which an index of the hash table is determined at Lines 5 to 8 and the aforementioned IDs are stored in the hash table using the index at Line 9.

The storage process will be further described according to the procedure shown in FIG. 12. At Lines 5 to 7, five cross-ratios are calculated based on a set of five points. The five cross-ratios are obtained using ABCDE, BCDEA, CDEAB, DEABC and EABCD, which are cyclic permutations of the five points ABCDE obtained by cyclically shifting a starting point.

At Line 8, the index of the hash table is calculated from the following hash function:

$$H_{index} = \sum_{n=0}^{4} cr_n(V_{max}+1)^n + pat(V_{max}+1)^5 \quad \text{[Equation 10]}$$

wherein $cr_n$ (n=0 to 4) is discrete values of the five cross-ratios, $V_{max}$ is the maximum of the discrete cross-ratio values, and pat is the $_mC_5$ pattern ID.

At Line 9, a list (document ID, point ID, $_nC_m$ pattern ID) is stored in the hash table using the index. When a collision occurs, data is additionally stored in the form of a list as shown in FIG. 13. Not only the document ID but also the point ID and the $_nC_m$ pattern ID are stored in the hash table. This is because, when the features are compared in the retrieval process, the number of matching cross-ratios in a cross-ratio sequence is determined for each list (document ID, point ID and $_nC_m$ pattern ID).

Retrieval

Figure 15:
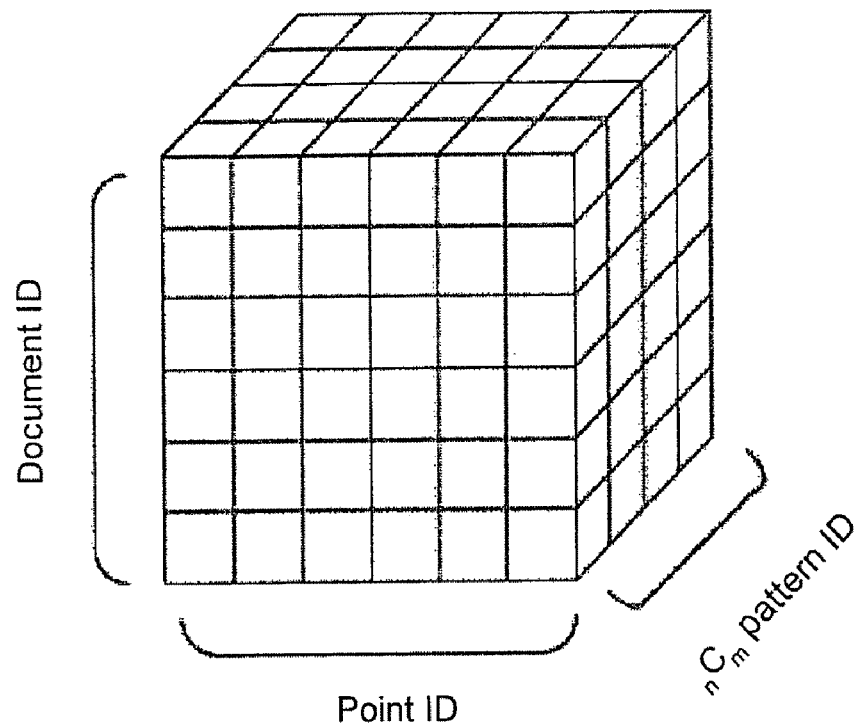
FIG. 15 is a diagram for explaining a primary voting table according to the present invention.
Figure 16:
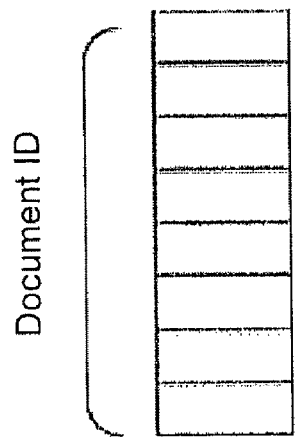
FIG. 16 is a diagram for explaining a secondary voting table according to the present invention.
Figure 19:
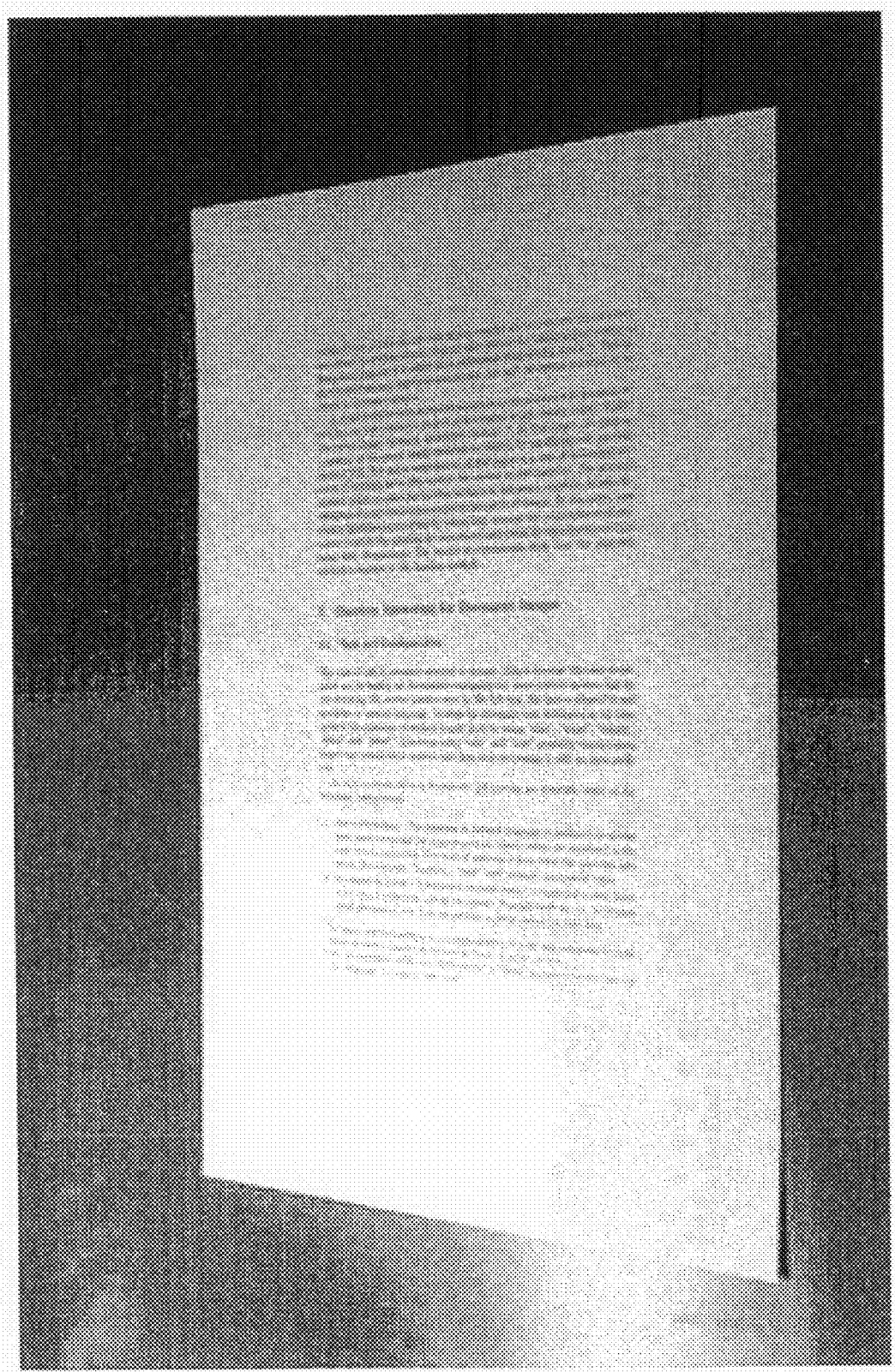
FIG. 19 is an explanatory diagram illustrating an exemplary captured image employed in Experiment 1 in the present invention.
Figure 20:
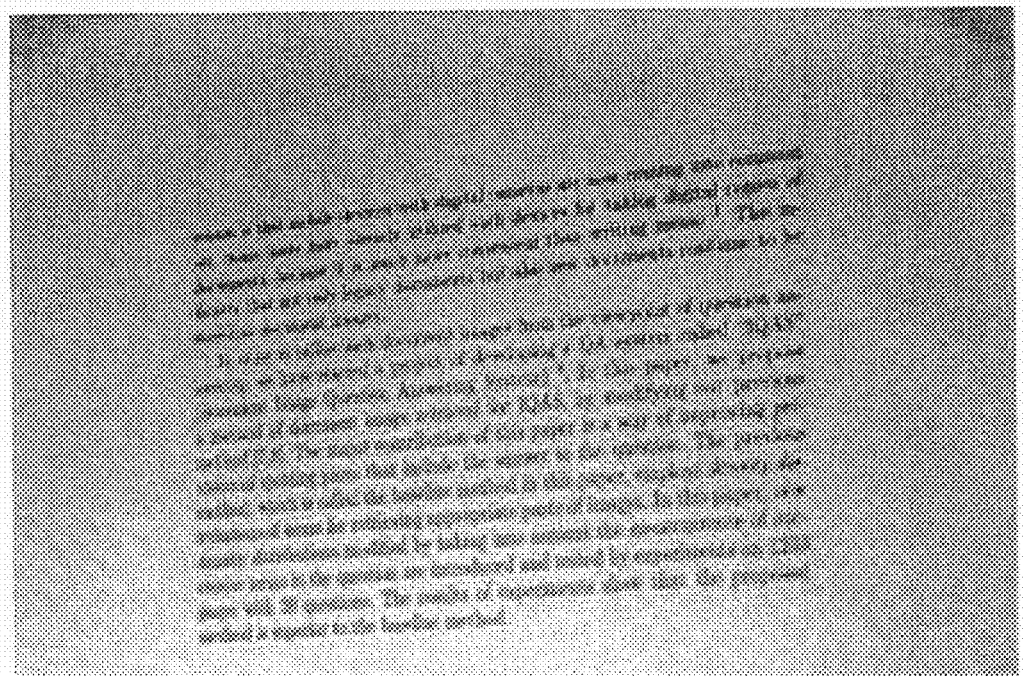
FIG. 20 is an explanatory diagram illustrating another exemplary captured image employed in Experiment 1 in the present invention.
Figure 22:
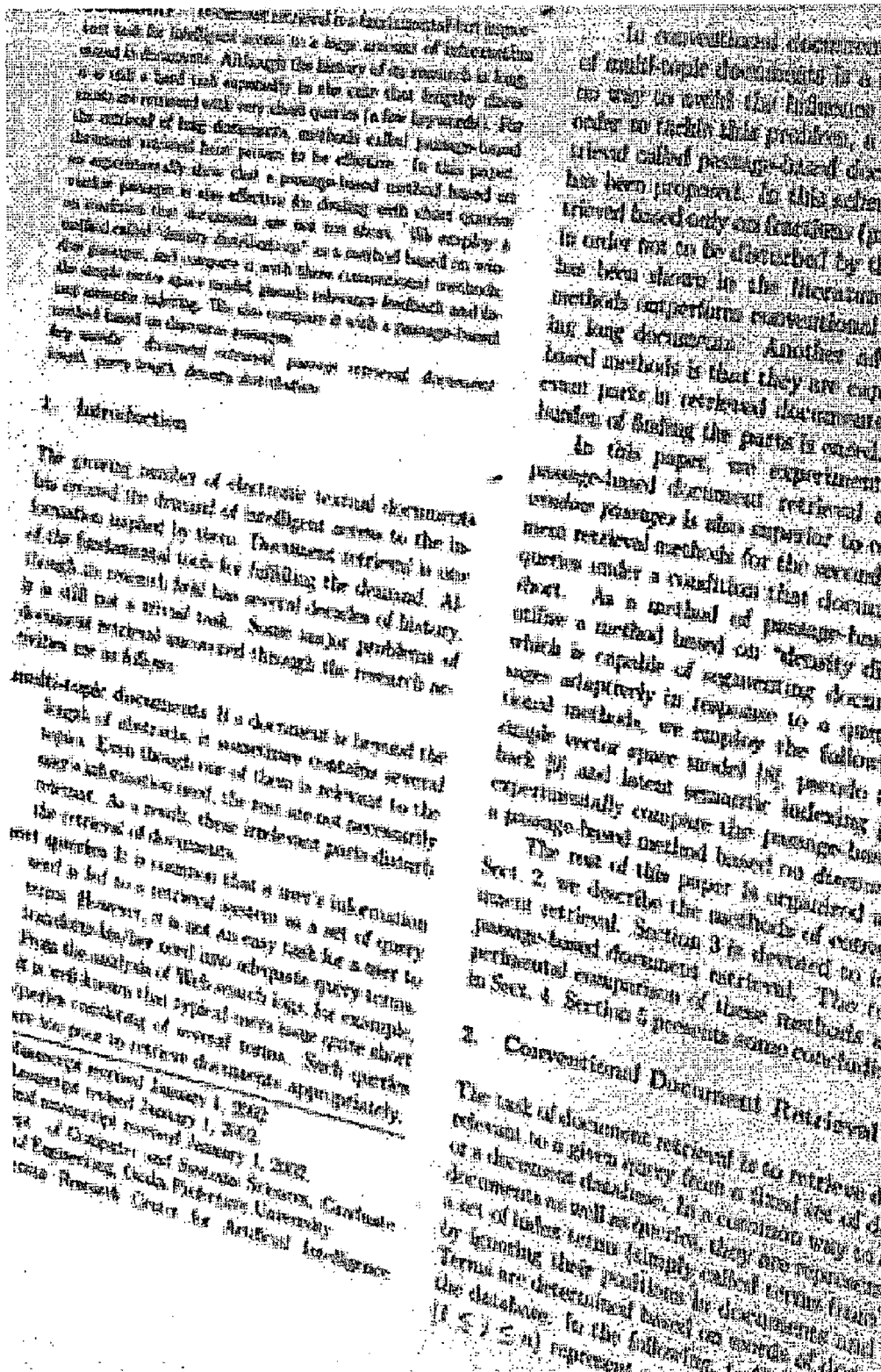
FIG. 22 is an explanatory diagram illustrating still another exemplary captured image employed in Experiment 1 in the present invention.

Next, the retrieval process will be described. An exemplary procedure for the retrieval process is shown in FIG. 14. In the present invention, whether a match is found in at least a predetermined number l of cross-ratios in a cross-ratio sequence is checked with reference to a primary voting table as shown in FIG. 15. If the match is found, a vote is cast for a corresponding document in a secondary voting table as shown in FIG. 16 to provide a retrieval result. For proper determination of the number l, an experiment is preliminarily performed by employing some possible numbers l ($l<_nC_m$), and a number which provides the highest ratio of correct retrieval results to incorrect retrieval results is employed as the number l.

The retrieval process will be described in the same manner as the storage process. At Lines 6 to 9 in the retrieval process shown in FIG. 14, an index of the hash table is determined in the same manner as in the storage process, and a list as shown in FIG. 13 is read out of the hash table at Line 10. For each element of the list, a vote is cast for a corresponding cell of the primary voting table.

After these steps are repeated to complete the voting for all the five-point sets from the m points, cells of the primary voting table are checked. If a cell having the number of votes not less than l is detected, a vote is cast for a corresponding document ID in the secondary voting table.

Finally, a document having the largest number of votes in the secondary voting table is finally determined as a retrieval result.

At Line 4, all possible cyclic permutations {P'$_m$} of points of the point set P$_m$ are formed by shifting the starting point in the point set P$_m$, and processed in the aforesaid manner. This step corresponds to a process for forming m cyclic permutations {P'$_m$} from the point set P$_m$. For example, from ABC-DEFG, cyclic permutations BCDEFGA, CDEFGAB and the like are formed. This step is necessary for processing a rotated image.

Embodiment 2

Higher Speed Process

A method according to this embodiment will be explained, in which processing time required for the storage or the retrieval is reduced as compared with Embodiment 1.

Prior to the explanation of the improved storage and retrieval methods, additional explanation will be given to the calculation of the features.

Calculation of Features

1. Requirements to be Satisfied by Features

The feature is herein defined as a value representing each feature point in a document image. Features of feature points are calculated for a query to be used for the retrieval and for documents to be stored, and whether or not the query matches any of the stored documents is judged by comparing the features for the query with the features for each of the stored documents.

The features are evaluated based on the accuracy of the retrieval and a computational complexity required for the retrieval. Features which permit accurate and high-speed retrieval of a stored document corresponding to the query are regarded to be excellent. Two requirements to be satisfied by the features for the accuracy are defined as follows.

A first requirement is that a feature calculated for the same point of the same document should be kept unchanged even under influences of various types of distortions. If different features are calculated for the query and the corresponding stored document, it is impossible to find matching feature points in the retrieval process. This requirement is referred to as "stability of features".

A second requirement is that features calculated for different points should be different. If the same feature is calculated for different documents, not only matching feature points but also irrelevant feature points are detected in the retrieval process. This requirement is referred to as "discriminability of features".

Further, a third requirement is that the calculation of the feature requires a relatively small computational complexity. It is of course difficult to employ a feature requiring a tremendous amount of computation even if the feature has higher stability and higher discriminability. Therefore, the features should satisfy the requirement for a smaller computational complexity in addition to the aforementioned two requirements for the accuracy.

The features should satisfy these three requirements for the higher-speed and higher-accuracy document image retrieval.

2. Stability of Features

Of the aforementioned three requirements, the stability of the features will be first described. In the inventive method, as described above, the feature is calculated based on invariant values for points nearest to each feature point. In order to stably provide the feature, the nearest points to be used for the calculation of the feature should be kept unchanged even if the coordinates of the nearest points are changed due to a perspective distortion. As shown in FIGS. 8 and 9, the nearest points are changed under influences of the perspective distortion. Therefore, if an invariant value calculated based on f points nearest to the feature point p is employed as the feature, it is impossible to provide the same feature for the same feature point p.

Figure 41:
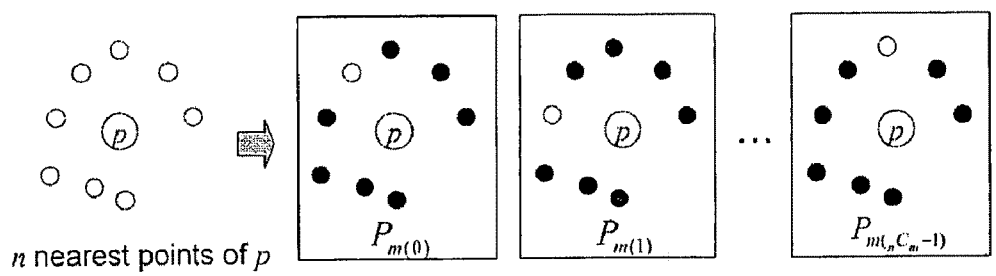
FIG. 41 is a diagram for explaining all possible m-point combinations (m=7) from n points (n=8) (Embodiment 2).

In the present invention, therefore, sets of multiple points selected from points nearest to the feature point in a wider area are defined, and multiple features are calculated based on the respective sets of multiple points. This is based on the assumption that m points (seven points in FIGS. 8 and 9) out of n nearest points (eight points in FIGS. 8 and 9) in the wider area are present in common in images even under the influences of the perspective distortion. Provided that the m points out of the n nearest points are present in common in the images, all possible m-point sets Pm(0), Pm(1), . . . , Pm($_n$C$_m$−1) from the n points are defined as shown in FIG. 41, and features are calculated for the respective point sets. In this case, the features calculated for the respective feature points include at least one common feature.

3. Discriminability of Features

Figure 42:
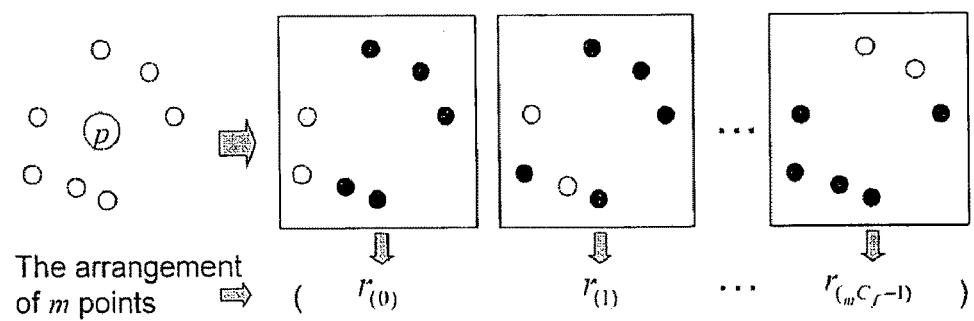
FIG. 42 is a diagram for explaining an arrangement of m points (m=7) each defined by invariant values calculated for f-point combinations (Embodiment 2).

Next, the discriminability of the features will be described. In the inventive method, the discriminability of the features is improved by increasing the number of the feature points m to be used for the calculation of a single feature. A sequence of invariant values cr(0), cr(1), . . . , cr($_m$C$_f$−1) calculated based on all possible sets of f points selected from the m points as shown in FIG. 42 is employed for the notation of the arrangement of the m points, wherein cr(i) is a cross-ratio equivalent to cr$_i$ having the same value. As the number m increases, the number of the invariant values to be calculated is increased. Therefore, the possibility of accidental coincidence of the feature is reduced. However, if the number m is excessively great, the stability of the feature is reduced. This is because a match should be found in all the invariant values for the matching of the features, and the increase in the number m increases the number of the invariant values $_m$C$_f$, thereby increasing the possibility that different invariant values are calculated due to influences of errors.

4. Computational Complexity and Storage Capacity

As described above, the increase in the number n makes it possible to calculate the multiple features for the wider area, thereby improving the stability of the features. Further, the increase in the number m makes it possible to calculate each of the features based on a greater number of points, thereby improving the discriminability of the features. However, if the values of these parameters are excessively increased, a problem associated with the computational complexity arises. That is, if the numbers n and m are excessively great, the computational complexity for the calculation of the invariant values is increased. Therefore, the processing time required for the storage and the retrieval is correspondingly increased. Further, a greater storage capacity is required for storing the calculated features for the storage.

5. Quantization Levels for Invariant Values

The stability and the discriminability are influenced not only by the parameters n, m but also by the number of levels k for quantization of the invariant values. If the number k is greater (the invariant values are each finely discretized), the possibility that the invariant values calculated based on the same sets of f points are discretized at different levels is increased by the influences of errors, thereby deteriorating the stability. If the number k is smaller (the invariant values are each roughly discretized), the possibility that the invariant values calculated based on different sets of f points are discretized at the same level is increased, thereby deteriorating the discriminability. Therefore, the parameters n, m and k should be properly set to ensure that the retrieval process is performed at a higher speed with higher accuracy with a smaller storage capacity.

Storage

Another exemplary procedure for the storage process different from Embodiment 1 will be described with reference to FIG. 28.

In the storage process, all possible sets of m points selected from n points nearest to each feature point in a document to be stored are defined. Then, an index is determined based on cross-ratios calculated on the basis of the respective m-point sets, and the cross-ratios are stored in a hash table shown in FIG. 29. The storage process will hereinafter be described according to the procedure shown in FIG. 28. At Line 1, one feature point p is extracted from a collection of feature points. At Line 2, n points nearest to the point p are sequentially extracted clockwise to provide a point set $P_n$. At Line 3, m points are extracted from the point set $P_n$ to provide a point set $P_m$. At Line 5, cross-ratio values are calculated for all possible sets of five points selected from the point set $P_m$, and discretized to provide cross-ratios $cr_i$. Since the number of the five-point sets from the m points is $_mC_5$, "i" takes a value of 0 to $_mC_5-1$.

Figure 29:
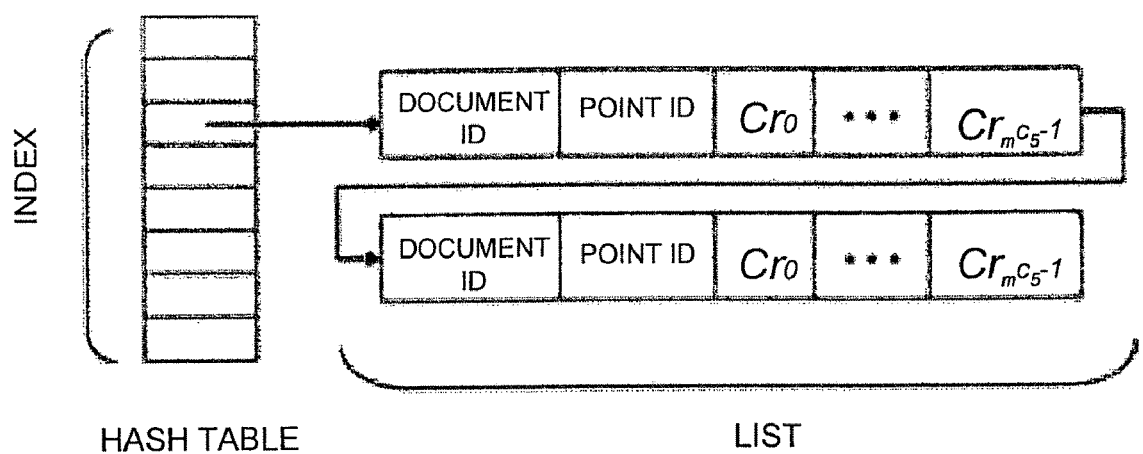
FIG. 29 is a diagram for explaining the structure of a hash table according to the present invention (Embodiment 2).

At Line 7, an index $H_{index}$ of the hash table is determined from a hash function based on the cross-ratios $cr_i$ thus provided. At Line 8, a document ID (the identification number of the document to be stored), a point ID (the identification number of the point) and the cross-ratios $cr_i$ (i=0, ..., $_mC_5-1$) are stored in the hash table based on the hash index $H_{index}$. The hash function is as follows:

$$H_{index} = \left( \sum_{n=0}^{mC_5-1} cr_n k^n \right) \mod H_{size} \qquad \text{[Equation 11]}$$

wherein k is the number of levels for quantization of the cross-ratios, and $H_{size}$ is the size of the hash table. Where a collision occurs in the storage process, data is added in the form of a list as shown in FIG. 29.

Further another procedure for the storage process is shown in FIG. 43. Explanation will be given to FIG. 43. In the storage process, all possible sets of m points selected from n points nearest to each feature point in a document to be stored are defined. Then, an index is determined based on invariant values calculated on the basis of the respective m-point set, and the invariant values are stored in the hash table shown in FIG. 29.

At Line 1 in FIG. 43, one feature point p is extracted from a collection of feature points. At Line 2, n points nearest to the point p are extracted to provide a point set $P_n$. At Line 3, m points are extracted from the point set $P_n$ to provide a point set $P_m$. At Line 4, the m points in the point set $P_m$ are sequenced clockwise around the point p to provide a feature point sequence $L_m$. At Line 5, all possible feature point sequences $L_f$ are provided by selecting f points in a predetermined order from the points in the point sequence $L_m$, and arranged in a lexicographic order.

When m=7 and f=5, for example, feature point sequences $((p_0,p_1,p_2,p_3,p_4), (p_0,p_1,p_2,p_3,p_5), \ldots, (p_2,p_3,p_4,p_5,p_6))$ are provided as $(L_f(0), \ldots, L_f(_7C_5-1))$. At Line 7, points in each of the feature point sequences $L_f(i)$ are substituted as A, B, C, ... in the aforementioned invariant calculation equation, whereby invariant values are calculated and discretized to provide cr(i). At Line 9, an index $H_{index}$ of the hash table is determined from the following hash function (3). At Line 10, a document ID (the identification number of the document to be stored), a point ID (the identification number of the point) and the invariant values cr(i) (i=0, 1, ..., $_mC_f-1$) are stored in the hash table based on the index $H_{index}$. The hash function employed in this embodiment is as follows:

$$H_{index} = \left( \sum_{i=0}^{mC_5-1} cr_i k^i \right) \mod H_{size} \qquad (3) \quad \text{[Equation 12]}$$

wherein k is the number of levels for quantization of the invariant values, and $H_{size}$ is the size of the hash table. Where a collision occurs in the storage process, data is added in the form of a list as shown in FIG. 29. The aforementioned process is performed on all the feature points p for the storage of the document.

Retrieval

Next, the retrieval process will be explained. An exemplary procedure for the retrieval process different from Embodiment 1 is shown in FIG. 30. The retrieval process will be described in the same manner as the storage process. At Lines 5 to 8 of the procedure, an index of the hash table is determined in the same manner as in the storage process. At Line 9, a list as shown in FIG. 29 is read out of the hash table. Whether or not cross-ratios for a query completely match stored cross-ratios is checked with reference to elements of the list and, if a match is found, a vote is cast for a corresponding cell of a voting table of a linear array of document IDs.

Figure 31:
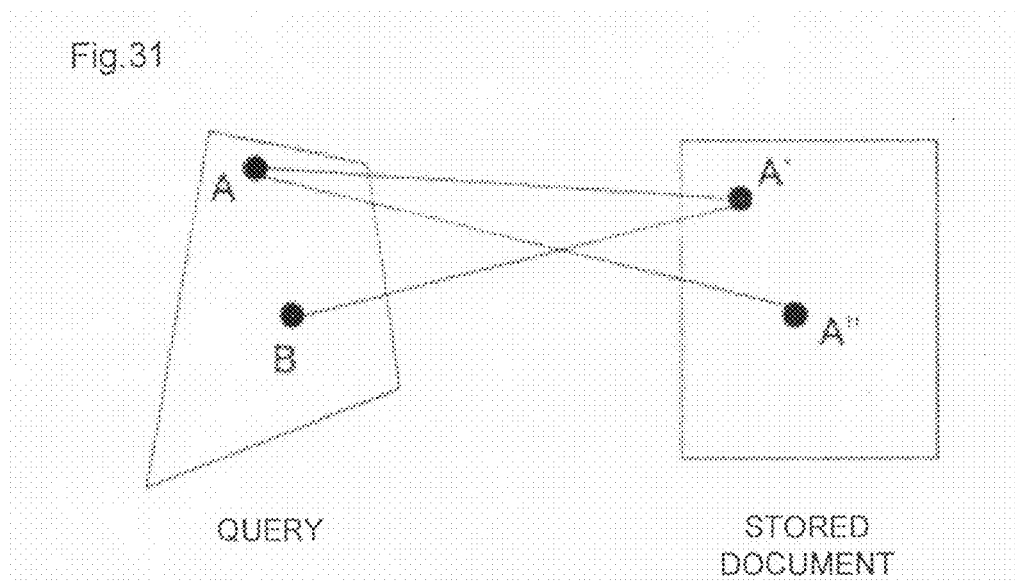
FIG. 31 is a diagram for explaining how to correlate feature points p in a query with points in a stored document in a voting process according to the present invention (Embodiment 2).

Casting a vote herein corresponds to a process for correlating a feature point p in the query with a feature point in the stored document. If the feature points p were independently correlated with the feature points in the stored document, one feature point in the query would be erroneously correlated with multiple points to provide erroneous correspondences A-A', A-A" and B-A' as shown in FIG. 31. If votes based on the erroneous correspondences were included in the number of votes, the ratings for votes based on correct correspondences would be relatively reduced, thereby resulting in unsuccessful retrieval. In this embodiment, correspondences between the points in the query and the points in the stored document are recorded, and no vote is cast for the recorded correspondences. Thus, the votes based on the erroneous correspondences are suppressed.

This process is performed for all the points in each stored document, and a document having the largest number of votes in the voting table is finally determined as a retrieval result.

At Line 4, all possible point sets {$P'_m$} are defined by shifting a starting point in a point set $P_m$, and processed. This step corresponds to a process for defining m cyclic permutations {$P'_m$} of points ABCDEFG in the point set $P_m$, i.e., BCDEFGA, CDEFGAB and the like. This step is necessary for processing a rotated image.

This process may be performed according to a procedure as shown in FIG. 44. An explanation will be given to FIG. 44. At Lines 1 to 3, p, $P_n$ and $P_m$ are defined in the same manner as in the storage process. At Lines 4 and 5, feature point sequences {$L_m$} are defined by shifting a starting point $p_0$ to each of the points in the point set $P_m$ unlike in the storage process. This is necessary because only one of the sequences $L_m$ formed from $P_m$ without consideration of the rotation of the image is stored at Line 4 in the storage algorithm in FIG. 43. Even under the perspective transformation, the clockwise sequence of the feature points around the point p is constant though the starting point is shiftable. That is, where cyclic permutations of $L_m$ are considered, the sequence employed in the storage process is inevitably one of the cyclic permutations. At Lines 6 to 10, an index of a hash table is determined in the same manner as in the storage process. At Line 11, a list as shown in FIG. 29 is read out of the hash table. At Lines 12 to 14, a vote is cast for a corresponding one of the stored document IDs based on elements of the list. Here, the votes based on the erroneous correspondences are suppressed in the following manner.

The following three conditions are employed: (1) the same sequence of invariant values are obtained; (2) one point in the query does not correspond to multiple points in the stored document; and (3) one point in the stored document does not correspond to multiple points in the query. For all the points in the query image, the aforesaid process is performed based on these conditions to determine the number of votes for the respective stored documents. However, the number of votes thus determined still include votes based on the erroneous correspondences. The number of the erroneous votes is generally proportional to the number of feature points contained in the stored document. Therefore, a stored document having a greater number of feature points acquires an unreasonably great number of votes. In order to correct an error occurring due to the erroneous votes, a score $S(d_i)$ for a document $d_i$ is defined by the following equation (4):

[Equation 13]

$$S(d_i) = V(d_i) - cN(d_i) \quad (4)$$

wherein $V(d_i)$ is the number of votes for $d_i$, $N(d_i)$ is the number of feature points contained in the document $d_i$, and c is a proportionality constant between the number of the feature points and the number of the erroneous votes which is determined by a preliminary experiment. A document having the highest score is finally determined as a retrieval result.

Exemplary Experiments for Embodiment 1

Outline of Experiments

In order to verify the effectiveness of the method according to Embodiment 1, the retrieval process was performed based on document images captured by an ordinary digital camera and document images captured by a mobile phone digital camera. A digital camera CANON (stored trade mark) EOS Kiss Digital (6.3 million pixels) with a lens EF-S 18-55 mm USM was employed as the ordinary digital camera, and a digital camera (0.18 million pixels) attached to a mobile phone KYOCERA TK31 was used as the mobile phone digital camera.

Figure 18:
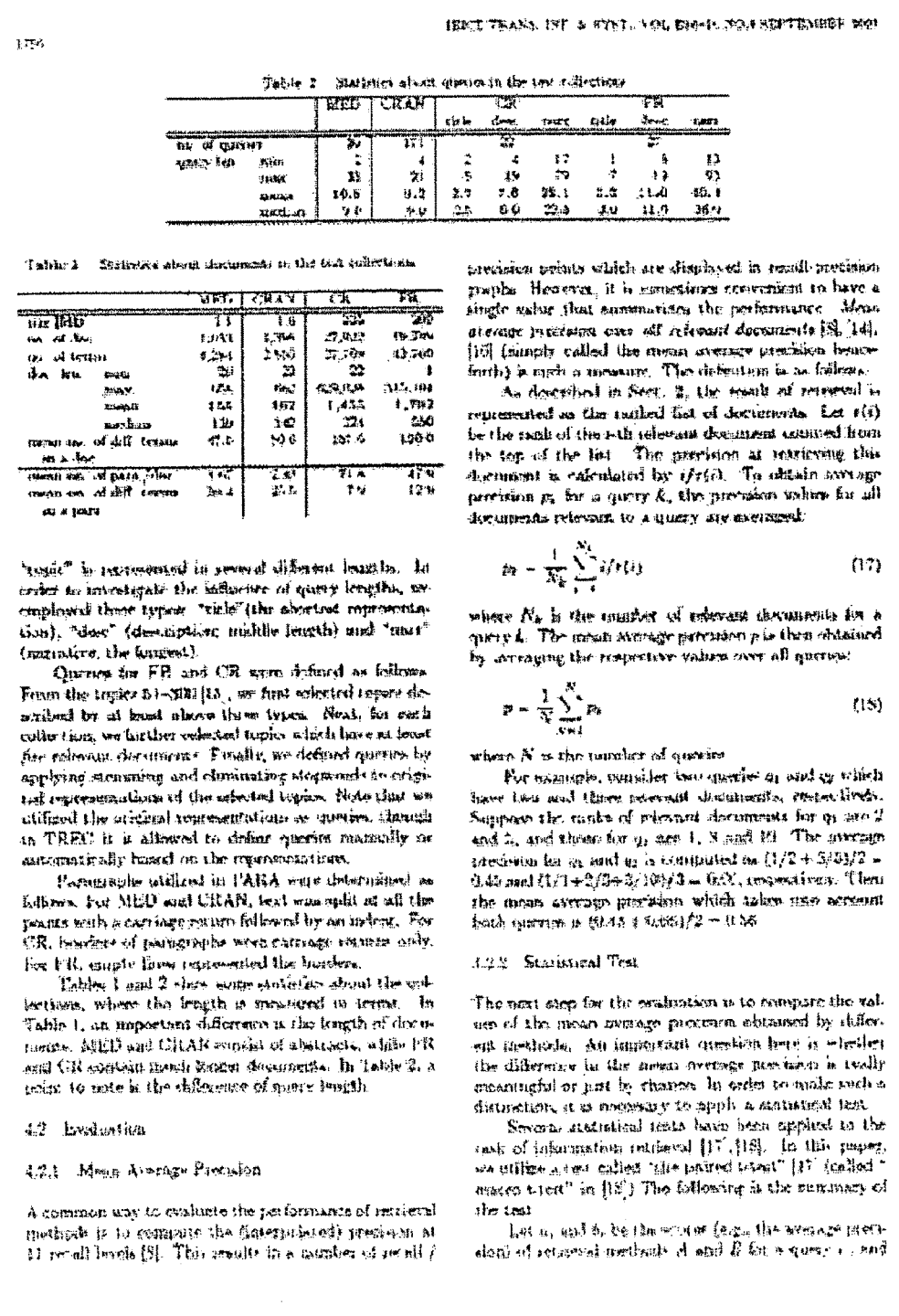

In a document image database, 50 document images prepared by conversion from PDF files of single- and double-column English papers were stored. Examples of the document images in the database are shown in FIGS. 17 and 18. Experiments were performed on a computer with a Pentium 4 (stored trade mark) CPU (2.4 GHz) and a memory (768 MB).

Experiment 1: Experiment Using Ordinary Digital Camera

The result of an experiment using the ordinary digital camera will be described. The aforementioned parameters were set as follows: n=8, m=7, k=9 and l=10. As described above, k is the number of levels for the discretization of the values of the cross-ratios calculated for each feature point, and l is the number of discretized cross-ratios which should match for judging matching of each feature point based on the number of votes in the primary voting and is employed as a threshold of the number of votes for judging whether the secondary voting is to be performed based on the elements of the hash table. A total of 40 images prepared by photographing 10 different document pages with four different photographing ranges as shown in FIGS. 19 to 22 were employed as queries. The photographing rages include a photographing range A covering the entire document page, a photographing range B covering the entire text region, a photographing range C covering a half of the text region, and a photographing range D covering a quarter of the text region. The document pages were photographed askew. Retrieval was regarded as correct in case the correct document image has the largest number of votes. An average correct retrieval ratio and an average processing time were measured.

The experiment results are shown in Table 1. Regardless of the photographing range, correct retrieval results were obtained from all the input images. The processing time is reduced as the photographing range reduces. This is because the number of feature points to be processed is reduced.

TABLE 1

| | Photographing range | | | |
|---|---|---|---|---|
| | A | B | C | D |
| Correct retrieval ratio (%) | 100 | 100 | 100 | 100 |
| Processing time (sec) | 231.6 | 173.1 | 157.6 | 118.1 |

Experiment 2: Experiment Using Mobile Phone Digital Camera

Figure 23:
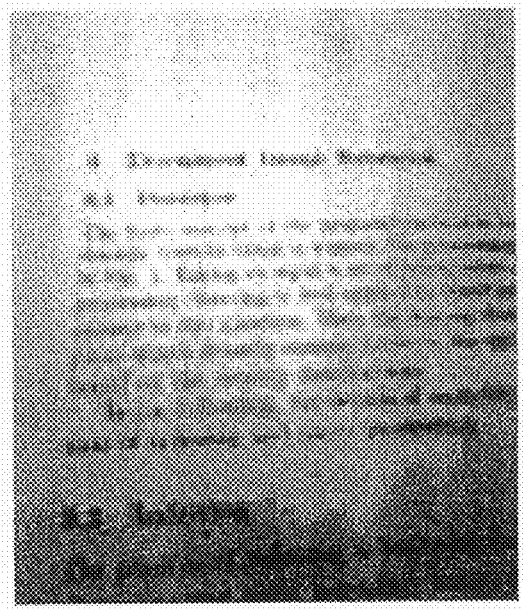
FIG. 23 is an explanatory diagram illustrating an exemplary captured image employed in Experiment 2 in the present invention.
Figure 24:
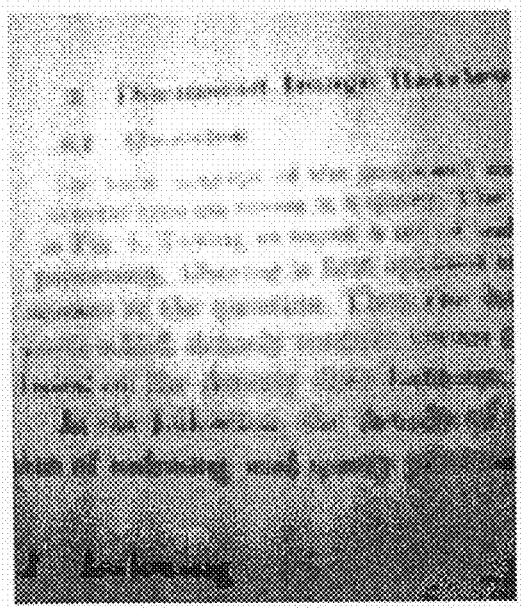
FIG. 24 is an explanatory diagram illustrating another exemplary captured image employed in Experiment 2 in the present invention.
Figure 25:
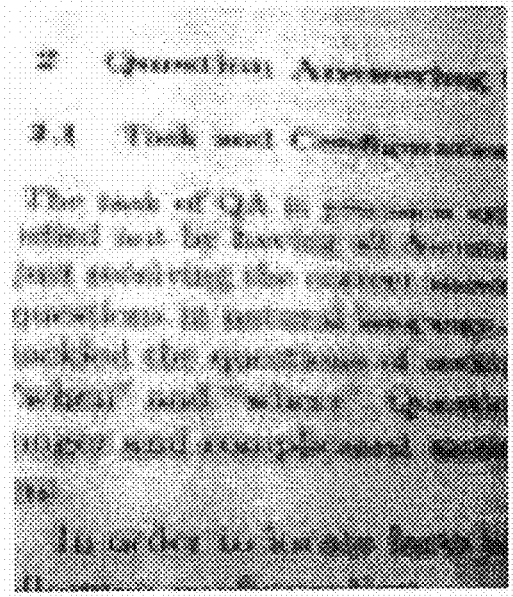
FIG. 25 is an explanatory diagram illustrating further another exemplary captured image employed in Experiment 2 in the present invention.
Figure 26:
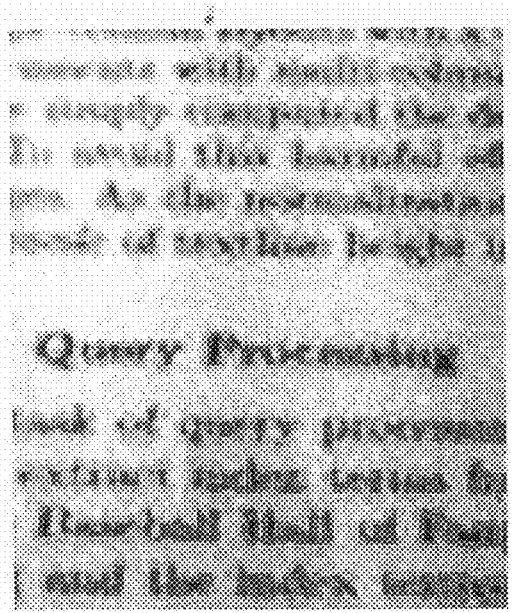
FIG. 26 is an explanatory diagram illustrating still another exemplary captured image employed in Experiment 2 in the present invention.

Document images of FIGS. 23 to 27 captured by the mobile phone digital camera were employed as queries for retrieval. The document images of FIGS. 24 to 26 led to successful retrieval, while the document images of FIGS. 23 and 27 led to unsuccessful retrieval. A reason for the unsuccessful retrieval with the document image of FIG. 23 is that words in the input image cannot be isolated from each other with an excessively low resolution, making it impossible to correctly extract feature points. A reason for the unsuccessful retrieval with the document image of FIG. 27 is that the photographing range of the image is excessively small, making it impossible to correctly define nearest points. Even if the mobile phone digital camera having a lower resolution is used, the retrieval is possible though requiring adjustment of the photographing range.

The experiments described above show that a document image can be retrieved with high accuracy by the document image retrieval method which employs a document image captured by a digital camera as a query and employs the voting process using cross-ratios and a hash table. It is also found that even a document image captured by a mobile phone digital camera having a lower resolution can be employed for the retrieval though the photographing range should be adjusted.

Exemplary Experiments for Embodiment 2

Outline of Experiments

Figure 32:
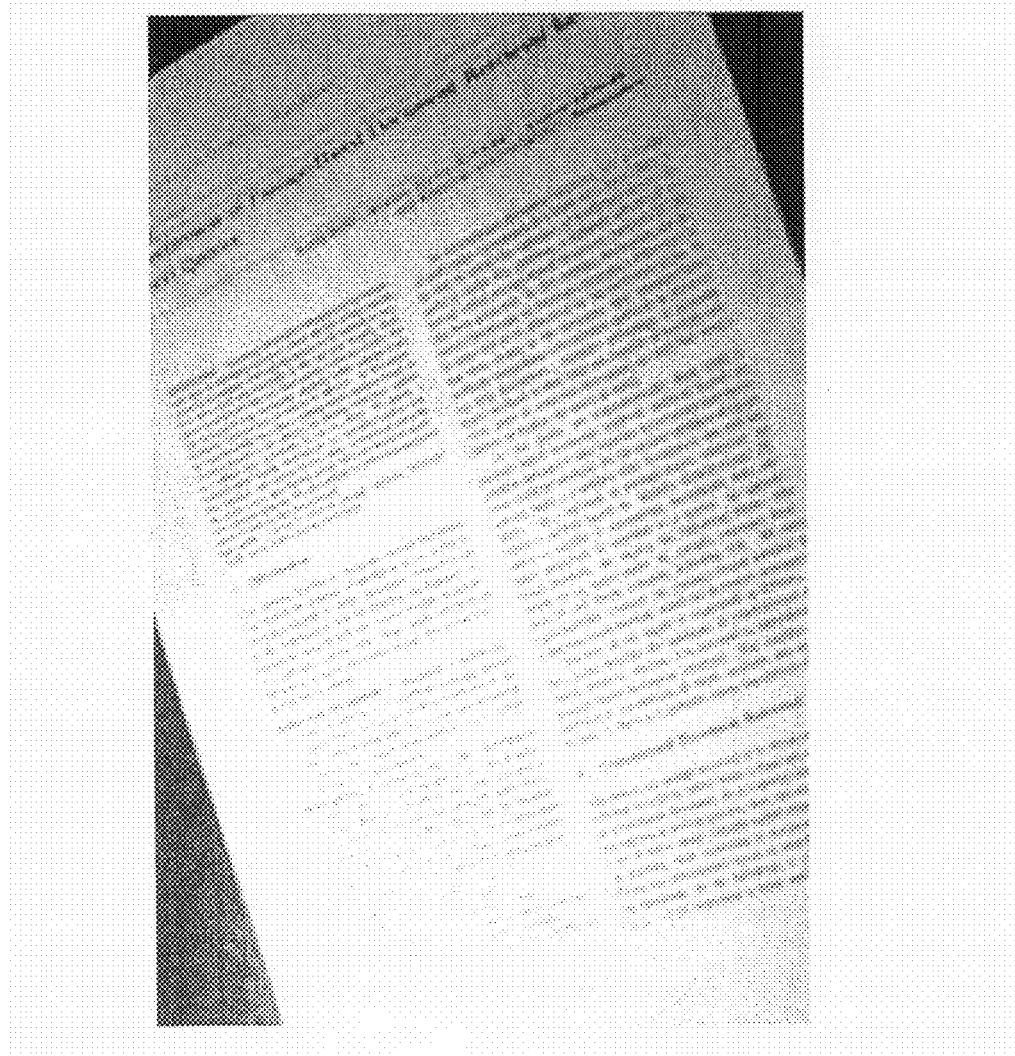
FIG. 32 is an explanatory diagram illustrating an exemplary captured image employed in Experiment 3 in the present invention.

In order to verify the effectiveness of the method according to Embodiment 2, relationships between retrieval accuracy and the size of a database and between the database size and a retrieval speed were determined. Queries were prepared by photographing documents askew as shown in FIG. 32 with the use of a digital camera CANON EOS Kiss Digital (6.3 million pixels) with a lens EF-S 18-55 mm USM. The number of the queries was 50. On the other hand, 10,000 document images prepared by conversion from PDF files of various English papers were stored in a document image database. Examples of the document images in the database are shown in FIGS. 17 and 18. In the experiments, the processing parameters were set as follows: m=8, m=7, k=10 and $H_{size}$=1.28×

$10^8$. In the experiments, a computer having an AMD Opteron (stored trade mark) CPU (1.8 GHz) and a memory (4 GB) was used.

Experiment 3: Retrieval Accuracy

Figure 33:
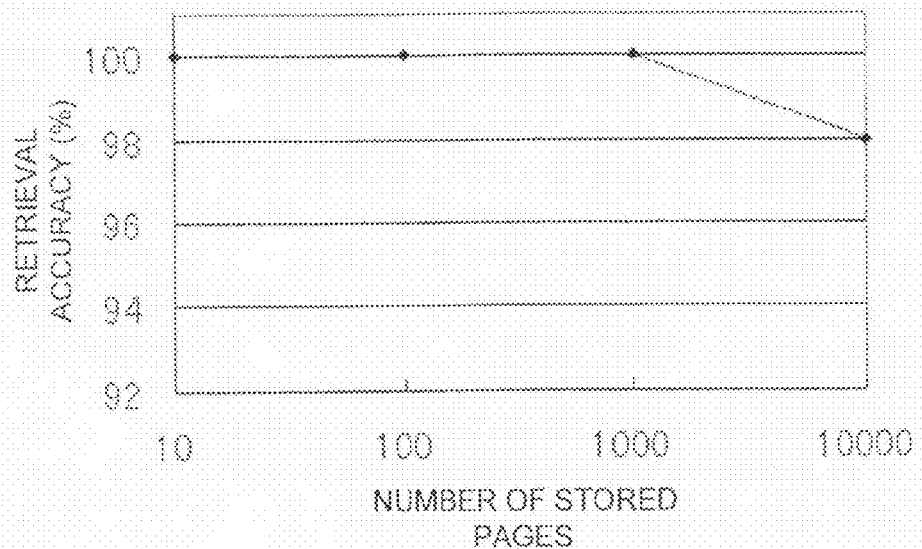
FIG. 33 is a graph illustrating a relationship between the number of pages stored in a database and retrieval accuracy, which was determined in Experiment 3 in the present invention.
Figure 34:
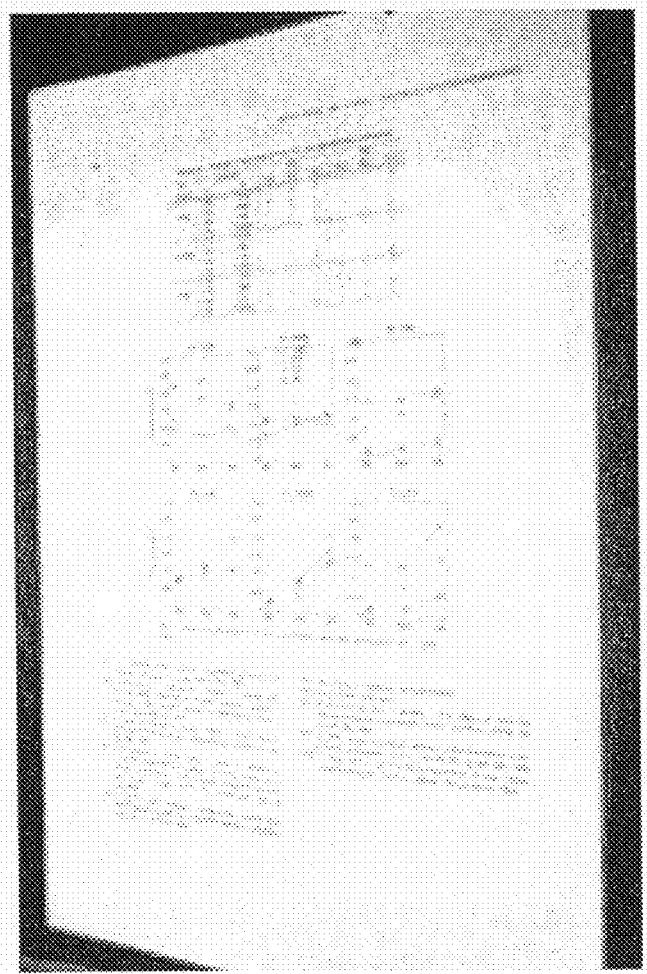
FIG. 34 is an explanatory diagram illustrating an exemplary query employed in Experiment 3 in the present invention.

A relationship between the number of pages stored in the database and the retrieval accuracy was determined. The result of the experiment is shown in FIG. 33, which indicates that the accuracy is reduced as the number of pages increases.

Where the number of pages in the database was 10,000, correct document images retrieved with 49 queries out of the 50 queries each had the largest number of votes. Therefore, the retrieval accuracy was 98%. A correct document image to be retrieved with the other query had the fifth largest number of votes. An average retrieval time was 137.7 ms. An image of the query leading to unsuccessful retrieval in which the correct document image did not have the largest number of votes is shown in FIG. 34. Like this query image, a query image which is mostly occupied by a table/drawing region and includes a smaller text region leads to unsuccessful retrieval. This is supposedly because, if a query image has a smaller number of feature points, a correct document image to be retrieved cannot acquire a sufficient number of votes.

Experiment 4: Retrieval Time

Figure 35:
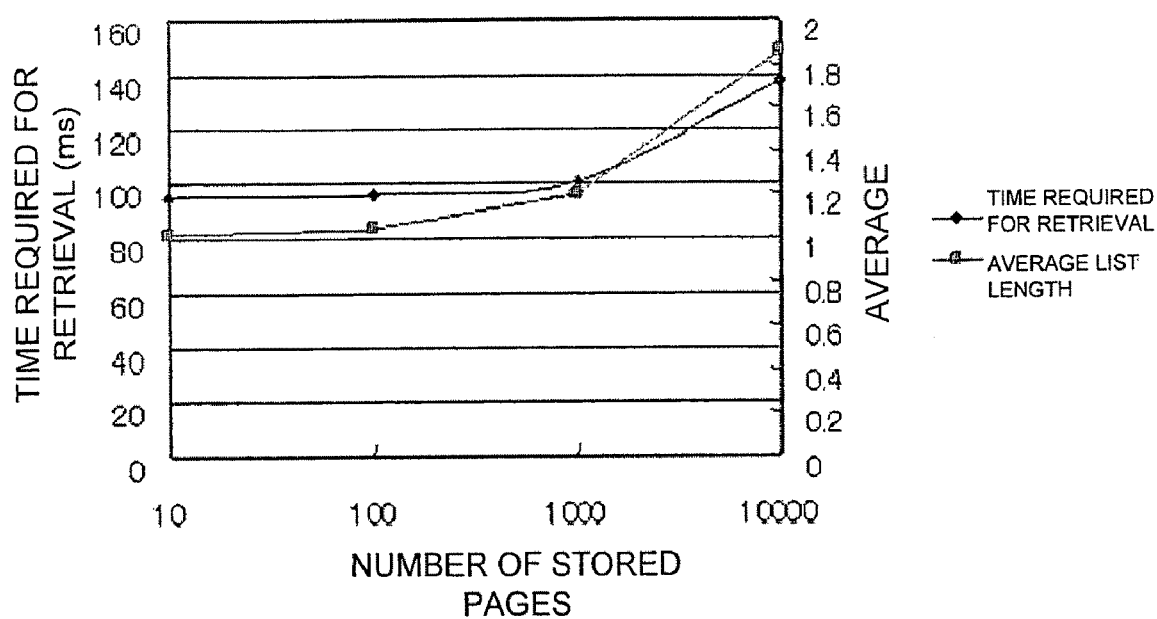
FIG. 35 is a graph illustrating a relationship between the number of pages stored in a database and time required for retrieval, which was determined in Experiment 4 in the present invention.

Next, how the number of the stored pages influences the retrieval time was determined. The result is shown in FIG. 35, which indicates that the retrieval time is gradually increased as the number of the stored documents increases. An average list length in the hash table is also shown in FIG. 35. The average list length is herein defined as the average of the non-zero list lengths contained in the hash table. The fact that the average list length is increased with an increase in the number of stored pages indicates that the number of collisions is increased. This is supposedly a reason for the increase in the retrieval time.

Other Exemplary Experiments

A. Retrieval Performance With Cross-Ratios

In order to precisely evaluate the performance of the document image indexing with the cross-ratios and the retrieval, experiments were performed by variously setting the parameters.

Figure 45:
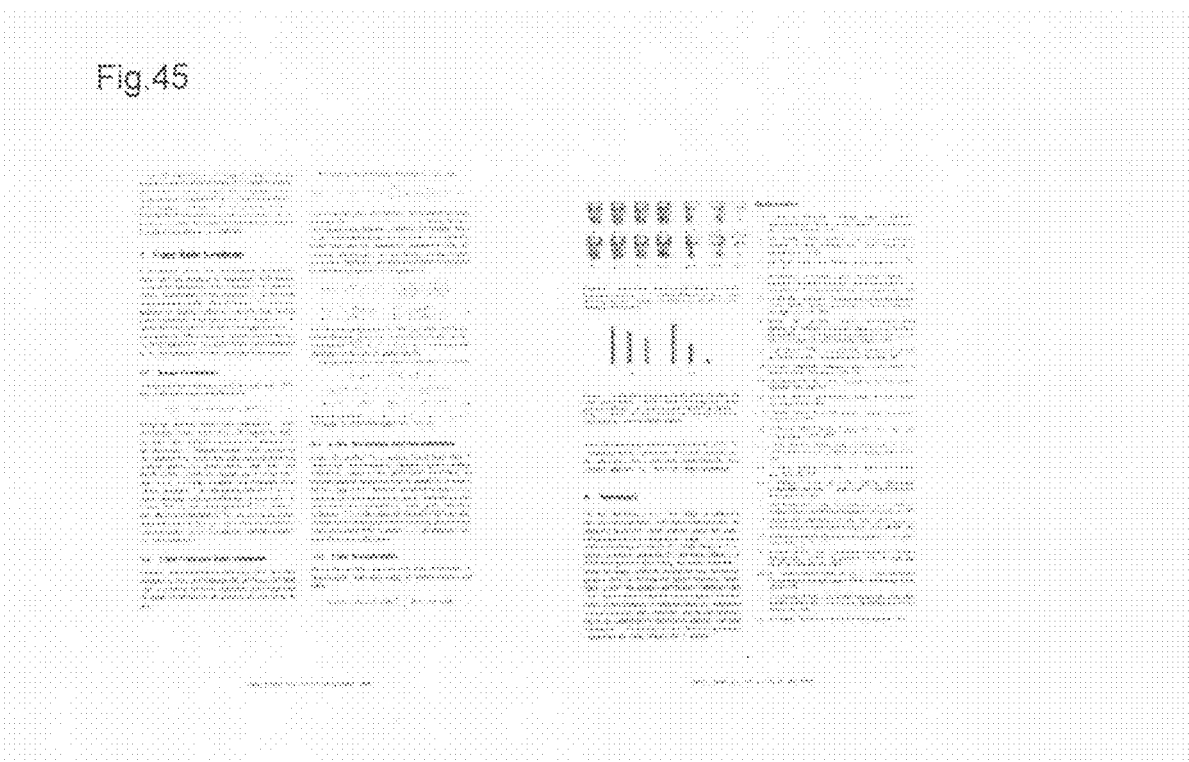
FIG. 45 is explanatory diagrams illustrating exemplary documents stored in a database (an experiment in Embodiment 2).

In the experiments, databases of document images prepared by conversion of PDF files of English papers as shown in FIG. 45 and queries prepared by photographing printed documents by a digital camera were used. Databases A, B, C and D containing 10 document images, 100 document images, 1,000 document images and 10,000 document images, respectively, were used as the document image databases. The database C was incorporated as a part of the database D, and the database B was incorporated as a part of the database C. Further, the database A was incorporated as a part of the database B. PDF files for proceedings of international conferences having similar layouts such as CVPR, ICPR and ICCV were used as the PDF files.

Figure 46:
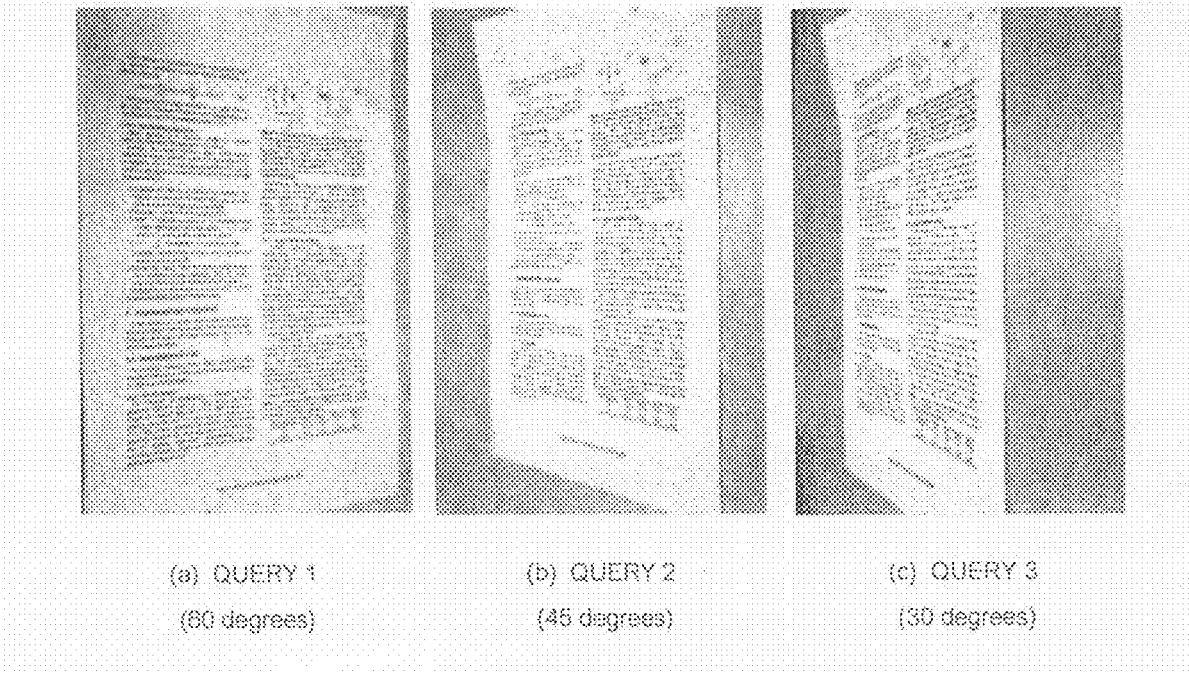
FIG. 46 is explanatory diagrams illustrating exemplary queries (another experiment).

Images of queries 1, 2 and 3 prepared by photographing documents printed from the database B at angles of about 60 degrees, about 45 degrees and about 30 degrees, respectively, were used as the queries. The number of images of each of the queries 1, 2, 3 was 100. Examples of the queries are shown in FIG. 46. A CANON EOS Kiss Digital (6.3 million pixels) with a lens EF-S 18-55 mm USM was used for the preparation of the query images. The size of a hash table used in the experiments was $H_{size} = 2^{27} - 1$. A computer having an AMD Opteron CPU (1.8 GHz) and a memory (6 GB) was used.

Experiment 1: Relationships Between Parameters n, m and Performance

Performance provided by the inventive method varies depending on the parameters n, m which determine the number of sets of feature points to be used for the calculation of the features. The retrieval accuracy, the processing time, and the required storage capacity were determined by variously setting the combination of the parameters n, m. In the experiment, the database B and the queries 1 to 3 were used. The results of the experiment are shown in Tables 2 to 4, which are based on the different photographing angles.

TABLE 2

(Photographing angle of 60 degrees)

| n | m | $_nC_m$ | $_mC_5$ | K | Accuracy (%) | Processing time (msec) | Number of lists | l |
|---|---|---|---|---|---|---|---|---|
| 6 | 6 | 1 | 6 | 30 | 90 | 18.7 | $6.7 \times 10^4$ | 1.38 |
| 7 | 6 | 7 | 6 | 40 | 79 | 53.4 | $4.7 \times 10^5$ | 1.82 |
|   | 7 | 1 | 21 | 5 | 100 | 28.3 | $6.7 \times 10^4$ | 1.15 |
| 8 | 6 | 28 | 6 | 150 | 53 | 133.2 | $1.9 \times 10^6$ | 1.11 |
|   | 7 | 8 | 21 | 12 | 100 | 122.9 | $5.3 \times 10^5$ | 1.02 |
|   | 8 | 1 | 56 | 5 | 99 | 53.3 | $6.7 \times 10^4$ | 1.00 |
| 9 | 6 | 84 | 6 | 240 | 10 | 372.0 | $5.6 \times 10^6$ | 1.11 |
|   | 7 | 36 | 21 | 24 | 100 | 502.2 | $2.4 \times 10^6$ | 1.02 |
|   | 8 | 9 | 56 | 8 | 99 | 366.0 | $6.0 \times 10^5$ | 1.00 |
|   | 9 | 1 | 126 | 5 | 74 | 111.4 | $6.7 \times 10^4$ | 1.00 |
| 10 | 6 | 210 | 6 | 120 | 5 | 1408.3 | $1.4 \times 10^7$ | 1.86 |
|   | 7 | 120 | 21 | 21 | 100 | 1662.1 | $8.0 \times 10^6$ | 1.05 |
|   | 8 | 45 | 56 | 6 | 100 | 1784.7 | $3.0 \times 10^6$ | 1.02 |
|   | 9 | 10 | 126 | 2 | 100 | 994.9 | $6.7 \times 10^5$ | 1.01 |
|   | 10 | 1 | 252 | 2 | 98 | 229.0 | $6.7 \times 10^4$ | 1.00 |

TABLE 3

(Photographing angle of 45 degrees)

| n | m | $_nC_m$ | $_mC_5$ | k | Accuracy (%) | Processing time (msec) | Number of lists | l |
|---|---|---|---|---|---|---|---|---|
| 6 | 6 | 1 | 6 | 30 | 28 | 18.8 | $6.7 \times 10^4$ | 1.38 |
| 7 | 6 | 7 | 6 | 40 | 12 | 53.8 | $4.7 \times 10^5$ | 1.82 |
|   | 7 | 1 | 21 | 8 | 80 | 27.9 | $6.7 \times 10^4$ | 1.03 |
| 8 | 6 | 28 | 6 | 180 | 8 | 131.7 | $1.9 \times 10^6$ | 1.08 |
|   | 7 | 8 | 21 | 14 | 99 | 123.8 | $5.3 \times 10^5$ | 1.01 |
|   | 8 | 1 | 56 | 5 | 70 | 53.7 | $6.7 \times 10^4$ | 1.00 |
| 9 | 6 | 84 | 6 | 90 | 6 | 542.1 | $5.6 \times 10^6$ | 1.83 |
|   | 7 | 36 | 21 | 24 | 100 | 506.4 | $2.4 \times 10^6$ | 1.02 |
|   | 8 | 9 | 56 | 5 | 99 | 368.4 | $6.0 \times 10^5$ | 1.00 |
|   | 9 | 1 | 126 | 5 | 22 | 112.4 | $6.7 \times 10^4$ | 1.00 |
| 10 | 6 | 210 | 6 | 150 | 7 | 1215.0 | $1.4 \times 10^7$ | 1.58 |
|   | 7 | 120 | 21 | 21 | 100 | 1673.8 | $8.0 \times 10^6$ | 1.05 |
|   | 8 | 45 | 56 | 6 | 100 | 1803.9 | $3.0 \times 10^6$ | 1.02 |
|   | 9 | 10 | 126 | 2 | 100 | 997.7 | $6.7 \times 10^5$ | 1.01 |
|   | 10 | 1 | 252 | 2 | 70 | 230.8 | $6.7 \times 10^4$ | 1.00 |

TABLE 4

(Photographing angle of 30 degrees)

| n | m | $_nC_m$ | $_mC_5$ | k | Accuracy (%) | Processing time (msec) | Number of lists | l |
|---|---|---|---|---|---|---|---|---|
| 6 | 6 | 1 | 6 | 40 | 5 | 20.6 | $6.7 \times 10^4$ | 1.18 |
| 7 | 6 | 7 | 6 | 40 | 3 | 60.3 | $4.7 \times 10^5$ | 1.82 |
|   | 7 | 1 | 21 | 8 | 7 | 31.3 | $6.7 \times 10^4$ | 1.03 |
| 8 | 6 | 28 | 6 | 180 | 4 | 147.7 | $1.9 \times 10^6$ | 1.08 |
|   | 7 | 8 | 21 | 15 | 12 | 138.1 | $5.3 \times 10^5$ | 1.01 |
|   | 8 | 1 | 56 | 9 | 6 | 60.1 | $6.7 \times 10^4$ | 1.00 |
| 9 | 6 | 84 | 6 | 90 | 5 | 611.0 | $5.6 \times 10^6$ | 1.83 |
|   | 7 | 36 | 21 | 22 | 25 | 566.6 | $2.4 \times 10^6$ | 1.02 |

TABLE 4-continued (Photographing angle of 30 degrees)

| n | m | $_nC_m$ | $_mC_5$ | k | Accuracy (%) | Processing time (msec) | Number of lists | l |
|---|---|---|---|---|---|---|---|---|
|   | 8 | 9 | 56 | 5 | 20 | 413.3 | $6.0 \times 10^5$ | 1.01 |
|   | 9 | 1 | 126 | 5 | 1 | 125.6 | $6.7 \times 10^4$ | 1.00 |
| 10 | 6 | 210 | 6 | 210 | 4 | 1183.4 | $1.4 \times 10^7$ | 1.31 |
|   | 7 | 120 | 21 | 24 | 39 | 1885.0 | $8.0 \times 10^6$ | 1.04 |
|   | 8 | 45 | 56 | 6 | 45 | 2019.4 | $3.0 \times 10^6$ | 1.02 |
|   | 9 | 10 | 126 | 3 | 18 | 1115.3 | $6.7 \times 10^5$ | 1.00 |
|   | 10 | 1 | 252 | 2 | 4 | 258.1 | $6.7 \times 10^4$ | 1.00 |

The accuracy is herein defined as the ratio of the number of document images which each match the query and have the largest number of votes, and the processing time is herein defined as time required for the retrieval process excluding the feature point extraction process. The number of lists is defined as the total number of lists (each including a set of a document ID, a point ID and a cross-ratio sequence cr(0), . . . , cr($_mC_5$–1) as shown in FIG. 29) stored in the hash table, and l is an average of nonzero list lengths in the hash table. In Tables 2 to 4, results each obtained by employing a value of k providing the highest accuracy for each combination of n and m are shown. For reference, the numbers $_nC_m$ and $_mC_5$ for combinations of n and m are also shown. First, the accuracy is examined.

Figure 47:
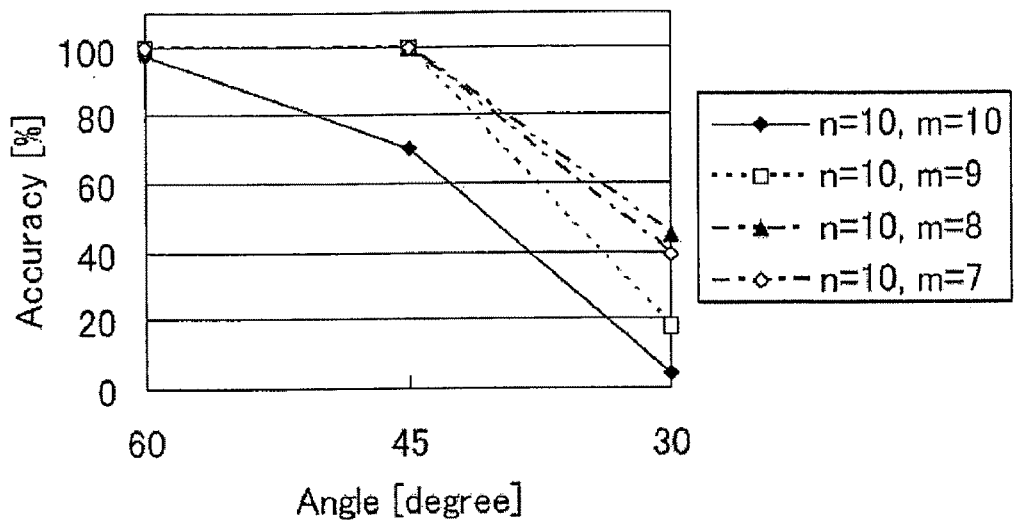
FIG. 47 is a graph illustrating a relationship between a photographing angle and retrieval accuracy (further another experiment).
Figure 48:
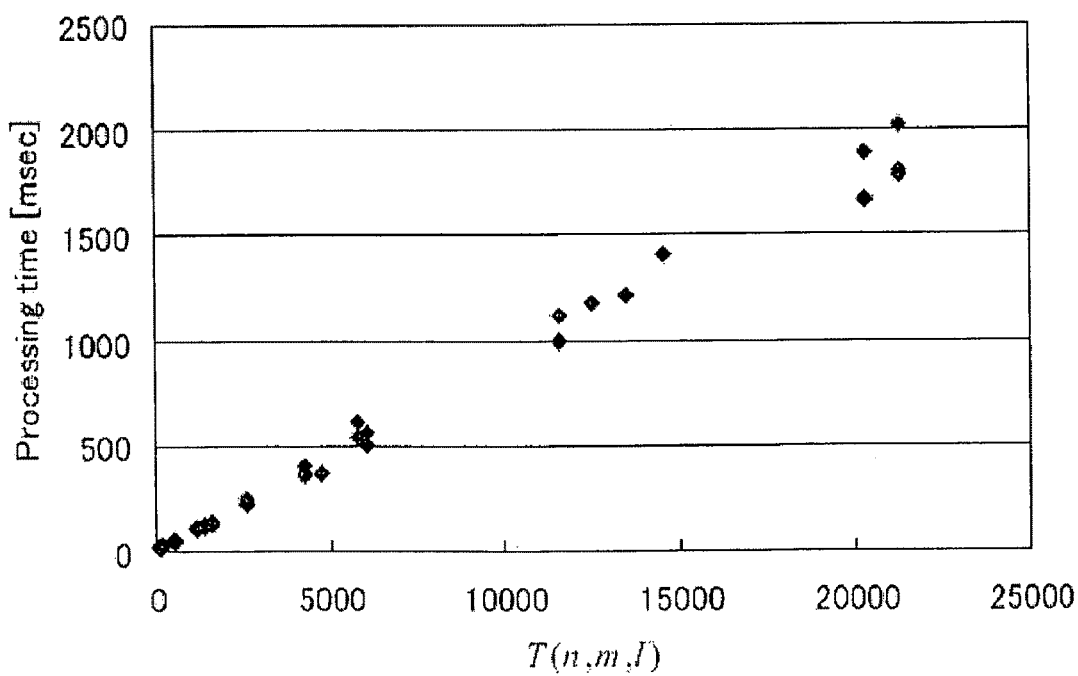
FIG. 48 is a graph illustrating a relationship between processing time and T(n,m,l) as an indication of the processing time (still another experiment).

In general, the accuracy is reduced as the photographing angle reduces. This is supposedly because greater perspective distortion leads to a greater change in nearest points, making it impossible to ensure the stability of the features. However, as shown in FIG. 47, the reduction of the accuracy is suppressed if a difference between n and m is greater. This is because the difference n–m is equivalent to the number of allowable missing feature points. Next, the processing time is examined. In view of the configuration of the retrieval algorithm shown in FIG. 44, it is supposed that the processing time is determined by the time required for the calculation of the features, the time required for the list process and the number of iterations. The time required for the calculation of the features is generally proportional to the number of the cross-ratios $_mC_5$ for the features, and the time required for the list process is proportional to the average list length l. The number of iterations is $_nC_m \times m$. Therefore, the processing time is herein defined as T(n,m,l) based on the parameters n, m and the average list length l by the following equation (5):

[Equation 14]

$$T(n,m,l) = {_nC_m} \cdot m \cdot ({_mC_5} + \alpha \cdot l) \quad (5)$$

wherein α is a weight of the list process time with respect to the feature calculation time. A graph of T(n,m,l) versus the processing time obtained when α=3 is shown in FIG. 48. As can be understood from FIG. 48, T(n,m,l) is generally proportional to the processing time. Therefore, the processing time is supposedly influenced by n, m, l as indicated by the equation (5). Finally, the required storage capacity is examined. In Tables 2 to 4, the number of the lists stored in the hash table is proportional to $_nC_m$. This is because features are stored for each point. As described above, it is necessary to increase the value n–m to ensure the higher stability, but this correspondingly increases the required storage capacity.

Figure 49:
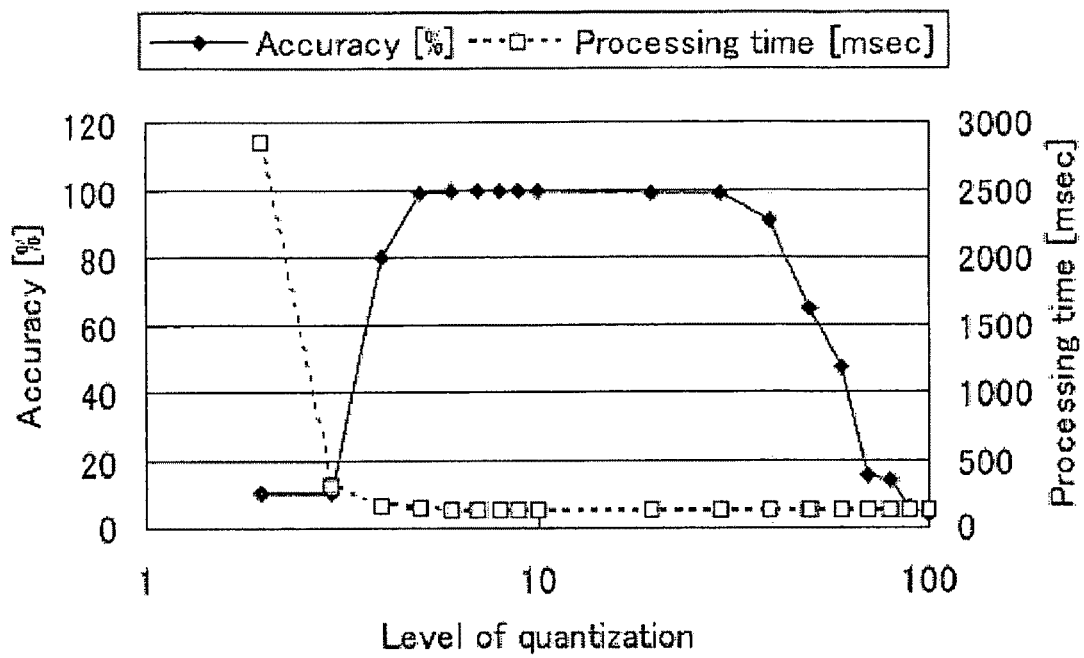
FIG. 49 is a graph illustrating relationships between the number of quantization levels and retrieval accuracy and between the number of the quantization levels and processing time (further another experiment).

Experiment 2: Relationship Between Number of Quantization Levels and Performance Performance provided by the inventive method varies depending on the number of the quantization levels k. Relationships between k and the accuracy and between k and the processing time were determined by employing the database B and the query 1 and setting the parameters to n=8 and m=7. The results are shown in FIG. 49. First, the accuracy is examined. The accuracy is lower when k is smaller, and steeply increases with an increase in k. This is supposedly because the discriminability of the features is lower when k is smaller, failing to ensure proper discrimination between a matching document and a non-matching document. When k is excessively great, the accuracy is steeply reduced. This is supposedly because the stability of the features is reduced. Next, the processing time is examined. The processing time is first steeply reduced with an increase in k, and then kept generally constant. This is supposedly because the discriminability of the features is lower when k is smaller and collisions frequently occur in the hash table to result in increased hash access time in the retrieval process. Therefore, the number k should be properly set in order to ensure higher-speed and higher-accuracy retrieval.

Figure 50:
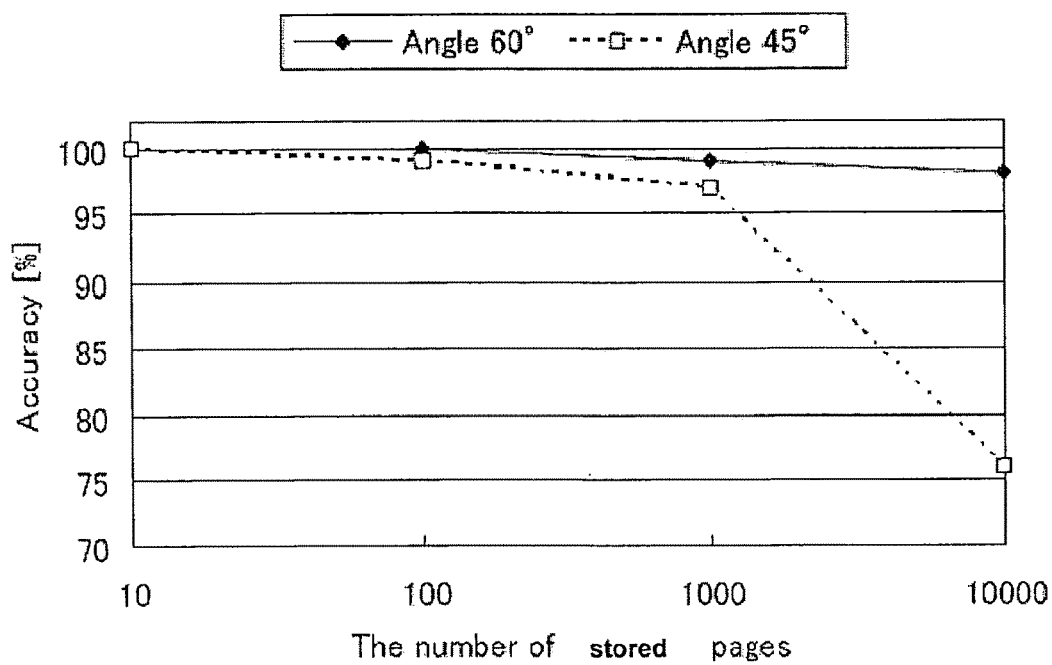
FIG. 50 is a graph illustrating a relationship between the number of stored pages and retrieval accuracy (still another experiment).

Experiment 3: Relationship Between Number of Stored Pages and Retrieval Accuracy A relationship between the number of stored pages and the retrieval accuracy was determined by variably setting the number of stored pages between 10 and 10,000 by employing the databases A to D. The queries 1 and 2 were employed as the queries. The parameters were set to n=8 and m=7 for both of the queries. At this time, the number k was set as shown in Tables 2 and 3. The results of the experiment are shown in FIG. 50.

Figure 51:
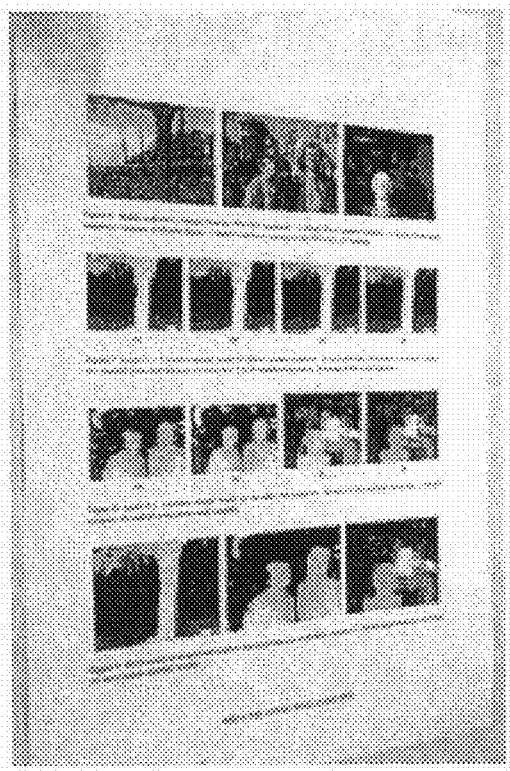
FIG. 51 is an explanatory diagram illustrating an exemplary query which leads to unsuccessful retrieval (further another experiment).

The accuracy is reduced with an increase in the number of pages. This is supposedly because the possibility that different documents having the same features are stored is increased when the database has a greater size. The accuracy of the retrieval with the query 2 is lower than the accuracy of the retrieval with the query 1. This is supposedly because the nearest points are significantly changed due to a greater perspective distortion to make it difficult to ensure the stability of the features. An exemplary query image which leads to unsuccessful retrieval is shown in FIG. 51. Like this query image, a query image which is mostly occupied by a table/drawing region and includes a smaller text region leads to unsuccessful retrieval. This is supposedly because the number of extracted feature points is smaller, and therefore, a matching document cannot acquire a sufficient number of votes in the retrieval.

Experiment 4: Relationship Between Number of Stored Pages and Processing Time

Figure 52:
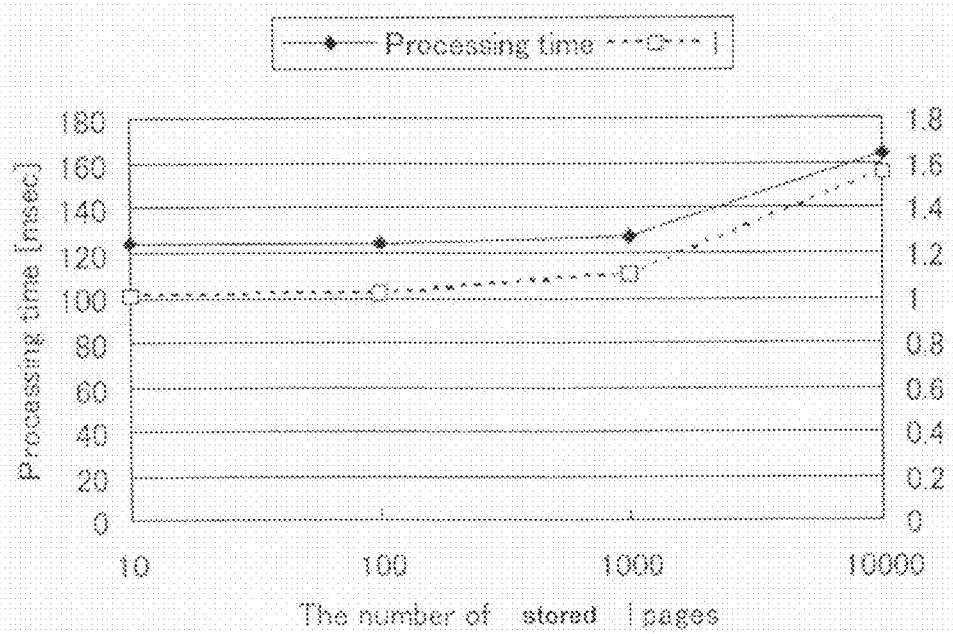
FIG. 52 is a graph illustrating relationships between the number of stored pages and a retrieval speed and between the number of the stored pages and a list length (still another experiment).

How the number of stored pages influences the processing time was determined. The databases A to D and the query 1 were employed, and the parameters were set as follows: n=8, m=7 and k=12. The results are shown in FIG. 52. The processing time is gradually increased with an increase in the number of stored documents. As previously described, the processing time is influenced by the parameters n, m and the average list length l. In this experiment, the parameters n, m were fixed. The average list length l is shown in FIG. 52. The average list length is increased with an increase in the number of stored pages, indicating that collisions frequently occur in the hash table. This is supposedly a reason for the increase in the processing time.

B. Similarity Transformation
Outline of Experiments

Figure 53:
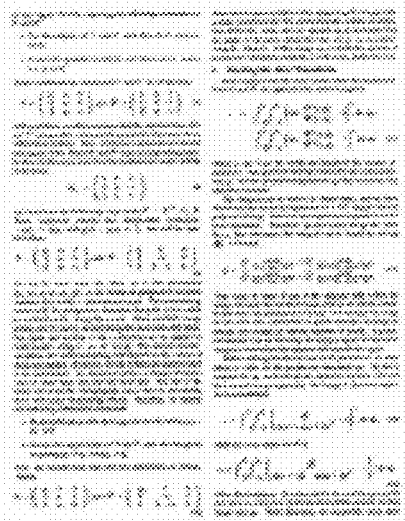
FIG. 53 is an explanatory diagram illustrating an exemplary document stored in a database (further another experiment).
Figure 54:
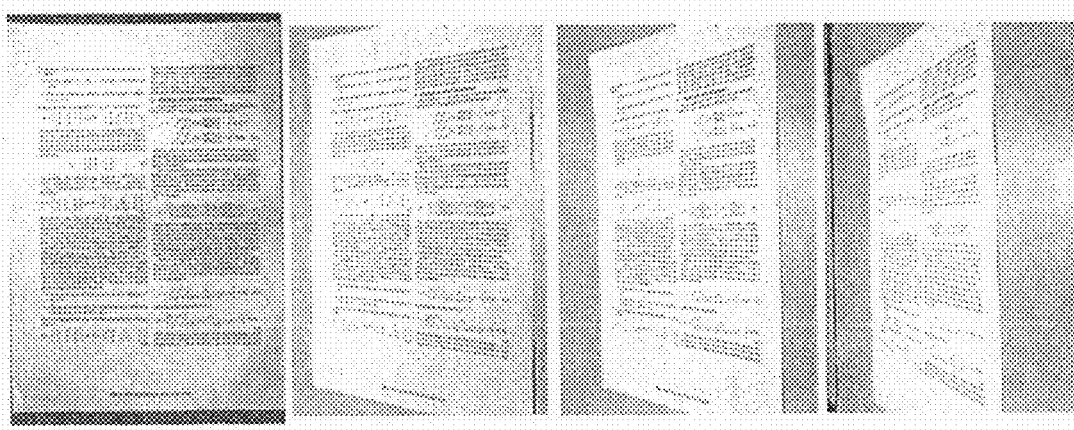
FIG. 54 is explanatory diagrams illustrating exemplary queries (still another experiment).

In order to verify the effectiveness of the similarity-invariant in the present invention, comparative experiments were performed for the retrieval accuracy and the processing time. In the experiments, databases of document images prepared by conversion of electronic documents of English papers as shown in FIG. 53 and queries obtained by photographing printed documents by a digital camera were used. Databases A, B and C containing 100 document images, 1,000 document images and 10,000 document images, respectively, were used as the document image databases. The database B was incorporated as a part of the database C, and the database A was incorporated as a part of the database B. Electronic data of proceedings of international conferences having similar layouts such as CVPR, ICPR and ICCV were used as the electronic documents. Query images which were prepared by photographing documents printed from the database A at angles of about 90 degrees, about 60 degrees, about 45 degrees and about 30 degrees, respectively, with respect to paper faces were used as the queries. The number of query images was 100 for each photographing angle. Examples of the query images are shown in FIG. 54. A CANON EOS Kiss Digital (6.3 million pixels) with a lens EF-S 18-55 mm USM was used for the preparation of the query images. The size of a hash table used in the experiments was $H_{size}=2^{27}-1$. A computer having an AMD Opteron CPU (2.8 GHz) and a memory (16 GB) was used.

Experiment 1: Relationship Between Photographing Angle and Retrieval Accuracy

First, a relationship between the photographing angle of the query image and the retrieval accuracy was determined when the cross-ratios or the similarity-invariant values were used for the calculation of the feature. In the inventive method, the performance varies depending on the values of the parameters n, m which determine the number of the sets of feature points for the calculation of the feature, and the number of the levels k for the quantization of the invariant values. In this experiment, a value of k providing the highest accuracy for combinations of n and m (n=10, m=10, 9, 8, 7) was employed. Further, the queries having photographing angles of 90 degrees to 30 degrees and the database A containing 100 document images were employed.

FIG. 55 illustrates relationships between the photographing angle and the retrieval accuracy for the respective combinations of n and m for (a) the cross-ratio and (b) the similarity-invariant. As can be understood from FIG. 55(a)(b), the accuracy is generally reduced with a reduction in the angle. This is supposedly because the arrangement of nearest feature points is changed due to a distortion, failing to satisfy the requirement that a match should be found in m points out of the n nearest points. However, where a difference between n and m is greater (e.g., n=10, m=7), the reduction in the accuracy is relatively small.

As shown in FIG. 55, the reduction in the accuracy with the reduction in the angle is smaller in the case of (a) the cross-ratio, and greater in the case of (b) the similarity-invariant. This is supposedly because of the nature of the invariant as will be described below. The cross-ratio is a projection-invariant and, therefore, kept unchanged with respect to changes in the positions of feature points occurring due to the perspective distortion. However, the cross-ratio is unstable with respect to changes not attributable to the perspective distortion. In the inventive method, centroids of word regions are employed as the feature points and, if an image suffers from a perspective distortion, the positions of the feature points are changed. Therefore, when the image experiences a significant perspective distortion, the coordinates of the feature points are changed, so that the values of the cross-ratios calculated based on the feature points are changed to become unstable.

The similarity-invariant is stable in a local area in which a distortion is approximated to a distortion due to the similarity transformation. However, the similarity transformation is excessively restrictive and, if the perspective distortion is considerable, it is impossible to approximate the perspective distortion to the similarity distortion even in the local area. The considerable perspective distortion reduces the stability of the feature.

Experiment 2: Relationship Between the Number of Stored Pages and Retrieval Accuracy Next, a relationship between the number of stored pages and the retrieval accuracy for each invariant was determined. The parameters were set to n=8 and m=7, and a value of k providing the highest accuracy when the number of stored pages was 100 was employed. The results are shown in Table 5. As in Experiment 1, the retrieval accuracy is reduced with a reduction in the photographing angle. Further, the accuracy is reduced with an increase in the number of stored pages. This is supposedly because the possibility that the documents having similar point arrangements are stored is increased with an increase in the number of stored pages. As in Experiment 1, the accuracy of the retrieval employing the cross-ratios is higher, and the accuracy of the retrieval employing the similarity-invariant is lower.

TABLE 5

| Number of stored pages | | 100 | 1,000 | 10,000 |
|---|---|---|---|---|
| | Retrieval accuracy (%) | | | |
| Cross-ratio | 90° | 99 | 99 | 98 |
| | 60° | 99 | 99 | 98 |
| | 45° | 98 | 97 | 72 |
| | 30° | 12 | 3 | 0 |
| Similarity-invariant | 90° | 100 | 99 | 98 |
| | 60° | 73 | 48 | 28 |
| | 45° | 3 | 1 | 0 |
| | 30° | 3 | 2 | 0 |
| | Processing time (msec) | | | |
| Cross-ratio | | 80.8 | 83.0 | 97.4 |
| Similarity-invariant | | 118.3 | 136.6 | 332.3 |

Experiment 3: Relationship Between the Number of Stored Pages and Processing Time A relationship between the number of stored pages and a processing time was determined for each invariant. The processing time is herein defined as time required for performing the retrieval process with each query image as shown in FIG. 44 and excluding time required for the preliminary feature point extraction process. The parameters were set in the same manner as in Experiment 2. As an example, the processing time required for the retrieval with the query images each having a photographing angle of 60 degrees is shown in Table 5.

Even if the photographing angle of the query image is changed, the processing time is generally constant. In general, the processing time is increased with an increase in the number of stored pages. This is supposedly because a greater volume of data stored in the hash table leads to a higher collision rate. The processing time is relatively short in the case of the cross-ratio, and relatively long in the case of the similarity-invariant. This is supposedly because of a difference in the number of computations $_mC_f$ of the invariant values for the calculation of the features. Where m=7, the number $_mC_f$ is increased with a reduction in f. Therefore, the processing time with f=5 is longer in the case of the similarity-invariant than in the case of the cross-ratio. The retrieval from the 10,000 stored pages requires significantly longer processing time in the case of the similarity-invariant. This is supposedly because a smaller number of points are used for the calculation of the similarity-invariant and, therefore, the invariant values are liable to be discretized to the same level, resulting in a greater number of collisions in the hash table.

C. Images Other Than Documents

In order to verify the applicability of the inventive method to objects other than the documents, an experiment was performed by employing images obtained by photographing posters and front covers of magazines by a digital camera.

Outline of Experiment

Unlike the document images, images of the objects are processed for feature point processing by a PCA-SIFT method proposed in the following document (see, for example, Y. Ke and R. Sukthankar, PCA-SIFT: representation for local image descriptors, Proc. CVPR, Vol. 2, pages 506-513, 2004).

In the PCA-SIFT method, feature points are extracted from an image, and a d-dimensional characteristic vector $v=(v_1, \ldots, v_d)$ characterizing the feature points is determined. The feature points and the characteristic vector determined by the PCA-SIFT method are based on a SIFT method (see, for example, D. G. Lowe, Distinctive image features from scale invariant keypoints, International Journal of Computer Vision, Vol. 60, No. 2, pp. 91-110, 2004).

In this method, a vector v of real numbers obtained by the PCA-SIFT method is transformed into a bit vector $w=(w_1, \ldots, w_d)$ for use. Various transformation methods are conceivable. For example, a method such that $w_i=1$ if $v_i \geq 0$ and otherwise $w_i=0$ may be employed. This method will be described below.

Figure 56:
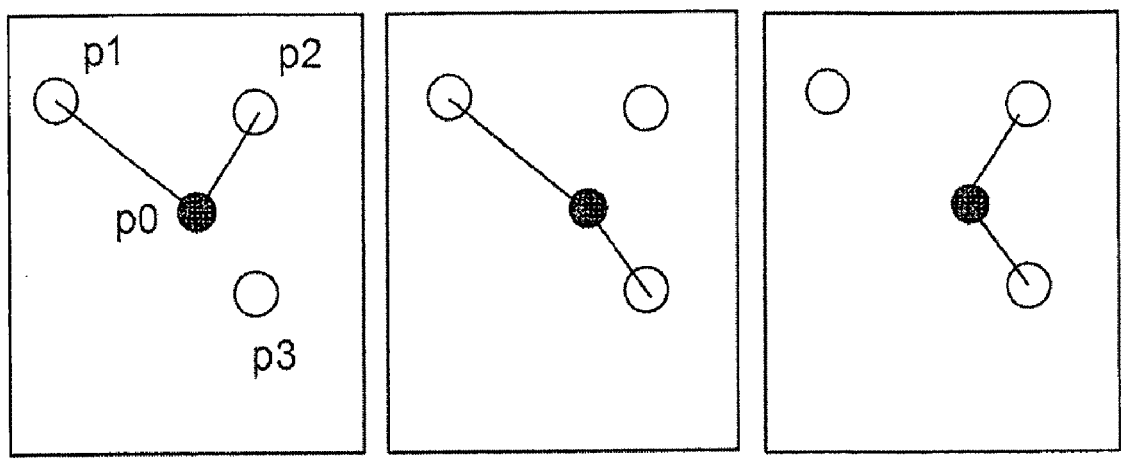
FIG. 56 is an explanatory diagram illustrating positional relationships of m points (m=2) out of n points (n=3) (still another experiment).

As in the processing of the document images, this method employs multiple feature points in combination. This is briefly shown in FIG. 56, in which a point $p_0$ is of interest, and the other points $p_1 \ldots$ are present around the point $p_0$. FIG. 56 shows two-point combinations of the three nearest points (n=3, m=2). Where the three points $p_0$, $p_1$ and $p_2$ are combined, bit vectors for the respective points are expressed as $w_0$, $w_1$ and $w_2$, and collectively expressed as $w_i=(w_{1i}, \ldots, w_{di})$. In this case, a characteristic vector $w_0'$ obtained as the result of the combination is a 3d-dimensional bit vector expressed as follows:

$$w_0'=(w_0, w_1, w_2)=(w_{10}, \ldots, w_{d0}, w_{11}, \ldots, w_{d1}, w_{12}, \ldots, w_{d2})$$

This vector is converted into an index of a hash table as in the processing of the document images. More specifically, an index $H_{index}$ is calculated from the following equation:

$$H_{index} = \left(\sum_{i=1}^{rd} w_i 2^{i-1}\right) \bmod H_{size} \quad \text{[Equation 15]}$$

wherein r is the number of feature points to be combined, and $H_{size}$ is the size of the hash table.

Experiment

In order to verify the effectiveness of this method, an experiment was performed. A computer including an AMD Opteron (2.8 GHz) and a memory (16 GB) was used. The number of dimensions of the characteristic vector of SIFT was 128, and the number of dimensions of PCA-SIFT was 36. In this method, the number of dimensions of the original bit vector $w_i$ was variably set in a range of 9<d<36 for producing combinations of bit vectors. This means that bit vectors $w_{i,1}$ to $w_{i,9}$ were employed if d=9. For combinations of points, the parameters n, m were variably set in ranges of 5<n<30 and 1<m<3. Consideration was also given to a special case in which no combination of the feature points was formed (n=0, m=0).

In the experiment, 40 planar objects were used. The objects include 5 posters and 35 front covers of a magazine named Comm. of the ACM. These objects were photographed by a camera (6.3 million pixels) to provide color images each having a size of 3042×2048. In this experiment, these color images are each converted into a 1024×683 grayscale image.

Images obtained by photographing the objects horizontally at three different angles (45 degrees, 60 degrees and 75 degrees) and images obtained by frontally photographing the objects and having two different sizes (a larger size and a smaller size) were prepared as query images. That is, five types of images including different views were prepared for each of the objects. The images except for the larger-size images each contained the entire object image. The larger-size images each contained about 50% of the entire object image. Since the 50 planar objects were photographed in five different ways, a total of 200 images were employed as the query images. Images obtained by photographing the objects at a photographing angle of 90 degrees and each having an intermediate size were stored in a database. Therefore, the images stored in the database differ from any of the query images.

An exemplary process according to this method is shown in FIG. 57. FIG. 57(a) shows one of the images in the database, and FIGS. 57(b) to (f) show how to correlate feature points in a query image (on an upper side) with feature points in the image in the database (on a lower side). In this example, correct images were successfully retrieved from the 40 images in the database.

In the experiment, the following two comparative methods were also employed:

(1) A method in which a 128-dimensional real number vector obtained by the SIFT method is employed as it is, and the retrieval from the database is based on the shortest Euclidean distance (hereinafter referred to as "SIFT method"); and (2) A method in which a 36-dimensional real number vector obtained by the PCA-SIFT method is employed, and the retrieval is based on the Euclidean distance (hereinafter referred to as "PCA-SIFT method").

The processing accuracy and the processing time are shown in Table 6.

TABLE 6

| Method | Accuracy (%) | Time/Query (msec) | | |
|---|---|---|---|---|
| | | Average | Maximum | Minimum |
| SIFT | 100 | $2.0 \times 10^5$ | $1.2 \times 10^6$ | $1.8 \times 10^4$ |
| PCA-SIFT | 100 | $2.6 \times 10^4$ | $1.6 \times 10^5$ | $2.3 \times 10^3$ |
| Inventive method (d = 24, n = 0, m = 0) | 89.0 | 26.3 | 170 | <10 |
| Inventive method (d = 16, n = 28, m = 1) | 90.5 | 61.2 | 380 | 10 |

The SIFT method and the PCA-SIFT method each provided a retrieval accuracy of 100%, but required tremendous processing time. The inventive method required drastically reduced processing time, while providing a processing accuracy of about 90%.

In the inventive method, two parameter settings (d=24, n=0, m=0) and (d=16, n=28, m=1) were employed. The latter setting for a retrieval process based on combinations of points provided an improved processing accuracy as compared with the former setting for a retrieval process based on no combination of the points.

The detail of unsuccessful retrieval is shown in Table 7.

TABLE 7

|  | d = 24, n = 0, m = 0 | d = 16, n = 28, m = 1 |
|---|---|---|
| Average rank of matching images in unsuccessful retrieval | 5.6 | 3.8 |
| Number of images erroneously retrieved | | |
| 45 degrees | 21 | 13 |
| 60 degrees | 1 | 0 |
| 75 degrees | 0 | 0 |
| Larger size | 0 | 0 |
| Smaller size | 0 | 6 |
| Average ratio of the number of votes | | |
| Successful retrieval | 10.18 | 7.08 |
| Unsuccessful retrieval | 1.14 | 1.18 |

The average rank of matching images in the unsuccessful retrieval was higher in the retrieval process based on the combinations of points (the parameter setting on the right) than in the retrieval process based on no combination of points (the parameter setting on the left). This indicates that the correct images were ranked high even in the unsuccessful retrieval. In the retrieval process based on the combinations of points, two thirds of the unsuccessful retrieval was attributable to the query images having a smaller photographing angle (45 degrees), and one third of the unsuccessful retrieval was attributable to the smaller-size query images. The query images captured at greater angles (60 degrees to 75 degrees) and the larger-size query images which are important in practical applications were free from erroneous retrieval. In Table 7, the average ratio of the largest number of votes to the second largest number of votes (average ratio of the number of votes) is also shown.

In the successful retrieval, the largest number of votes is seven times greater than the second largest number of votes. In the unsuccessful retrieval, on the other hand, the largest number of votes is only slightly greater than the second highest vote count. With reference to the ratio of the vote count, it is possible to predict whether or not a correct image is retrieval. By properly setting a threshold for the ratio, processing errors can be eliminated. In the aforesaid case, the processing accuracy was increased to 75% by setting a threshold such as to eliminate all the errors.

Exemplary Construction of Apparatus

Explanation will be given to an exemplary construction of an inventive document/image storage apparatus for storing a document/image in a document/image database. Explanation will also be given to an exemplary construction of an inventive document/image retrieval apparatus for retrieving a document/image from a document/image database in which documents and/or images are stored by the document/image storage apparatus.

Figure 39:
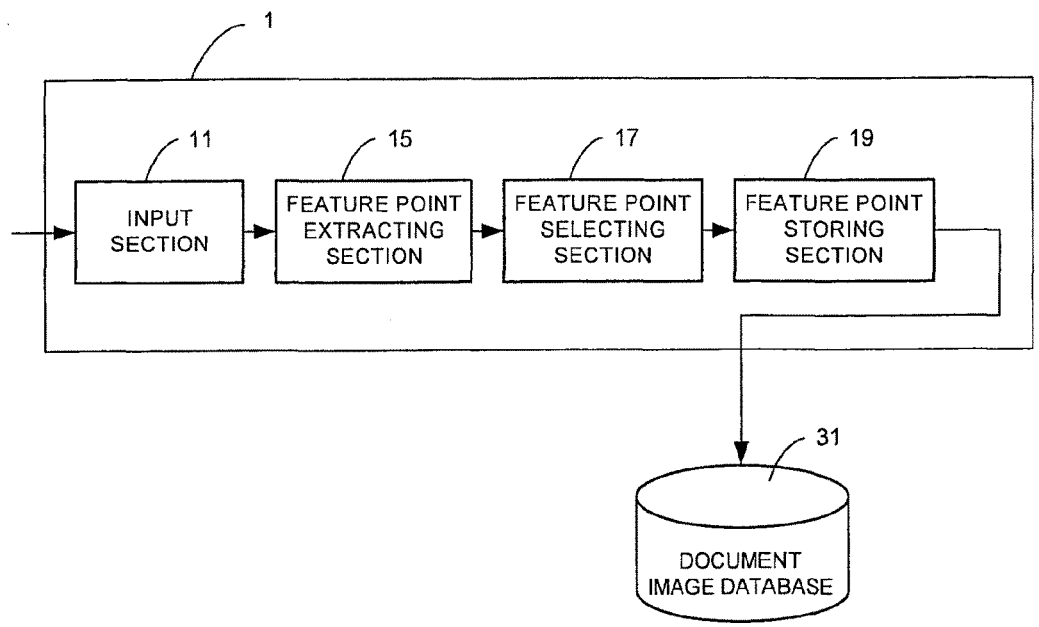
FIG. 39 is a block diagram illustrating the construction of a document/image storage apparatus according to the present invention.

FIG. 39 is a block diagram illustrating the construction of the inventive document/image storage apparatus 1. The document/image storage apparatus 1 includes an input section 11, a feature point extracting section 15, a feature point selecting section 17 and a feature point storing section 19. The input section 11 is a section which inputs a document/image to be stored. The feature point extracting section 15 is a section which extracts multiple feature points defining an image arrangement from the document/image. The feature point selecting section 17 is a section which selects n feature points nearest to each of the extracted feature points p. The feature point storing section 19 is a section which calculates an index of a hash table according to the storage process described in Embodiment 1 or Embodiment 2 for each of all possible sets of m points (m<n) selected from the selected n feature points, and stores the input document/image in the document image database 31.

Figure 40:
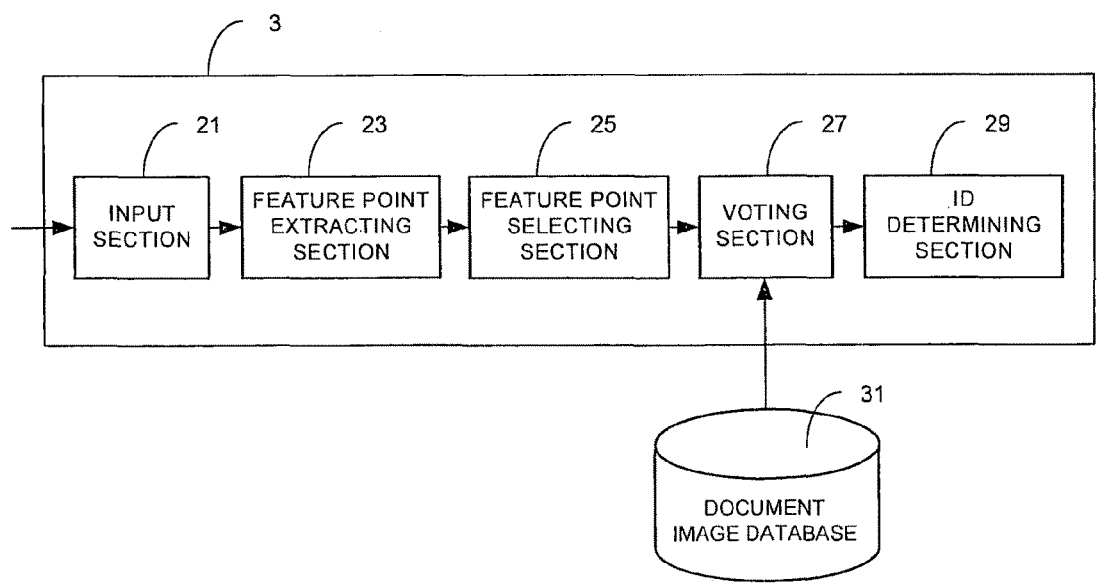
FIG. 40 is a block diagram illustrating the construction of the document/image retrieval apparatus according to the present invention.

FIG. 40 is a block diagram illustrating the construction of the inventive document/image retrieval apparatus. The retrieval apparatus 3 includes a reading section 21, a feature point extracting section 23, a feature point selecting section 25, a voting section 27 and an ID specifying section 29. The reading section 21 is a section which reads a captured image. The feature point extracting section 23 is a section which extracts multiple feature points defining an image arrangement from the read image, and corresponds to the feature point extracting section 15 in FIG. 39. The feature point selecting section 25 is a section which selects n feature points nearest to each of the extracted feature points p, and corresponds to the feature point selecting section 17 in FIG. 39. The voting section 27 is a section which casts a vote for a document ID having a matching feature according to the retrieval process described in Embodiment 1 or Embodiment 2. The ID specifying section 29 is a section which specifies a document ID of a document/image corresponding to the captured image based on the counts of votes cast for the respective feature points.

INDUSTRIAL APPLICABILITY

Link to Physical Object

According to the inventive image retrieval method, a link can be established between a physical object (a document, a brochure, a poster or a signboard) and electronic data (relevant information such as a homepage of the Internet), whereby the electronic data related to the physical object can be retrieved based on an image of the physical object. Where data of text media such as newspapers and magazine articles is stored in a server on the Internet, for example, a user can access the server on the Internet to acquire relevant data simply by capturing an image of any of the media. Therefore, the present invention is very effective in retrieving images of text media.

The present invention is also applicable to a catalog shopping system which establishes a link between advertising brochures and a homepage on the Internet. Further, the present invention may be employed for an application in which information relevant to the content of a poster is retrieved based on an image obtained by photographing the poster, or for an application in which information relevant to a signboard on a street is retrieved based on an image obtained by photographing the signboard. Further, the present invention may be employed for an application in which electronic data including information attached to map information (schematic map) is retrieved as relevant information.

In the links, the relevant information may include audible information and video information in addition to text information and graphic information.

A link may be established by a vender which provides a service, or privately established by an individual user. Where the user desires to correlate electronic data with a document, for example, the inventive method permits the user to establish a link between the electronic data and the document by using a camera.

Further, the real-time processing capability (high-speed processing capability) of the present invention makes it possible to display electronic data in overlap relation with an image of a physical object (a document, a brochure or a poster) viewed through a camera in real time. This is one form of information processing, which is called "intelligent information lens".

Link Between Physical Objects

As described above, the link can be established between the physical object and the electronic data. According to the inventive image retrieval method, it is also conceivable to establish a link between physical objects. Specific examples are as follows:

(1) When there are two relevant documents, the relevancy of these documents is recorded as desired.

(2) A person or a good (a product or the like) is recorded in relation to a physical object (a document, a brochure or a poster) as desired (a photograph of the person or the good is retrieved by photographing the document as desired). Such information processing is regarded as a process for establishing a link between physical objects via a photograph.

Application to Annotation Extraction System

Further, the inventive image retrieval method may be employed for incorporating annotation often made in a document into an electronic document.

Figure 37:
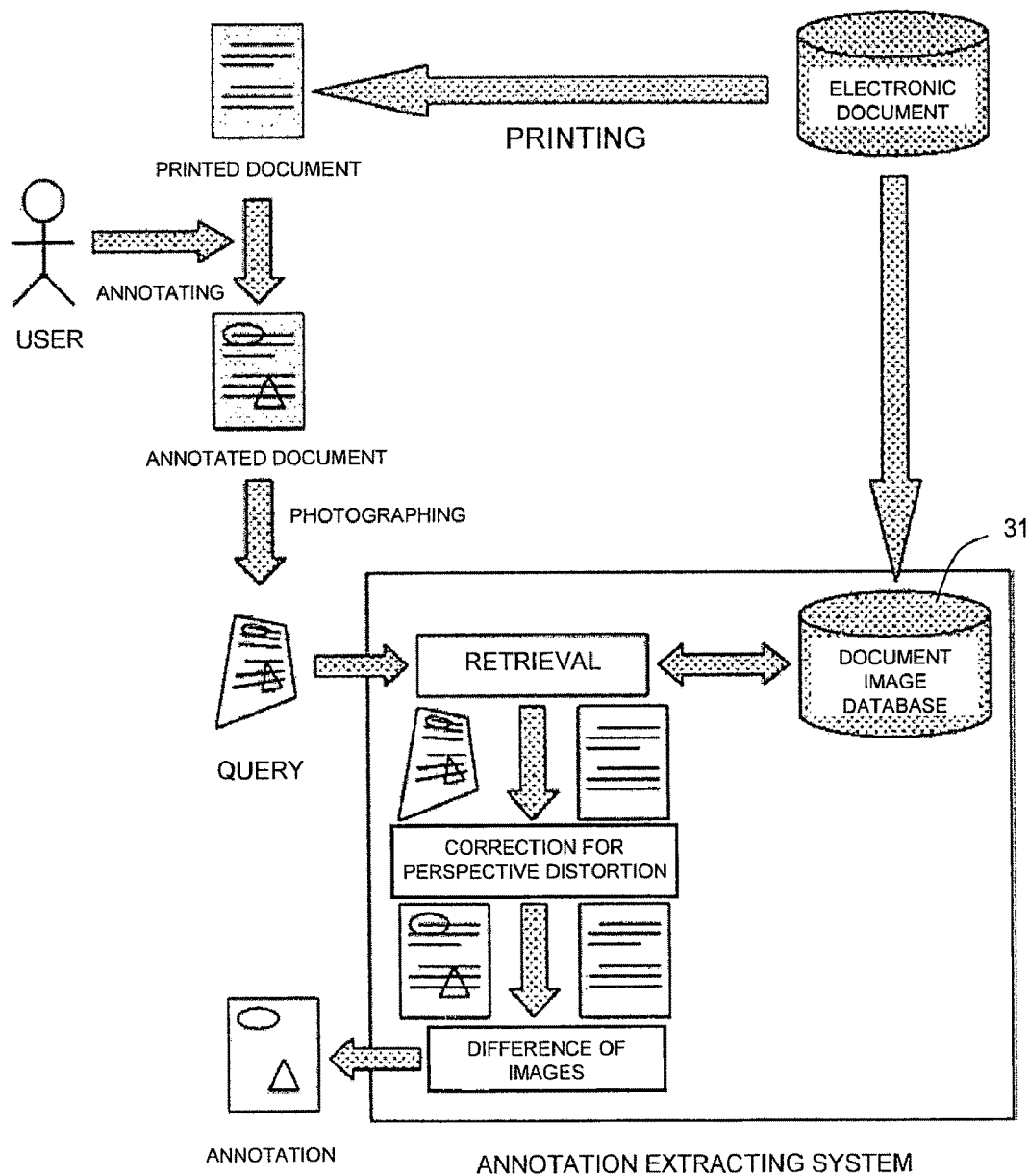
FIG. 37 is an explanatory diagram illustrating an exemplary construction of a system which is adapted to incorporate an annotation in a document into an electronic document.

FIG. 37 is an explanatory diagram illustrating an exemplary construction of a system for incorporating annotation made in a document into an electronic document. As shown in FIG. 37, the system is arranged as follows:

(1) A non-annotated document is stored as an original document in a database.

(2) An annotated document is photographed by a camera, and the non-annotated document is retrieved from the database by the inventive method. As a result, feature points in the non-annotated document are correlated with feature points in the annotated document.

(3) Based on the feature point correlation, an image obtained by photographing the annotated document by the camera is restored into a correct orientation (from an obliquely photographed state to the correct orientation). FIG. 38 is a diagram for explaining the process for restoring the image into the correct orientation.

(4) An image of an annotation is extracted by subtracting the image of the non-annotated document from the correctly oriented image.

(5) The annotation is incorporated into the electronic document by adding the extracted annotation image to the electronic document.

This makes it possible to utilize the paper document and the electronic document which are seamlessly linked to each other.

The inventive annotation extracting system may be linked not only to the digital camera but also to a copier or a scanner. An image captured by the copier or the scanner is subjected to geometric transformations such as a similarity transformation and an affine transformation, but not to the projective transformation generally experienced by an image captured by a camera. Therefore, the annotation extracting system may be arranged so as to use a similarity-invariant and an affine-invariant. Since the affine transformation and the similarity transformation are more restrictive than the projective transformation, the accuracy of the annotation extraction can be improved.

The invention claimed is:

1. A document and/or image retrieval method for retrieving a document and/or image corresponding to a captured digital image from a database by comparing features calculated based on feature points of the captured digital image with features calculated based on feature points of each of documents and/or images stored in the database, the method comprising:

extracting the feature points from the captured digital image;

defining a local set of feature points for each of the extracted feature points;

selecting subsets of feature points from the defined local set;

determining invariant values as values characterizing each selected subset for combinations of the feature points in the subset, the invariant values being invariant to a geometric transformation;

calculating a feature by combining the determined invariant values; and performing a voting process on the documents and/or images in the database based on the preliminarily calculated features of the documents and/or images;

so that the document and/or image corresponding to the captured digital image is retrieved from the database.

2. A document and/or image retrieval method according to claim 1, wherein the invariant values are cross-ratios.

3. A document and/or image retrieval method according to claim 1, wherein the invariant values are invariant to an affine transformation.

4. A document and/or image retrieval method according to claim 1, wherein the invariant values are invariant to a similarity transformation.

5. A document and/or image storage method, which causes a computer to execute the steps of: inputting a document and/or image; assigning an ID to the input document and/or image; extracting feature points defining an image arrangement from the input document and/or image; and performing a predetermined process on each of the extracted feature points; the predetermined process comprising the steps of:

(1) selecting n feature points which are nearest to a feature point p of interest; and (2) performing a predetermined process on each of all possible sets of m feature points, m<n, selected from the selected n feature points; the predetermined process in the performing step comprising the steps of:

(a) determining features, for each of which includes a set of invariant values, for all possible sets of d points, wherein d is a number not greater than a predetermined number m, selected from an m-point set of interest;

(b) determining an index of a hash table based on the determined features through a predetermined computation; and (c) storing the features in relation to a point ID and a document ID in the hash table, the features being determined in the features determining step using the determined hash index, the point ID being assigned to the feature point p and the document ID being assigned to the document and/or image from which the feature point p is extracted.

6. A document and/or image retrieval method for retrieving a document and/or image stored by a storage method as recited in claim 5, the retrieval method causing a computer to execute the steps of: reading a captured image; extracting feature points defining an image arrangement from the read image; performing a predetermined process on each of the extracted feature points; the predetermined process comprising the steps of:

(1) selecting n feature points which are nearest to a feature point p of interest; and (2) performing a predetermined process on each of all possible sets of m feature point, m<n, selected from the selected n feature points; the predetermined process in the performing step comprising the steps of:

(a) determining features for all possible sets of d points, wherein d is a number not greater than a predetermined number m selected from an m-point set of interest;

(b) determining an index of a hash table based on the determined features through a predetermined computation; and (c) acquiring features of a preliminarily input document and/or image from the hash table based on the determined hash index, comparing the features determined in the features determining step with the acquired features, and voting for a document ID having matching features;

and after the selecting step and the performing steps, specifying a document ID of a document and/or image which matches the captured image based on a voting result.

7. A non transitory computer readable medium storing a document and/or image storage program, which causes a computer to execute the steps of:

inputting a document and/or image;

assigning an ID to the input document and/or image; extracting feature points defining an image arrangement from the input document and/or image; and performing a predetermined process on each of the extracted feature points; the predetermined process including the steps of:

(1) selecting n feature points which are nearest to a feature point p of interest; and (2) performing a predetermined process on each of all possible sets of m feature points, m<n, selected from the selected n feature points;

the predetermined process in the performing step including the steps of:

(a) determining features for each of which includes a set of invariant values for all possible sets of d points wherein d is a number not greater than a predetermined number m, selected from an m-point set of interest;

(b) determining an index of a hash table based on the determined features through a predetermined computation; and (c) storing the features in relation to a point ID and a document ID in the hash table, the features being determined in the features determining step using the determined hash index, the point ID being assigned to the feature point p and the document ID being assigned to the document and/or image from which the feature point p is extracted.

8. A non transitory computer readable medium storing a document and/or image retrieval program for retrieving a document and/or image input employing the storage program as recited in claim 7, the retrieval program causing a computer to execute the steps of:

reading a captured image;

extracting feature points defining an image arrangement from the read image;

performing a predetermined process on each of the extracted feature points from the read image;

the predetermined process including the steps of:

(1) selecting n feature points which are nearest to a feature point p of interest; and (2) performing a predetermined process on each of all possible sets of m feature points, m<n, selected from the selected n feature points;

the predetermined process in the performing step including the steps of:

(a) determining features for all possible sets of d points, wherein d is a number not greater than a predetermined number m, selected from an m-point set;

(b) determining an index of a hash table based on the determined features through a predetermined computation; and (c) acquiring features of a preliminarily input document and/or image from the hash table based on the determined hash index, comparing the features determined in the features determining step with the acquired features, and voting for a document ID having matching features;

and after the selecting step and the performing steps, specifying a document ID of a document/image which matches the captured image based on a voting result.

9. A document and/or image storage apparatus comprising:

a processor;

an input section which inputs a document and/or image;

a feature point extracting section which extracts feature points defining an image arrangement from the input document and/or image;

a feature point selecting section which selects n feature points nearest to an extracted feature point p of interest; and a feature storing section which performs a predetermined process on each of all possible sets of m feature points, m<n, selected from the selected n feature points;

the predetermined process including the steps of:

(a) determining features for each of which includes a set of invariant values for all possible sets of d points, wherein d is a number not greater than a predetermined number m, selected from an m-point set of interest;

(b) determining an index of a hash table based on the determined features through a predetermined computation; and (c) storing the features in relation to a point ID and a document ID in the hash table, the features being determined in the features determining step using the determined hash index, the point ID being assigned to the feature point p and the document ID being assigned to the document and/or image from which the feature point p is extracted.

10. A document and/or image retrieval apparatus comprising:

a processor;

a reading section which reads a captured image;

a feature point extracting section which extracts feature points defining an image arrangement from the read image;

a feature point selecting section which selects n feature points nearest to an extracted feature point p of interest; and a voting section which performs a predetermined process on each of all possible sets of m feature points, m<n, selected from the selected n feature points;

the predetermined process including the steps of:

(a) determining features for all possible sets of d points, wherein d is a number not greater than a predetermined number m, selected from an m-point set of interest;

(b) determining an index of a hash table based on the determined features through a predetermined computation; and (c) acquiring features of a preliminarily input document and/or image from the hash table based on the determined hash index, comparing the features determined in the features determining step with the acquired features, and voting for a document ID having matching features;

and a document ID specifying section which specifies a document ID of a document/image which matches the captured image based on a voting result determined by votes corresponding to the respective feature points.

* * * * *